(12) United States Patent
Han et al.

(10) Patent No.: US 8,885,591 B2
(45) Date of Patent: Nov. 11, 2014

(54) METHOD AND APPARATUS FOR TRANSMITTING CONTROL INFORMATION IN WIRELESS COMMUNICATION SYSTEM

(75) Inventors: Seung Hee Han, Anyang-si (KR); Jae Hoon Chung, Anyang-si (KR); Sung Ho Moon, Anyang-si (KR); Moon Il Lee, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 13/639,836

(22) PCT Filed: Apr. 1, 2011

(86) PCT No.: PCT/KR2011/002275
§ 371 (c)(1),
(2), (4) Date: Oct. 5, 2012

(87) PCT Pub. No.: WO2011/126239
PCT Pub. Date: Oct. 13, 2011

(65) Prior Publication Data
US 2013/0022019 A1 Jan. 24, 2013

Related U.S. Application Data

(60) Provisional application No. 61/320,775, filed on Apr. 5, 2010, provisional application No. 61/332,206, filed on May 7, 2010, provisional application No. 61/345,162, filed on May 17, 2010, provisional application No. 61/357,977, filed on Jun. 23, 2010.

(30) Foreign Application Priority Data

Mar. 4, 2011 (KR) .................... 10-2011-0019423

(51) Int. Cl.
*H04W 4/00* (2009.01)
*H04B 7/208* (2006.01)
*H04L 5/00* (2006.01)
*H04L 27/26* (2006.01)
*H04W 72/04* (2009.01)

(52) U.S. Cl.
CPC .......... *H04L 5/0026* (2013.01); *H04L 27/2636* (2013.01); *H04L 5/001* (2013.01); *H04L 5/0069* (2013.01); *H04L 5/0053* (2013.01); *H04W 72/0413* (2013.01)
USPC ........................... 370/329; 370/328; 370/344

(58) Field of Classification Search
CPC ... H04L 5/0053; H04L 5/0007; H04L 1/1861; H04W 28/04; H04W 72/04; H04W 72/082
USPC .................................................. 370/328, 344
See application file for complete search history.

(56) References Cited

U.S. PATENT DOCUMENTS

2008/0095106 A1 4/2008 Malladi et al.
2009/0290538 A1 11/2009 Kim et al.
(Continued)

FOREIGN PATENT DOCUMENTS

EP 2525541 11/2012
KR 10-2010-0002066 1/2010
(Continued)

OTHER PUBLICATIONS

Nokia Siemens Networks, et al., "Multiplexing capability of CQIs and ACL/NACKs form different UEs," 3GPP TSG RAN WG1 Meeting #49, R1-072315, XP050106045, May 2007, 4 pages.

(Continued)

*Primary Examiner* — Edan Orgad
*Assistant Examiner* — Rebecca Song
(74) *Attorney, Agent, or Firm* — Lee, Hong, Degerman, Kang & Waimey

(57) ABSTRACT

The present invention relates to a wireless communication system. More specifically, the present invention relates to a method for transmitting control information through a PUCCH in a wireless communication system and an apparatus thereof, comprising the steps of: spreading modulation symbol sets to first slot, by using a first code; spreading modulation symbol sets to second slot, by using a second code, wherein the length of the second code is varied according to the number of the SC-FDMA symbols for PUCCH transmission.

10 Claims, 57 Drawing Sheets

(56) References Cited

U.S. PATENT DOCUMENTS

| | | | |
|---|---|---|---|
| 2011/0065446 A1* | 3/2011 | Mueck et al. | 455/452.2 |
| 2011/0243066 A1* | 10/2011 | Nayeb Nazar et al. | 370/328 |
| 2012/0263124 A1* | 10/2012 | Gaal et al. | 370/329 |

FOREIGN PATENT DOCUMENTS

| | | |
|---|---|---|
| WO | 2009/008677 | 1/2009 |
| WO | 2010018981 | 2/2010 |

OTHER PUBLICATIONS

Khan, "LTE for 4G Mobile Broadband," Cambridge University Press, UK, XP002723042, Jan. 2009, 6 pages.

NTT DoCoMo, et al., "On PUCCH Structure for CQI Report," 3GPP TSG RAN WG1 Meeting #51, R1-074812, XP050108276, Nov. 2007, 8 pages.

Ericsson, "On Multiple ACK/NAK for LTE TDD," TSG-RAN WG1 #53, R1-082001, XP050110348, May 2008, 6 pages.

European Patent Office Application Serial No. 11766090.2 Search Report dated Apr. 25, 2014, 10 pages.

* cited by examiner

FIG. 5
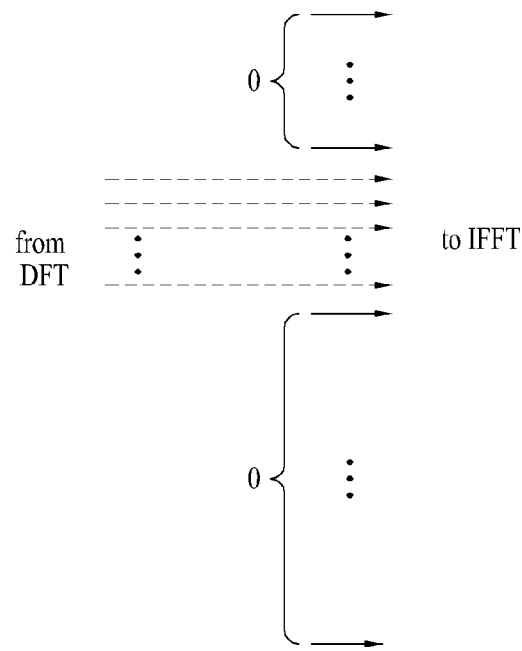
(a)
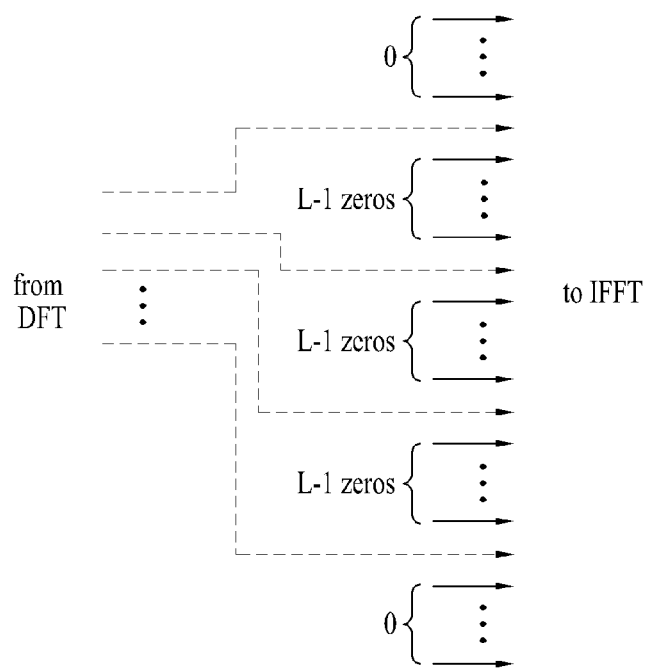
(b)

PUCCH format 1a and 1b structure (normal CP case)

PUCCH format 1a and 1b structure (extended CP case)

PUCCH format 2,2a and 2b structure (normal CP case)

PUCCH format 2,2a and 2b structure (normal CP case)

FIG. 17

Resource allocation: 18 ACK/NACK channels with normal CP $\Delta_{shift}^{PUCCH} = 2$

| Cell specific cyclic shift offset | | RS orthogonal cover | | | ACK/NACK orthogonal cover | | |
|---|---|---|---|---|---|---|---|
| $\delta_{offset}^{PUCCH} = 1$ | $\delta_{offset}^{PUCCH} = 0$ | $\bar{n}_{OC} = 0$ | $\bar{n}_{OC} = 1$ | $\bar{n}_{OC} = 2$ | $n_{OC} = 0$ | $n_{OC} = 1$ | $n_{OC} = 2$ |
| $n_{CS} = 1$ | $n_{CS} = 0$ | n'=0 | | 12 | n'=0 | | 12 |
| 2 | 1 | | 6 | 13 | | 6 | 13 |
| 3 | 2 | 1 | 7 | 14 | 1 | 7 | 14 |
| 4 | 3 | | 8 | 15 | | 8 | 15 |
| 5 | 4 | 2 | 9 | 16 | 2 | 9 | 16 |
| 6 | 5 | | 10 | 17 | | 10 | 17 |
| 7 | 6 | 3 | 11 | | 3 | 11 | |
| 8 | 7 | | | | | | |
| 9 | 8 | 4 | | | 4 | | |
| 10 | 9 | | | | | | |
| 11 | 10 | 5 | | | 5 | | |
| 0 | 11 | | | | | | |

$\Delta_{shift}^{PUCCH} \in \{\{1,2,3\} \text{ for normal cyclic prefix} \atop \{1,2,3\} \text{ for extended cyclic prefix}\}$   Cell-specific Cyclic shift value of CAZAC sequence $\delta_{offset}^{PUCCH} \in \{0,1,...,\Delta_{shift}^{PUCCH} - 1\}$ Cell specific cyclic shift offset $n_{OC}$   Orthogonal sequence index for ACK/NACK
$\bar{n}_{OC}$   Orthogonal sequence index for RS
$n_{CS}$   Cyclic shift value of a CAZAC sequence
n'   ACK/NACK resource index used for the channelization in a RB Reuse of LTE PUCCH format 1 (normal CP case)

Reuse of LTE PUCCH format 2 structure (normal CP case)

Reuse of LTE PUCCH format 2 structure (extended CP case)

FIG. 35A

Orthogonal code index

| Subcarrier index | 0 | 1 | 2 | 3 |
|---|---|---|---|---|
| 0 | 0 | 1 | 2 | 3 |
| 1 | 0 | 1 | 2 | 3 |
| 2 | 0 | 1 | 2 | 3 |
| 3 | 0 | 1 | 2 | 3 |
| 4 | 0 | 1 | 2 | 3 |
| 5 | 0 | 1 | 2 | 3 |
| 6 | 0 | 1 | 2 | 3 |
| 7 | 0 | 1 | 2 | 3 |
| 8 | 0 | 1 | 2 | 3 |
| 9 | 0 | 1 | 2 | 3 |
| 10 | 0 | 1 | 2 | 3 |
| 11 | 0 | 1 | 2 | 3 |

When frequency factor = 1

FIG. 35B

Orthogonal code index

May not be able to be used due to the limitation from RS multiplexing

| Subcarrier index | 0 | 1 | 2 | 3 |
|---|---|---|---|---|
| 0 | 0 | 1 | 2 | 3 |
| 1 | 0 | 1 | 2 | 3 |
| 2 | 0 | 1 | 2 | 3 |
| 3 | 0 | 1 | 2 | 3 |
| 4 | 0 | 1 | 2 | 3 |
| 5 | 0 | 1 | 2 | 3 |
| 6 | 0 | 1 | 2 | 3 |
| 7 | 0 | 1 | 2 | 3 |
| 8 | 0 | 1 | 2 | 3 |
| 9 | 0 | 1 | 2 | 3 |
| 10 | 0 | 1 | 2 | 3 |
| 11 | 0 | 1 | 2 | 3 |

When frequency factor = 1

FIG. 36A

Orthogonal code index

| Subcarrier index | 0 | 1 | 2 | 3 |
|---|---|---|---|---|
| 0 | 0 | 2 | 4 | 6 |
| 1 | 1 | 3 | 5 | 7 |
| 2 | 0 | 2 | 4 | 6 |
| 3 | 1 | 3 | 5 | 7 |
| 4 | 0 | 2 | 4 | 6 |
| 5 | 1 | 3 | 5 | 7 |
| 6 | 0 | 2 | 4 | 6 |
| 7 | 1 | 3 | 5 | 7 |
| 8 | 0 | 2 | 4 | 6 |
| 9 | 1 | 3 | 5 | 7 |
| 10 | 0 | 2 | 4 | 6 |
| 11 | 1 | 3 | 5 | 7 |

When frequency factor = 2

FIG. 36B

May not be able to be used due to the limitation from RS multiplexing

Orthogonal code index

| Subcarrier index | 0 | 1 | 2 | 3 |
|---|---|---|---|---|
| 0 | 0 | 2 | 4 | 6 |
| 1 | 1 | 3 | 5 | 7 |
| 2 | 0 | 2 | 4 | 6 |
| 3 | 1 | 3 | 5 | 7 |
| 4 | 0 | 2 | 4 | 6 |
| 5 | 1 | 3 | 5 | 7 |
| 6 | 0 | 2 | 4 | 6 |
| 7 | 1 | 3 | 5 | 7 |
| 8 | 0 | 2 | 4 | 6 |
| 9 | 1 | 3 | 5 | 7 |
| 10 | 0 | 2 | 4 | 6 |
| 11 | 1 | 3 | 5 | 7 |

When frequency factor = 2

FIG. 37A

Orthogonal code index

| Subcarrier index | 0 | 1 | 2 | 3 |
|---|---|---|---|---|
| 0 | 0 | 3 | 6 | 9 |
| 1 | 1 | 4 | 7 | 10 |
| 2 | 2 | 5 | 8 | 11 |
| 3 | 0 | 3 | 6 | 9 |
| 4 | 1 | 4 | 7 | 10 |
| 5 | 2 | 5 | 8 | 11 |
| 6 | 0 | 3 | 6 | 9 |
| 7 | 1 | 4 | 7 | 10 |
| 8 | 2 | 5 | 8 | 11 |
| 9 | 0 | 3 | 6 | 9 |
| 10 | 1 | 4 | 7 | 10 |
| 11 | 2 | 5 | 8 | 11 |

When frequency factor = 3

FIG. 37B

Orthogonal code index

May not be able to be used due to the limitation from RS multiplexing

| Subcarrier index | 0 | 1 | 2 | 3 |
|---|---|---|---|---|
| 0 | 0 | 3 | 6 | 9 |
| 1 | 1 | 4 | 7 | 10 |
| 2 | 2 | 5 | 8 | 11 |
| 3 | 0 | 3 | 6 | 9 |
| 4 | 1 | 4 | 7 | 10 |
| 5 | 2 | 5 | 8 | 11 |
| 6 | 0 | 3 | 6 | 9 |
| 7 | 1 | 4 | 7 | 10 |
| 8 | 2 | 5 | 8 | 11 |
| 9 | 0 | 3 | 6 | 9 |
| 10 | 1 | 4 | 7 | 10 |
| 11 | 2 | 5 | 8 | 11 |

When frequency factor = 3

FIG. 38A

Orthogonal code index

| Subcarrier index | 0 | 1 | 2 | 3 |
|---|---|---|---|---|
| 0 | 0 | 4 | 8 | 12 |
| 1 | 1 | 5 | 9 | 13 |
| 2 | 2 | 6 | 10 | 14 |
| 3 | 3 | 7 | 11 | 15 |
| 4 | 0 | 4 | 8 | 12 |
| 5 | 1 | 5 | 9 | 13 |
| 6 | 2 | 6 | 10 | 14 |
| 7 | 3 | 7 | 11 | 15 |
| 8 | 0 | 4 | 8 | 12 |
| 9 | 1 | 5 | 9 | 13 |
| 10 | 2 | 6 | 10 | 14 |
| 11 | 3 | 7 | 11 | 15 |

When frequency factor = 4

FIG. 38B

May not be able to be used due to the limitation from RS multiplexing

Orthogonal code index

| Subcarrier index | 0 | 1 | 2 | 3 |
|---|---|---|---|---|
| 0 | 0 | 4 | 8 | 12 |
| 1 | 1 | 5 | 9 | 13 |
| 2 | 2 | 6 | 10 | 14 |
| 3 | 3 | 7 | 11 | 15 |
| 4 | 0 | 4 | 8 | 12 |
| 5 | 1 | 5 | 9 | 13 |
| 6 | 2 | 6 | 10 | 14 |
| 7 | 3 | 7 | 11 | 15 |
| 8 | 0 | 4 | 8 | 12 |
| 9 | 1 | 5 | 9 | 13 |
| 10 | 2 | 6 | 10 | 14 |
| 11 | 3 | 7 | 11 | 15 |

When frequency factor = 4

FIG. 39A

Orthogonal code index

| Subcarrier index | 0 | 1 | 2 | 3 |
|---|---|---|---|---|
| 0 | 0 | 6 | 12 | 18 |
| 1 | 1 | 7 | 13 | 19 |
| 2 | 2 | 8 | 14 | 20 |
| 3 | 3 | 9 | 15 | 21 |
| 4 | 4 | 10 | 16 | 22 |
| 5 | 5 | 11 | 17 | 23 |
| 6 | 0 | 6 | 12 | 18 |
| 7 | 1 | 7 | 13 | 19 |
| 8 | 2 | 8 | 14 | 20 |
| 9 | 3 | 9 | 15 | 21 |
| 10 | 4 | 10 | 16 | 22 |
| 11 | 5 | 11 | 17 | 23 |

When frequency factor = 6

FIG. 39B

May not be able to be used due to the limitation from RS multiplexing

Orthogonal code index

| Subcarrier index | 0 | 1 | 2 | 3 |
|---|---|---|---|---|
| 0 | 0 | 6 | 12 | 18 |
| 1 | 1 | 7 | 13 | 19 |
| 2 | 2 | 8 | 14 | 20 |
| 3 | 3 | 9 | 15 | 21 |
| 4 | 4 | 10 | 16 | 22 |
| 5 | 5 | 11 | 17 | 23 |
| 6 | 0 | 6 | 12 | 18 |
| 7 | 1 | 7 | 13 | 19 |
| 8 | 2 | 8 | 14 | 20 |
| 9 | 3 | 9 | 15 | 21 |
| 10 | 4 | 10 | 16 | 22 |
| 11 | 5 | 11 | 17 | 23 |

When frequency factor = 6

FIG. 40A

Orthogonal code index

| Subcarrier index | 0 | 1 | 2 | 3 |
|---|---|---|---|---|
| 0 | 0 | 12 | 24 | 36 |
| 1 | 1 | 13 | 25 | 37 |
| 2 | 2 | 14 | 26 | 38 |
| 3 | 3 | 15 | 27 | 39 |
| 4 | 4 | 16 | 28 | 40 |
| 5 | 5 | 17 | 29 | 41 |
| 6 | 6 | 18 | 30 | 42 |
| 7 | 7 | 19 | 31 | 43 |
| 8 | 8 | 20 | 32 | 44 |
| 9 | 9 | 21 | 33 | 45 |
| 10 | 10 | 22 | 34 | 46 |
| 11 | 11 | 23 | 35 | 47 |

When frequency factor = 12

FIG. 40B

May not be able to be used due to the limitation from RS multiplexing

Orthogonal code index

| Subcarrier index | 0 | 1 | 2 | 3 |
|---|---|---|---|---|
| 0 | 0 | 12 | 24 | 36 |
| 1 | 1 | 13 | 25 | 37 |
| 2 | 2 | 14 | 26 | 38 |
| 3 | 3 | 15 | 27 | 39 |
| 4 | 4 | 16 | 28 | 40 |
| 5 | 5 | 17 | 29 | 41 |
| 6 | 6 | 18 | 30 | 42 |
| 7 | 7 | 19 | 31 | 43 |
| 8 | 8 | 20 | 32 | 44 |
| 9 | 9 | 21 | 33 | 45 |
| 10 | 10 | 22 | 34 | 46 |
| 11 | 11 | 23 | 35 | 47 |

When frequency factor = 12

FIG. 41

| Orthogonal code index | 0 | 1 | 2 | 3 |
|---|---|---|---|---|
| 0 | 0 | 5 | 7 | 9 |
| 1 | 1 | 3 | 8 | 10 |
| 2 | 2 | 4 | 6 | 11 |
| 3 | 0 | 5 | 7 | 9 |
| 4 | 1 | 3 | 8 | 10 |
| 5 | 2 | 4 | 6 | 11 |
| 6 | 0 | 5 | 7 | 9 |
| 7 | 1 | 3 | 8 | 10 |
| 8 | 2 | 4 | 6 | 11 |
| 9 | 0 | 5 | 7 | 9 |
| 10 | 1 | 3 | 8 | 10 |
| 11 | 2 | 4 | 6 | 11 |

Subcarrier index

When frequency factor = 3

FIG. 42A

Orthogonal code index

| Subcarrier index | 0 | 1 | 2 |
|---|---|---|---|
| 0 | 0 | 12 | 24 |
| 1 | 1 | 13 | 25 |
| 2 | 2 | 14 | 26 |
| 3 | 3 | 15 | 27 |
| 4 | 4 | 16 | 28 |
| 5 | 5 | 17 | 29 |
| 6 | 6 | 18 | 30 |
| 7 | 7 | 19 | 31 |
| 8 | 8 | 20 | 32 |
| 9 | 9 | 21 | 33 |
| 10 | 10 | 22 | 34 |
| 11 | 11 | 23 | 35 | when $\Delta_{shift}^{PUCCH} = 1$

FIG. 42B

Orthogonal code index

| Subcarrier index | 0 | 1 | 2 |
|---|---|---|---|
| 0 | 0 |  | 12 |
| 1 |  | 6 |  |
| 2 | 1 |  | 13 |
| 3 |  | 7 |  |
| 4 | 2 |  | 14 |
| 5 |  | 8 |  |
| 6 | 3 |  | 15 |
| 7 |  | 9 |  |
| 8 | 4 |  | 16 |
| 9 |  | 10 |  |
| 10 | 5 |  | 17 |
| 11 |  | 11 |  | when $\Delta_{shift}^{PUCCH} = 2$

FIG. 42C

Orthogonal code index

| Subcarrier index | 0 | 1 | 2 |
|---|---|---|---|
| 0 | 0 | | |
| 1 | | 4 | |
| 2 | | | 8 |
| 3 | 1 | | |
| 4 | | 5 | |
| 5 | | | 9 |
| 6 | 2 | | |
| 7 | | 6 | |
| 8 | | | 10 |
| 9 | 3 | | |
| 10 | | 7 | |
| 11 | | | 11 | when $\triangle_{shift}^{PUCCH} = 3$

FIG. 42D

Orthogonal code index

| Subcarrier index | 0 | 1 | 2 |
|---|---|---|---|
| 0 | 0 | | |
| 1 | | 3 | |
| 2 | | | 6 |
| 3 | | | |
| 4 | 1 | | |
| 5 | | 4 | |
| 6 | | | 7 |
| 7 | | | |
| 8 | 2 | | |
| 9 | | 5 | |
| 10 | | | 8 |
| 11 | | | | when $\triangle_{shift}^{PUCCH} = 4$

FIG. 42E

Orthogonal code index

| Subcarrier index | 0 | 1 | 2 |
|---|---|---|---|
| 0 | 0 | | |
| 1 | | 2 | |
| 2 | | | 4 |
| 3 | | | |
| 4 | | | |
| 5 | | | |
| 6 | 1 | | |
| 7 | | 3 | |
| 8 | | | 5 |
| 9 | | | |
| 10 | | | |
| 11 | | | | when $\Delta_{shift}^{PUCCH} = 6$

FIG. 42F

Orthogonal code index

| Subcarrier index | 0 | 1 | 2 |
|---|---|---|---|
| 0 | 0 | | |
| 1 | | 1 | |
| 2 | | | 2 |
| 3 | | | |
| 4 | | | |
| 5 | | | |
| 6 | | | |
| 7 | | | |
| 8 | | | |
| 9 | | | |
| 10 | | | |
| 11 | | | | when $\Delta_{shift}^{PUCCH} = 12$

Normal DFT based new PUCCH format (3 RS symbols)

Punctured DFT based new PUCCH format (3 RS symbols)

Normal DFT based new PUCCH format (2 RS symbols)

Punctured DFT based new PUCCH format (2 RS symbols)

Normal DFT based new PUCCH format (1 RS symbol)

Punctured DFT based new PUCCH format (1 RS symbol)

d(9) is punctured d(9) is punctured

FIG. 52

| i | $M_{i,0}$ | $M_{i,1}$ | $M_{i,2}$ | $M_{i,3}$ | $M_{i,4}$ | $M_{i,5}$ | $M_{i,6}$ | $M_{i,7}$ | $M_{i,8}$ | $M_{i,9}$ | $M_{i,10}$ | $M_{i,11}$ | $M_{i,12}$ |
|---|---|---|---|---|---|---|---|---|---|---|---|---|---|
| 0 | 1 | 1 | 0 | 0 | 0 | 0 | 0 | 0 | 0 | 0 | 1 | 1 | 0 |
| 1 | 1 | 1 | 1 | 0 | 0 | 0 | 0 | 0 | 0 | 1 | 1 | 1 | 0 |
| 2 | 1 | 0 | 0 | 1 | 0 | 0 | 1 | 0 | 1 | 1 | 1 | 1 | 1 |
| 3 | 1 | 0 | 1 | 1 | 0 | 0 | 0 | 0 | 1 | 0 | 1 | 1 | 1 |
| 4 | 1 | 1 | 1 | 1 | 0 | 0 | 0 | 1 | 0 | 0 | 1 | 1 | 1 |
| 5 | 1 | 1 | 0 | 0 | 1 | 0 | 1 | 1 | 1 | 0 | 1 | 1 | 1 |
| 6 | 1 | 0 | 1 | 0 | 1 | 0 | 1 | 0 | 1 | 1 | 1 | 1 | 1 |
| 7 | 1 | 0 | 0 | 1 | 1 | 0 | 0 | 1 | 1 | 0 | 1 | 1 | 1 |
| 8 | 1 | 1 | 0 | 1 | 1 | 0 | 0 | 1 | 0 | 1 | 1 | 1 | 1 |
| 9 | 1 | 0 | 1 | 1 | 1 | 0 | 1 | 0 | 0 | 1 | 1 | 1 | 1 |
| 10 | 1 | 0 | 1 | 0 | 0 | 1 | 1 | 1 | 0 | 1 | 1 | 1 | 1 |
| 11 | 1 | 1 | 1 | 0 | 0 | 1 | 1 | 0 | 1 | 0 | 1 | 1 | 1 |
| 12 | 1 | 0 | 0 | 1 | 0 | 1 | 0 | 1 | 1 | 1 | 1 | 1 | 1 |
| 13 | 1 | 1 | 0 | 1 | 0 | 1 | 0 | 1 | 0 | 1 | 1 | 1 | 1 |
| 14 | 1 | 0 | 0 | 0 | 1 | 1 | 0 | 1 | 0 | 0 | 1 | 0 | 1 |
| 15 | 1 | 1 | 0 | 0 | 1 | 1 | 1 | 1 | 0 | 1 | 1 | 0 | 1 |
| 16 | 1 | 1 | 1 | 0 | 1 | 1 | 1 | 0 | 0 | 1 | 0 | 1 | 1 |
| 17 | 1 | 0 | 0 | 1 | 1 | 1 | 0 | 0 | 1 | 0 | 0 | 1 | 1 |
| 18 | 1 | 1 | 0 | 1 | 1 | 1 | 1 | 1 | 0 | 0 | 0 | 0 | 0 |
| 19 | 1 | 0 | 0 | 0 | 0 | 1 | 1 | 0 | 0 | 0 | 0 | 0 | 0 |

Row 18, 19 punctured

METHOD AND APPARATUS FOR TRANSMITTING CONTROL INFORMATION IN WIRELESS COMMUNICATION SYSTEM

CROSS-REFERENCE TO RELATED APPLICATIONS

This application is the National Stage filing under 35 U.S.C. 371 of International Application No. PCT/KR2011/002275, filed on Apr. 1, 2011, which claims the benefit of earlier filing date and right of priority to Korean Patent Application No. 10-2011-0019423, filed on Mar. 4, 2011, and also claims the benefit of U.S. Provisional Application Serial No. 61/320,775, filed on Apr. 5, 2010, U.S. Provisional Application Serial No. 61/332,206, filed on May 7, 2010, U.S. Provisional Application Serial No. 61/345,162, filed on May 17, 2010, and U.S. Provisional Application Serial No. 61/357,977, filed on Jun. 23, 2010, the contents of which are all hereby incorporated by reference herein in their entirety.

TECHNICAL FIELD

The present invention relates to a wireless communication system and, more particularly, to a method and apparatus for transmitting control information. The wireless communication system can support carrier aggregation (CA).

BACKGROUND ART

Extensive research has been conducted to provide various types of communication services including voice and data services in wireless communication systems. In general, a wireless communication system is a multiple access system that supports communication with multiple users by sharing available system resources (e.g. bandwidth, transmit power, etc.) among the multiple users. The multiple access system may adopt a multiple access scheme such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc.

DISCLOSURE

Technical Problem

An object of the present invention is to provide a method and apparatus for efficiently transmitting control information in a wireless communication system. Another object of the present invention is to provide a channel format, signal processing method and apparatus for efficiently transmitting control information. Another object of the present invention is to provide a method and apparatus for efficiently allocating resources for transmitting control information.

It will be appreciated by persons skilled in the art that the objects that could be achieved with the present invention are not limited to what has been particularly described hereinabove and the above and other objects that the present invention could achieve will be more clearly understood from the following detailed description taken in conjunction with the accompanying drawings.

Technical Solution

The object of the present invention can be achieved by providing a method for, at a user equipment (UE), transmitting control information through a physical uplink control channel (PUCCH) in a wireless communication system, the method including: dividing a modulation symbol sequence for the control information such that the divided sequences correspond to two slots on the PUCCH; spreading the divided modulation symbol sequence corresponding to a first slot using a first code such that the spread sequence corresponds to a plurality of single carrier frequency division multiple access (SC-FDMA) symbols; discrete-Fourier-transforming, on an SC-FDMA symbol basis, the modulation symbol sequence spread to correspond to the plurality of SC-FDMA symbols in the first slot; spreading the divided modulation symbol sequence corresponding to a second slot using a second code such that the spread sequence corresponds to a plurality of SC-FDMA symbols; discrete-Fourier-transforming, on an SC-FDMA symbol basis, the modulation symbol sequence spread to correspond to the plurality of SC-FDMA symbols in the second slot; and transmitting discrete-Fourier-transformed signals through the corresponding SC-FDMA symbols in the first and second slots, wherein the length of the second code is varied according to the number of SC-FDMA symbols for PUCCH transmission.

The object of the present invention can be achieved by providing a UE configured to transmit control information through a PUCCH in a wireless communication system, the UE including: a radio frequency (RF); and a processor, wherein the processor is configured to divide a modulation symbol sequence for the control information such that the divided sequences correspond to two slots on the PUCCH, to spread the divided modulation symbol sequence corresponding to a first slot using a first code such that the spread sequence corresponds to a plurality of single carrier frequency division multiple access (SC-FDMA) symbols, to discrete-Fourier-transform, on an SC-FDMA symbol basis, the modulation symbol sequence spread to correspond to the plurality of SC-FDMA symbols in the first slot, to spread the divided modulation symbol sequence corresponding to a second slot using a second code such that the spread sequence corresponds to a plurality of SC-FDMA symbols, to discrete-Fourier-transforming, on an SC-FDMA symbol basis, the modulation symbol sequence spread to correspond to the plurality of SC-FDMA symbols in the second slot, and to transmit discrete-Fourier-transformed signals through the corresponding SC-FDMA symbols in the first and second slots, wherein the length of the second code is varied according to the number of SC-FDMA symbols for PUCCH transmission.

The length of the first code may be fixed irrespective of the number of the SC-FDMA symbols for the PUCCH transmission.

The length of the second code may be M when the number of the SC-FDMA symbols for the PUCCH transmission is N, and the length of the second code may be M−1 when the number of the SC-FDMA symbols for the PUCCH transmission is N−1.

N may be 12 and M may be 5 in a normal cyclic prefix (CP) case, N may be 10 and M may be 5 in an extended CP case, and N may include the number of SC-FDMA symbols for reference signal (RS) transmission.

The second code may be selected from code set 1 when the number of the SC-FDMA symbols for the PUCCH transmission is N whereas the second code may be selected from code set 2 when the number of the SC-FDMA symbols for the PUCCH transmission is N−1.

| Orthogonal codes | |
|---|---|
| Code Set 1 | Cde Set 2 |
| [1 1 1 1 1] | [+1 +1 +1 +1] |
| [1 $e^{j2\pi/5}$ $e^{j4\pi/5}$ $e^{j6\pi/5}$ $e^{j8\pi/5}$] | [+1 −1 +1 −1] |
| [1 $e^{j4\pi/5}$ $e^{j8\pi/5}$ $e^{j2\pi/5}$ $e^{j6\pi/5}$] | [+1 +1 −1 −1] |
| [1 $e^{j6\pi/5}$ $e^{j2\pi/5}$ $e^{j8\pi/5}$ $e^{j4\pi/5}$] | [+1 −1 −1 +1] |
| [1 $e^{j8\pi/5}$ $e^{j6\pi/5}$ $e^{j4\pi/5}$ $e^{j2\pi/5}$] | |

Indexes of the SC-FDMA symbols through which the discrete-Fourier-transformed signal is transmitted in the second slot may be 0, 2, 3, 4 and 6 in the normal CP case and 0, 1, 2, 4 and 5 in the extended CP case when the number of the SC-FDMA symbols for the PUCCH transmission is N whereas indexes of the SC-FDMA symbols through which the discrete-Fourier-transformed signal is transmitted in the second slot may be 0, 2, 3 and 4 in the normal CP case and 0, 1, 2 and 4 in the extended CP case wherein when the number of the SC-FDMA symbols for the PUCCH transmission is N−1.

Advantageous Effects

According to embodiments of the present invention, control information can be efficiently transmitted in a wireless communication system. Furthermore, a channel format and a signal processing method for efficiently transmitting control information can be provided. In addition, resources for control information transmission can be efficiently allocated.

It will be appreciated by persons skilled in the art that the effects that could be achieved with the present invention are not limited to what has been particularly described hereinabove and these and other advantages of the present invention will be more clearly understood from the following detailed description taken in conjunction with the accompanying drawings.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 5 illustrates a signal mapping scheme in a frequency domain, which satisfies single carrier property;

FIG. 17 illustrates ACK/NACK channelization for PUCCH formats 1a and 1b;

FIGS. 35 to 42 illustrate PUCCH resources according to an embodiment of the present invention;

FIGS. 49 to 62 illustrate an exemplary scheme of transmitting UCI using PUCCH format 2 according to an embodiment of the present invention.

BEST MODE

Embodiments of the present invention are applicable to a variety of wireless access technologies such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc. CDMA can be implemented as a wireless technology such as Universal Terrestrial Radio Access (UTRA) or CDMA2000. TDMA can be implemented as a wireless technology such as Global System for Mobile communications (GSM)/General Packet Radio Service (GPRS)/Enhanced Data Rates for GSM Evolution (EDGE). OFDMA can be implemented as a wireless technology such as Institute of Electrical and Electronics Engineers (IEEE) 802.11 (Wireless Fidelity (Wi-Fi)), IEEE 802.16 (Worldwide interoperability for Microwave Access (WiMAX)), IEEE 802.20, Evolved UTRA (E-UTRA). UTRA is a part of Universal Mobile Telecommunications System (UMTS). $3^{rd}$ Generation Partnership Project (3GPP) Long Term Evolution (LTE) is a part of Evolved UMTS (E-UMTS) using E-UTRA. LTE-Advanced (LTE-A) is an evolution of 3GPP LTE. While the following description is given, centering on 3GPP LTE/LTE-A for clarity of description, this is purely exemplary and thus should not be construed as limiting the present invention.

In a wireless communication system, a UE receives information from a BS through downlink and transmits information to the BS through uplink. Information transmitted and received between the BS and the UE includes data and various types of control information. Various physical channels are present according to type/usage of information transmitted and received between the BS and the UE.

Figure 1:
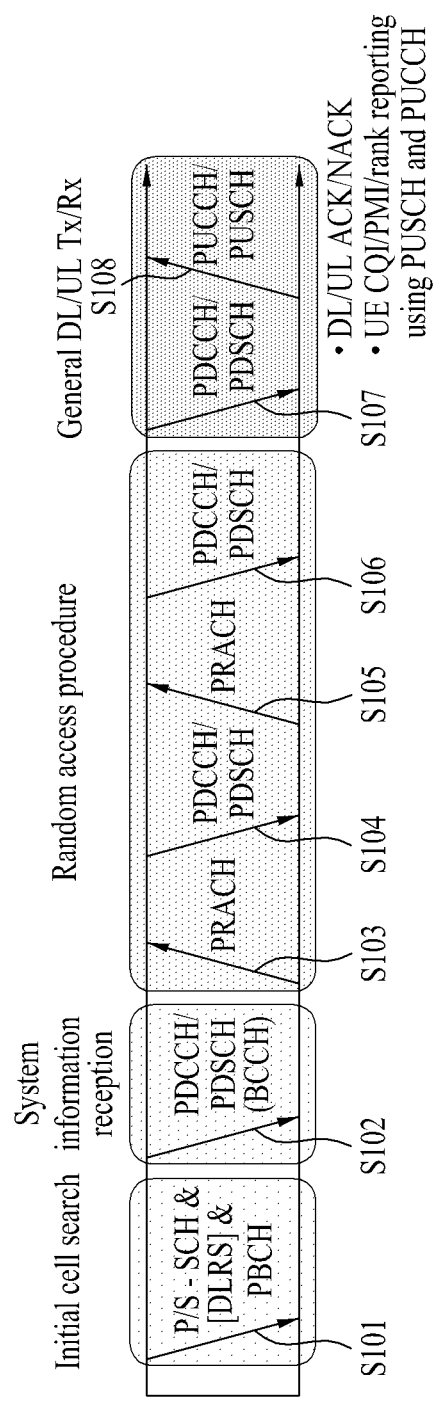
FIG. 1 illustrates physical channels used in a 3GPP LTE system, one of wireless communication systems, and a general signal transmission method using the same.

FIG. 1 illustrates physical channels used in a 3GPP LTE system and a signal transmission method using the same.

When powered on or when a UE initially enters a cell, the UE performs initial cell search involving synchronization with a BS in step S101. For initial cell search, the UE may be synchronized with the BS and acquire information such as a cell Identifier (ID) by receiving a Primary Synchronization Channel (P-SCH) and a Secondary Synchronization Channel (S-SCH) from the BS. Then the UE may receive broadcast information from the cell on a physical broadcast channel. In the mean time, the UE may check a downlink channel status by receiving a Downlink Reference Signal (DL RS) during initial cell search.

After initial cell search, the UE may acquire more specific system information by receiving a Physical Downlink Control Channel (PDCCH) and receiving a Physical Downlink Shared Channel (PDSCH) based on information of the PDCCH in step S102.

The UE may perform a random access procedure to access the BS in steps S103 to S106. For random access, the UE may transmit a preamble to the BS on a Physical Random Access Channel (PRACH) (S103) and receive a response message for the preamble on a PDCCH and a PDSCH corresponding to the PDCCH (S104). In the case of contention-based random access, the UE may perform a contention resolution procedure by further transmitting the PRACH (S105) and receiving a PDCCH and a PDSCH corresponding to the PDCCH (S106).

After the foregoing procedure, the UE may receive a PDCCH/PDSCH (S107) and transmit a Physical Uplink Shared Channel (PUSCH)/Physical Uplink Control Channel (PUCCH) (S108), as a general downlink/uplink signal transmission procedure. Here, control information transmitted from the UE to the BS is called uplink control information (UCI). The UCI may include a Hybrid Automatic Repeat and request Acknowledgement/Negative-ACK (HARQ ACK/NACK) signal, scheduling request (SR), a Channel Quality Indicator (CQI), a Precoding Matrix Index (PMI), a Rank Indication (RI), etc. While the UCI is transmitted through a PUCCH in general, it may be transmitted through a PUSCH when control information and traffic data need to be simultaneously transmitted. The UCI may be aperiodically transmitted through a PUSCH at the request/instruction of a network.

Figure 2:
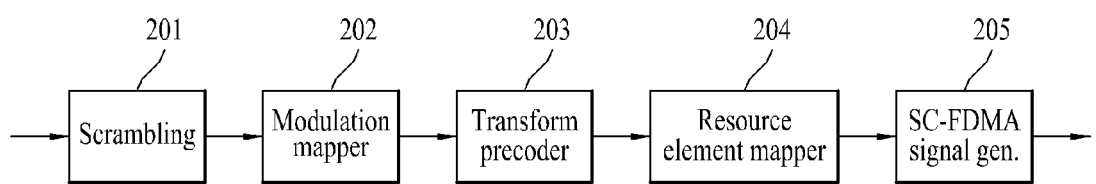
FIG. 2 illustrates an uplink signal processing procedure.

FIG. 2 illustrates a signal processing procedure through which a UE transmits an uplink signal.

To transmit the uplink signal, a scrambling module 210 of the UE may scramble the uplink signal using a UE-specific scramble signal. The scrambled signal is input to a modulation mapper 220 in which the scrambled signal is modulated into complex symbols using Binary Phase Shift Keying (BPSK), Quadrature Phase Shift Keying (QPSK) or 16-Quadrature amplitude Modulation (QAM)/64-QAM according to signal type and/or channel status. The modulated complex symbols are processed by a transform precoder 230, and then applied to a resource element mapper 240. The resource element mapper 240 may map the complex symbols to time-frequency resource elements. The signal processed in this manner may be subjected to an SC-FDMA signal generator 250 and transmitted to a BS through an antenna.

Figure 3:
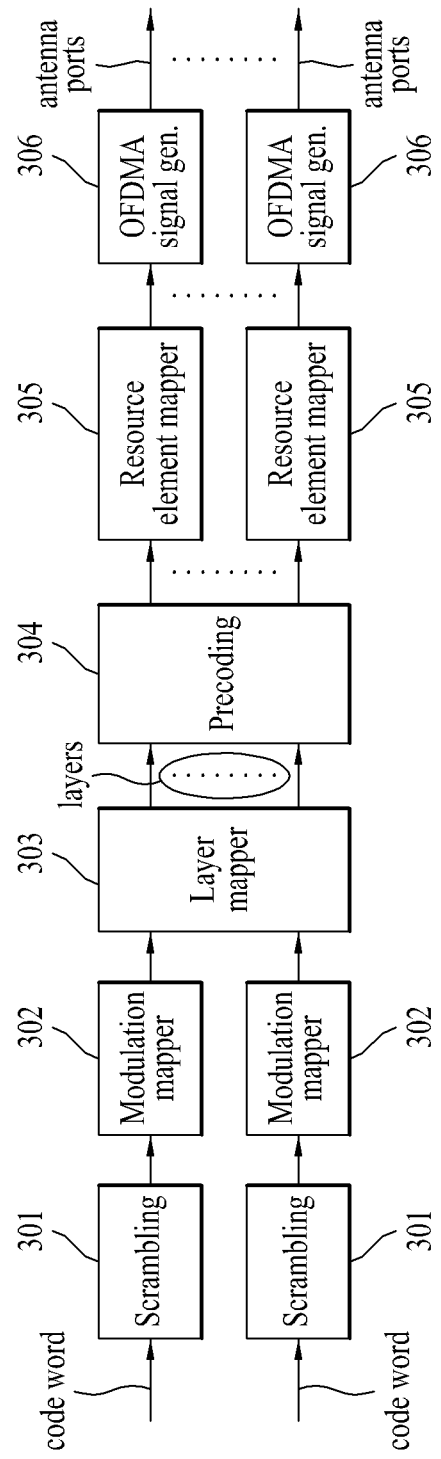
FIG. 3 illustrates a downlink signal processing procedure.

FIG. 3 illustrates a signal processing procedure through which the BS transmits a downlink signal.

In a 3GPP LTE system, the BS may transmit one or more codewords on downlink. The codewords may be processed into complex symbols through a scrambling module 301 and a modulation mapper 302 as in the uplink shown in FIG. 2. Then, the complex symbols are mapped to a plurality of layers by a layer mapper 303. The layers may be multiplied by a precoding matrix in a precoding module 304 and allocated to transport antennas. The processed signals for the respective antennas may be mapped to time-frequency resource elements by a resource element mapper 305 and subjected to an OFDM signal generator 306 to be transmitted through the antennas.

When the UE transmits an uplink signal in a wireless communication system, a peak-to-average ratio (PAPR) becomes a problem, as compared to a case in which the BS transmits a downlink signal. Accordingly, uplink signal transmission uses SC-FDMA while downlink signal transmission uses OFDMA, as described above with reference to FIGS. 2 and 3.

Figure 4:
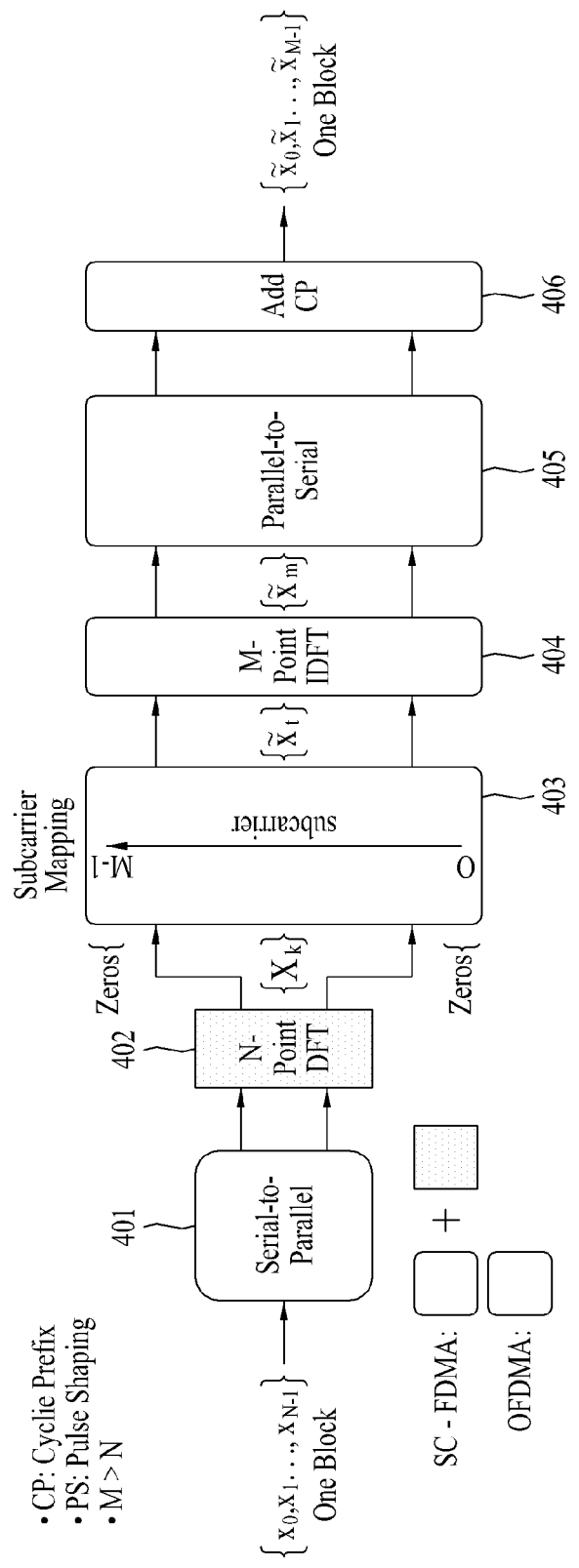
FIG. 4 illustrates SC-FDMA and OFDMA schemes.

FIG. 4 illustrates SC-FDMA and OFDMA schemes. The 3GPP system employs OFDMA in downlink and uses SC-FDMA in uplink.

Referring to FIG. 4, both a UE for transmitting an uplink signal and a BS for transmitting a downlink signal include a serial-to-parallel converter 401, a subcarrier mapper 403, an M-point IDFT module 404, and a cyclic prefix (CP) adder 406. The UE for transmitting a signal according to SC-FDMA additionally includes an N-point DFT module 402. The N-point DFT module 402 offsets some of the IDFT effect of the M-point IDFT module 404 such that a transmitted signal has single carrier property.

FIG. 5 illustrates a signal mapping scheme in a frequency domain, which satisfies single carrier property. FIG. 5(a) illustrates a localized mapping scheme and FIG. 5B illustrates a distributed mapping scheme.

Clustered SC-FDMA, which is a modified version of SC-FDMA, will now be described. Clustered SC-FDMA divides DFT process output samples into sub-groups in a subcarrier mapping process and discretely maps the sub-groups to the frequency domain (or subcarrier domain).

Figure 6:
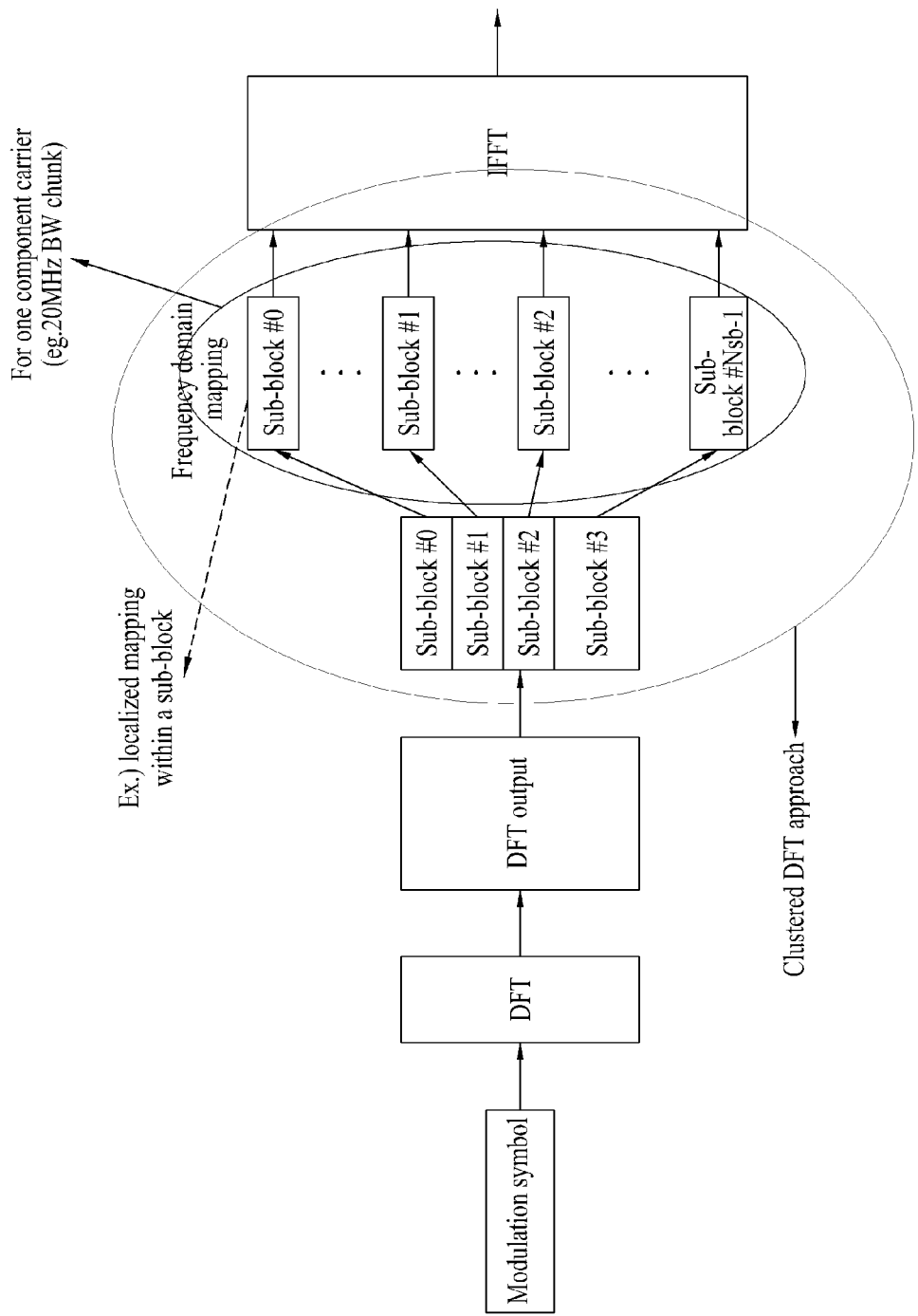
FIG. 6 illustrates a signal processing procedure of mapping DFT process output samples to a single carrier in clustered SC-FDMA.
Figure 7:
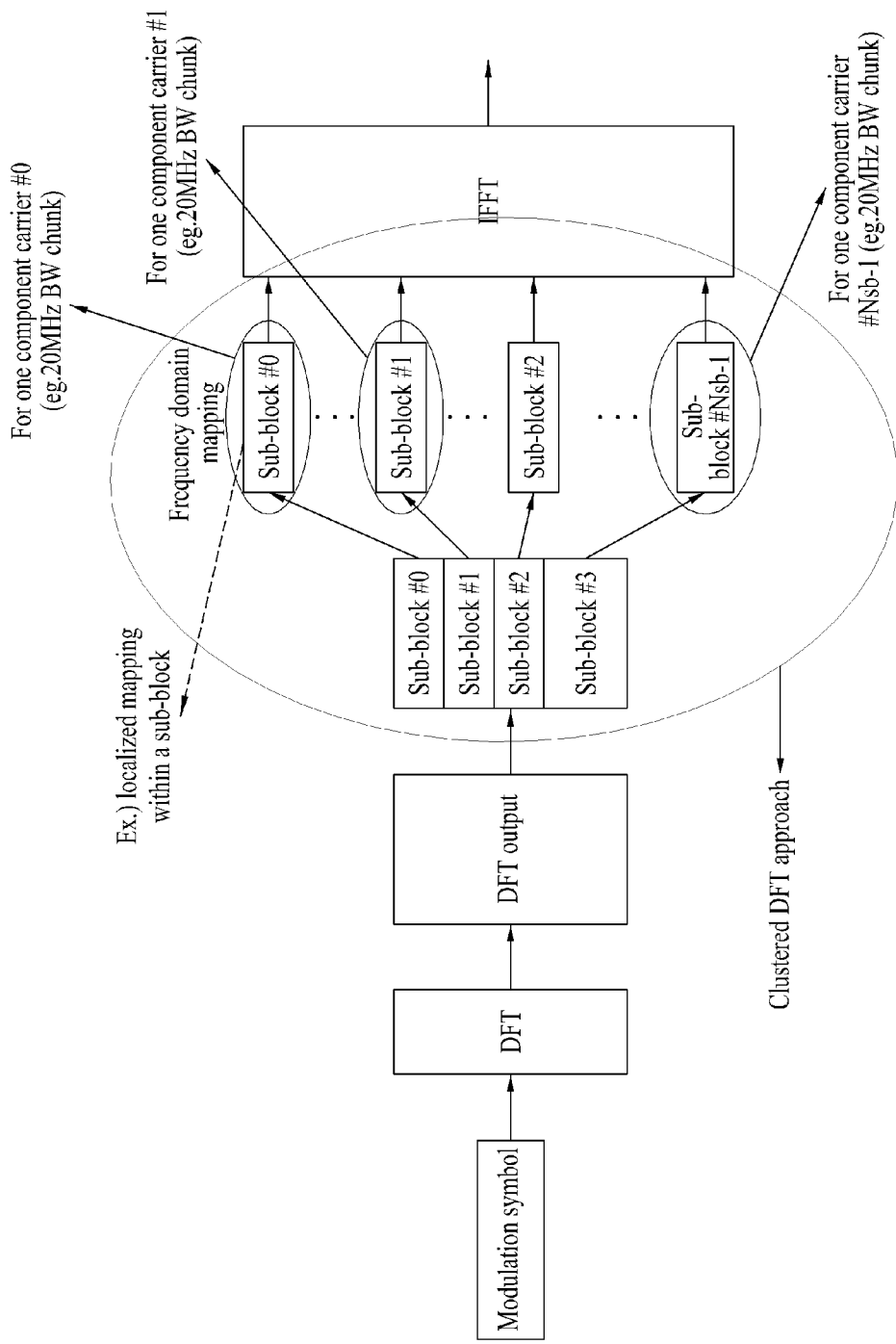
FIGS. 7 and 8 illustrate a signal processing procedure of mapping DFT process output samples to multiple carriers in clustered SC-FDMA.
Figure 8:
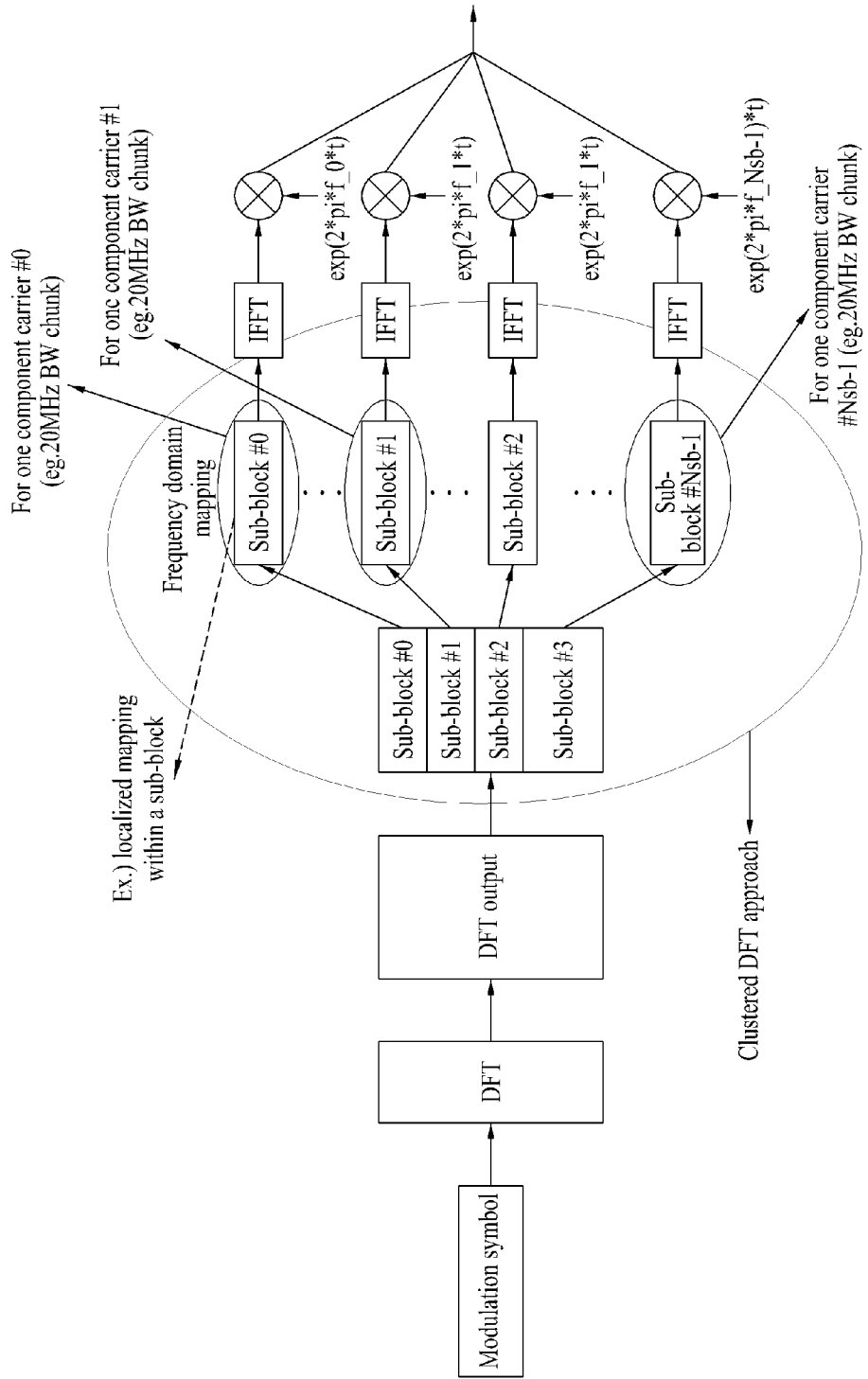

FIG. 6 illustrates a signal processing procedure for mapping DFT process output samples to a single carrier in clustered SC-FDMA. FIGS. 7 and 8 illustrate a signal processing procedure for mapping DFT process output samples to multiple carriers in clustered SC-FDMA. FIG. 6 shows an example of application of intra-carrier clustered SC-FDMA while FIGS. 7 and 8 show examples of application of inter-carrier clustered SC-FDMA. FIG. 7 illustrates a case in which a signal is generated through a single IFFT block when sub-carrier spacing between neighboring component carriers is set while component carriers are contiguously allocated in the frequency domain. FIG. 8 shows a case in which a signal is generated through a plurality of IFFT blocks when component carriers are non-contiguously allocated in the frequency domain.

Figure 9:
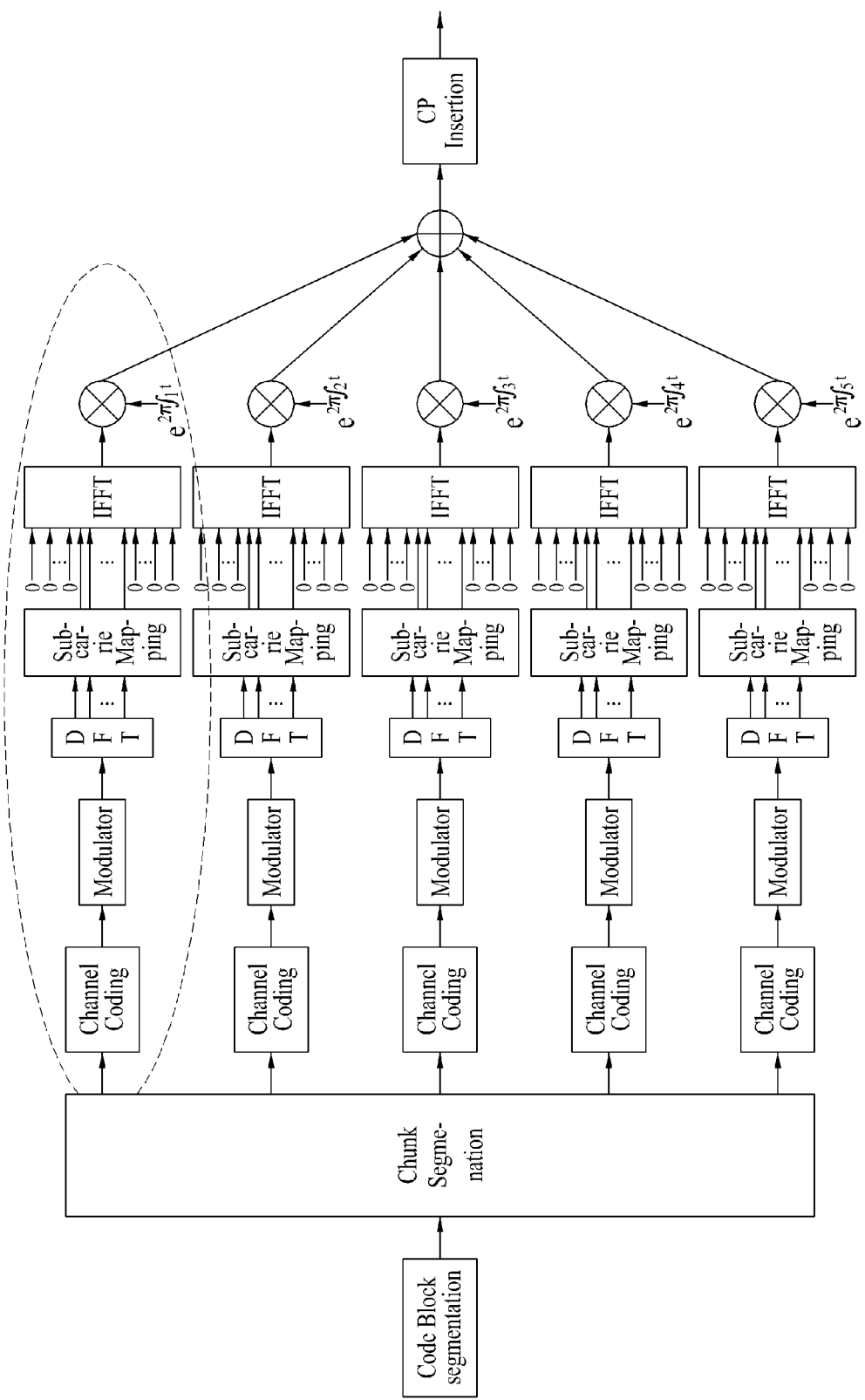
FIG. 9 illustrates a signal processing procedure in segmented SC-FDMA.

FIG. 9 illustrates a signal processing procedure in segmented SC-FDMA.

Segmented SC-FDMA is a simple extension of the DFT spreading and IFFT subcarrier mapping structure of the conventional SC-FDMA, when the number of DFT blocks is equal to the number of IFFT blocks and thus the DFT blocks and the IFFT blocks are in one-to-one correspondence. While the term 'segmented SC-FDMA' is adopted herein, it may also be called NxSC-FDMA or NxDFT spread OFDMA (NxDFT-s-OFDMA). Referring to FIG. 9, the segmented SC-FDMA is characterized in that total time-domain modulation symbols are divided into N groups (N is an integer larger than 1) and a DFT process is performed on a group-by-group basis to relieve the single carrier property constraint.

Figure 10:
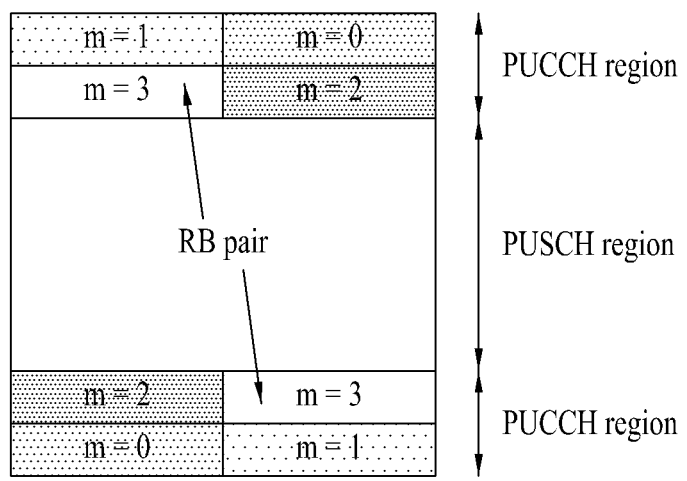
FIG. 10 illustrates an uplink subframe structure.

FIG. 10 illustrates an uplink subframe structure.

Referring to FIG. 10, an uplink subframe includes a plurality of slots (e.g. two slots). The slots may include different numbers of SC-FDMA symbols according to CP length. For example, the slot can include 7 SC-FDMA symbols in case of normal CP. The uplink subframe is divided into a data region and a control region. The data region includes a PUSCH and is used to transmit a data signal such as voice. The control region includes a PUCCH and is used to transmit uplink control information. The PUCCH includes RB pairs (e.g. 7 RB pairs in frequency mirrored positions, and m=0, 1, 2, 3, 4) located on both ends of the data region in the frequency domain and is hopped on a slot basis. The uplink control information (UCI) includes HARQ ACK/NACK, CQI, PMI, RI, etc.

Figure 11:
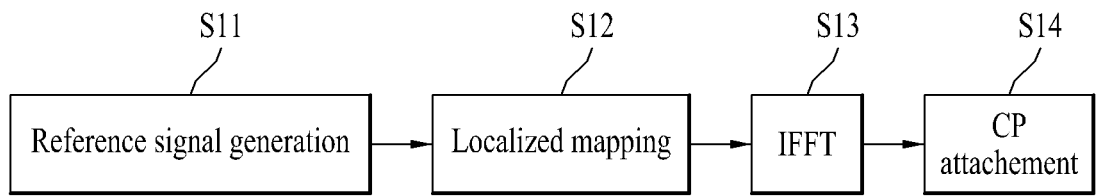
FIG. 11 illustrates a signal processing procedure for transmitting a reference signal (RS) on uplink.

FIG. 11 illustrates a signal processing procedure for transmitting a reference signal (RS) on uplink. While data is converted into a frequency domain signal through a DFT precoder, frequency-mapped, and then transmitted through IFFT, an RS does not passes the DFT precoder. Specifically, an RS sequence generated in the frequency domain (S11) is sequentially subjected to localization mapping (S12), IFFT (S13) and CP addition (S14) to be transmitted.

RS sequence $r_{u,v}^{(\alpha)}(n)$ is defined by cyclic shift α of a base sequence and may be represented by Equation 1.

$$r_{u,v}^{(\alpha)}(n) = e^{j\alpha n} \bar{r}_{u,v}(n), \; 0 \leq n < M_{sc}^{RS} \quad \text{[Equation 1]}$$

Here, $M_{sc}^{RS} = mN_{sc}^{RB}$ denotes the length of the RS sequence, $N_{sc}^{RB}$ denotes a resource block size on a subcarrier basis, $1 \leq m \leq N_{RB}^{max,UL}$, and $N_{RB}^{max,UL}$ represents a maximum uplink transmission bandwidth.

Base sequence $\bar{r}_{u,v}(n)$ is divided into several groups. u∈{0, 1, ..., 29} denotes a group number and v corresponds to a base sequence number in a corresponding group. Each group includes one base sequence (v=0) having a length of $M_{sc}^{RS} = mN_{sc}^{RB}$ (1≤m≤5) and two base sequences (v=0,1) having a length of $M_{sc}^{RS} = mN_{sc}^{RB}$ (6≤m≤$N_{RB}^{max,UL}$). The sequence group number u and base sequence number v in the corresponding group may vary with time. Base sequence $\bar{r}_{u,v}(0), \ldots, \bar{r}_{u,v}(M_{sc}^{RS}-1)$ is defined according to sequence length $M_{sc}^{RS}$.

A base sequence having a length of longer than $3N_{sc}^{RB}$ can be defined as follows.

For $M_{sc}^{RS} \geq 3N_{sc}^{RB}$, base sequence $\bar{r}_{u,v}(0), \ldots, \bar{r}_{u,v}(M_{sc}^{RS}-1)$ is given by the following Equation 2.

$$\bar{r}_{u,v}(n) = x_q(n \bmod N_{ZC}^{RS}), \; 0 \leq n < M_{sc}^{RS} \quad \text{[Equation 2]}$$

Here, the q-th root Zadoff-Chu sequence can be defined by the following Equation 3.

$$x_q(m) = e^{-j\frac{\pi q m(m+1)}{N_{ZC}^{RS}}}, \; 0 \leq m \leq N_{ZC}^{RS} - 1 \quad \text{[Equation 3]}$$

Here, q satisfies the following Equation 4.

$$q = \lfloor \bar{q} + 1/2 \rfloor + v \cdot (-1)^{\lfloor 2\bar{q} \rfloor}$$

$$\bar{q} = N_{ZC}^{RS} \cdot (u+1)/31 \quad \text{[Equation 4]}$$

The length $N_{ZC}^{RS}$ of the Zadoff-Chue sequence is given by the largest prime number, and thus $N_{ZC}^{RS} < M_{sc}^{RS}$ is satisfied.

A base sequence having a length of less than $3N_{sc}^{RB}$ can be defined as follows. The base sequence is given by the following Equation 5 for $M_{sc}^{RS} = N_{sc}^{RB}$ and $M_{sc}^{RS} = 2N_{sc}^{RB}$.

$$\bar{r}_{u,v}(n) = e^{j\phi(n)\pi/4}, \; 0 \leq n \leq M_{sc}^{RS} - 1 \quad \text{[Equation 5]}$$

Here, for $M_{sc}^{RS} = N_{sc}^{RB}$ and $M_{sc}^{RS} = 2N_{sc}^{RB}$, $\phi(n)$ is given as shown in Tables 1 and 2, respectively.

TABLE 1

| u | $\phi(0), \ldots, \phi(11)$ |
|---|---|
| 0 | −1  1  3 −3  3  3  1  1  3  1 −3  3 |
| 1 |  1  1  3  3  3 −1  1 −3 −3  1 −3  3 |
| 2 |  1  1 −3 −3 −3 −1 −3 −3  1 −3  1 −1 |
| 3 | −1  1  1  1  1 −1 −3 −3  1 −3  3 −1 |
| 4 | −1  3  1 −1  1 −1 −3 −1  1 −1  1  3 |
| 5 |  1 −3  3 −1 −1  1  1 −1 −1  3 −3  1 |
| 6 | −1  3 −3 −3 −3  3  1 −1  3  3 −3  1 |
| 7 | −3 −1 −1 −1  1 −3  3 −1  1 −3  3  1 |
| 8 |  1 −3  3  1 −1 −1 −1  1  1  3 −1  1 |
| 9 |  1 −3 −1  3  3 −1 −3  1  1  1  1  1 |
| 10 | −1  3 −1  1  1 −3 −3 −1 −3 −3  3 −1 |
| 11 |  3  1 −1 −1  3  3 −3  1  3  1  3  3 |
| 12 |  1 −3  1  1 −3  1  1  1 −3 −3 −3  1 |
| 13 |  3  3 −3  3 −3  1  1  3 −1 −3  3  3 |
| 14 | −3  1 −1 −3 −1  3  1  3  3  3 −1  1 |
| 15 |  3 −1  1 −3 −1 −1  1  1  3  1 −1 −3 |
| 16 |  1  3  1 −1  1  3  3  3 −1 −1  3 −1 |
| 17 | −3  1  1  3 −3  3 −3 −3  3  1  3 −1 |
| 18 | −3  3  1  1 −3  1 −3 −3 −1 −1  1 −3 |
| 19 | −1  3  1  3  1 −1 −1  3 −3 −1 −3 −1 |
| 20 | −1 −3  1  1  1  1  3  1 −1  1 −3 −1 |
| 21 | −1  3 −1  1 −3 −3 −3 −3 −3  1 −1 −3 |
| 22 |  1  1 −3 −3 −3 −3 −1  3 −3  1 −3  3 |
| 23 |  1  1 −1 −3 −1 −3  1 −1  1  3 −1  1 |
| 24 |  1  1  3  1  3  3 −1  1 −1 −3 −3  1 |
| 25 |  1 −3  3  3  1  3  3  1 −3 −1 −1  3 |
| 26 |  1  3 −3 −3  3 −3  1 −1 −1  3 −1 −3 |
| 27 | −3 −1 −3 −1 −3  3  1 −1  1  3 −3 −3 |
| 28 | −1  3 −3  3 −1  3  3 −3  3  3 −1 −1 |
| 29 |  3 −3 −3 −1 −1 −3 −1  3 −3  3  1 −1 |

TABLE 2

| u | $\phi(0), \ldots, \phi(23)$ |
|---|---|
| 0 | −1  3  1 −3  3 −1  1  3 −3  3  1  3 −3  3  1  1 −1  1  3 −3  3 −3 −1 −3 |
| 1 | −3  3 −3 −3 −3  1 −3 −3  3 −1  1  1  1  3  1 −1  3 −3 −3  1  3  1  1 −3 |
| 2 |  3 −1  3  3  1  1 −3  3  3  3  3  1 −1  3 −1  1  1 −1 −3 −1 −1  1  3  3 |
| 3 | −1 −3  1  1  3 −3  1  1 −3 −1 −1  1  3  1  3  1 −1  3  1  1 −3 −1 −3 −1 |
| 4 | −1 −1 −1 −3 −3 −1  1  1  3  3 −1  3 −1  1 −1 −3  1 −1 −3 −3  1 −3 −1 −1 |
| 5 | −3  1  1  3 −1  1  3  1 −3  1 −3  1  1 −1 −1  3 −1 −3  3 −3 −3 −3  1  1 |
| 6 |  1  1 −1 −1  3 −3 −3  3 −3  1 −1 −1  1 −1  1  1 −1 −3 −1  1 −1  3 −1 −3 |
| 7 | −3  3  3 −1 −1 −3 −1  3  1  3  1  3  1  1 −1  3  1 −1  1  3 −3 −1 −1  1 |
| 8 | −3  1  3 −3  1 −1 −3  3 −3  3 −1 −1 −1 −1  1 −3 −3 −3  1 −3 −3 −3  1 −3 |
| 9 |  1  1 −3  3  3 −1 −3 −1  3 −3  3  3  3 −1  1  1 −3  1 −1  1  1 −3  1  1 |

TABLE 2-continued

| u | $\phi(0), \ldots, \phi(23)$ |
|---|---|
| 10 | -1  1 -3 -3  3 -1  3 -1 -1 -3 -3 -3 -1 -3 -3  1 -1  1  3  3 -1  1 -1  3 |
| 11 |  1  3  3 -3 -3  1  3 -1 -3 -3 -3  3  3 -3  3 -1  3 -1  3 -1  1 -3  1 |
| 12 |  1  3  3  1  1  1 -1 -1  1 -3  3 -1  1  1 -3  3  3 -1 -3  3 -3 -1 -3 -1 |
| 13 |  3 -1 -1 -1 -1 -3 -1  3  3  1 -1  1  3  3  3 -1  1  1 -3  1  3 -1 -3  3 |
| 14 | -3 -3  3  1  3  1 -3  3  1  3  1  1  3  3 -1 -1 -3  1 -3 -1  3  1  1  3 |
| 15 | -1 -1  1 -3  1  3 -3  1 -1 -3 -1  3  1  3  1 -1 -3 -3 -1 -1 -3 -3 -3 -1 |
| 16 | -1 -3  3 -1 -1 -1 -1  1  1 -3  3  1  3  3  1 -1  1 -3  1 -3  1  1 -3 -1 |
| 17 |  1  3 -1  3  3 -1 -3  1 -1 -3  3  3  3 -1  1  1  3 -1 -3 -1  3 -1 -1 -1 |
| 18 |  1  1  1  1  1 -1  3 -1 -3  1  1  3 -3  1 -3 -1  1  1 -3 -3  3  1  1 -3 |
| 19 |  1  3  3  1 -1 -3  3 -1  3  3  3 -3  1 -1  1 -1 -3 -1  1  3 -1  3 -3 -3 |
| 20 | -1 -3  3 -3 -3 -3 -1 -1 -3 -1 -3  3  1  3 -3 -1  3 -1  1 -1  3 -3  1 -1 |
| 21 | -3 -3  1  1 -1  1 -1  1 -1  3  1 -3 -1  1 -1  1 -1 -1  3  3 -3 -1  1 -3 |
| 22 | -3 -1 -3  3  1 -1 -3 -1 -3 -3  3 -3  3 -3 -1  1  3  1 -3  1  3  3 -1 -3 |
| 23 | -1 -1 -1 -1  3  3  3  1  3  3 -3  1  3 -1  3 -1  3  3 -3  3  1 -1  3  3 |
| 24 |  1 -1  3  3 -1 -3  3 -3 -1 -1  3 -1  3 -1 -1  1  1  1  1 -1 -1 -3 -1  3 |
| 25 |  1 -1  1 -1  3 -1  3  1  1 -1 -1 -3  1  3 -3  1  1 -3 -3 -1  1 -3 -1 -1 |
| 26 | -3 -1  1  3  1  1 -3 -1 -1 -3  3 -3  3  1 -3  3 -3  1 -1  1 -3  1  1  1 |
| 27 | -1 -3  3  3  1  1  3 -1 -3 -1 -1 -1  3  1 -3 -3 -1  3 -3 -1 -3 -1 -3 -1 |
| 28 | -1 -3 -1 -1  1 -3 -1 -1  1 -1 -3  1  1 -3  1 -3 -3  3  1  1 -1  3 -1 -1 |
| 29 |  1  1 -1 -1 -3 -1  3 -1  3 -1  1  3  1 -1  3  1  3 -3 -3  1 -1 -1  1  3 |

RS hopping will now be described.

The sequence group number u in slot $n_s$ can be defined by group hopping pattern $f_{gh}(n_s)$ and a sequence-shift pattern $f_{ss}$ according to Equation 6.

$$u = (f_{gh}(n_s) + f_{ss}) \mod 30 \quad \text{[Equation 6]}$$

Here, mod denotes a modulo operation.

There are 17 different hopping patterns and 30 different sequence-shift patterns. Sequence group hopping may be enabled or disabled by means of a parameter that enables group hopping and is provided by higher layers.

PUCCH and PUSCH have the same hopping pattern but may have different sequence-shift patterns.

The group hopping pattern $f_{gh}(n_s)$ is the same for PUSCH and PUCCH and given by the following Equation 7.

$$f_{gh}(n_s) = \begin{cases} 0 & \text{if group hopping is disabled} \\ \left(\sum_{i=0}^{7} c(8n_s + i) \cdot 2^i\right) \mod 30 & \text{if group hopping is enabled} \end{cases} \quad \text{[Equation 7]}$$

Here, c(i) corresponds to a pseudo-random sequence and the pseudo-random sequence generator may be initialized with $$c_{init} = \left\lfloor \frac{N_{ID}^{cell}}{30} \right\rfloor$$

at the beginning of each radio frame.

Sequence-shift pattern $f_{ss}$ differs between PUCCH and PUSCH.

For PUCCH, sequence-shift pattern $f_{ss}^{PUCCH}$ given by $f_{ss}^{PUCCH} = N_{ID}^{cell} \mod 30$. For PUSCH, sequence shift pattern $f_{ss}^{PUSCH}$ is given by $f_{ss}^{PUSCH} = (f_{ss}^{PUCCH} + \Delta_{ss}) \mod 30$. $\Delta_{ss} \in \{0, 1, \ldots, 29\}$ is configured by higher layers.

Sequence hopping will now be described.

Sequence hopping only applies for reference signals of length $M_{sc}^{RS} \geq 6N_{sc}^{RB}$.

For reference signals of length $M_{sc}^{RS} < 6N_{sc}^{RB}$, the base sequence number b within the base sequence group is given by v=0.

For reference signals of length $M_{sc}^{RS} \geq 6N_{sc}^{RB}$, the base sequence number v within the base sequence group in slot $n_s$ is given by the following Equation 8.

$$v = \begin{cases} c(n_s) & \text{if group hopping is disabled and sequence hopping is enabled} \\ 0 & \text{otherwise} \end{cases} \quad \text{[Equation 8]}$$

Here, c(i) corresponds to the pseudo-random sequence and a parameter that is provided by higher layers and enables sequence hopping determines if sequence hopping is enabled or not. The pseudo-random sequence generator may be initialized with $$c_{init} = \left\lfloor \frac{N_{ID}^{cell}}{30} \right\rfloor \cdot 2^5 + f_{ss}^{PUSCH}$$

at the beginning of each radio frame.

A reference signal for PUSCH is determined as follows.

Reference signal sequence $r^{PUSCH}(\cdot)$ for PUSCH is defined by $r^{PUSCH}(m \cdot M_{sc}^{RS} + n) = r_{u,v}^{(\alpha)}(n)$ where $$m = 0, 1$$
$$n = 0, \ldots, M_{sc}^{RS} - 1$$

and $M_{sc}^{RS} = M_{sc}^{PUSCH}$.

A cyclic shift is given by $\alpha = 2\pi n_{cs}/12$ and $n_{cs} = (n_{DMRS}^{(1)} + n_{DMRS}^{(2)} + n_{PRS}(n_s)) \mod 12$ in one slot.

Here, $n_{DMRS}^{(1)}$ is a broadcast value, $n_{DMRS}^{(2)}$ is given by uplink scheduling allocation, and $n_{PRS}(n_s)$ is a cell-specific cyclic shift value. $n_{PRS}(n_s)$ varies with slot number $n_s$ and is given by $n_{PRS}(n_s) = \sum_{i=0}^{7} c(8 \cdot n_s + i) \cdot 2^i$.

Here, c(i) denotes the pseudo-random sequence and is a cell-specific value. The pseudo-random sequence generator may be initialized with $$c_{init} = \left\lfloor \frac{N_{ID}^{cell}}{30} \right\rfloor \cdot 2^5 + f_{ss}^{PUSCH}$$

at the beginning of each radio frame.

Table 3 shows a cyclic shift field and $n_{DMRS}^{(2)}$ in downlink control information (DCI) format 0.

TABLE 3

| Cyclic shift field in DCI format 0 | $n_{DMRS}^{(2)}$ |
|---|---|
| 000 | 0 |
| 001 | 2 |
| 010 | 3 |
| 011 | 4 |
| 100 | 6 |
| 101 | 8 |
| 110 | 9 |
| 111 | 10 |

A physical mapping method for an uplink RS in a PUSCH will now be described.

The sequence is multiplied with the amplitude scaling factor $\beta_{PUSCH}$ and mapped to the same set of a physical resource block (PRB) used for the corresponding PUSCH in a sequence starting with $r^{PUSCH}(0)$. Mapping to resource elements (k,l), with l=3 for normal CP and l=2 for extended CP, in the subframe will be in increasing order of first k, then the slot number.

In summary, a ZC sequence is used with cyclic extension for length $3N_{sc}^{RB}$ or larger, whereas a computer generated sequence is used for length less than $3N_{sc}^{RB}$. A cyclic shift is determined according to cell-specific cyclic shift, UE-specific cyclic shift and hopping pattern.

Figure 12A:
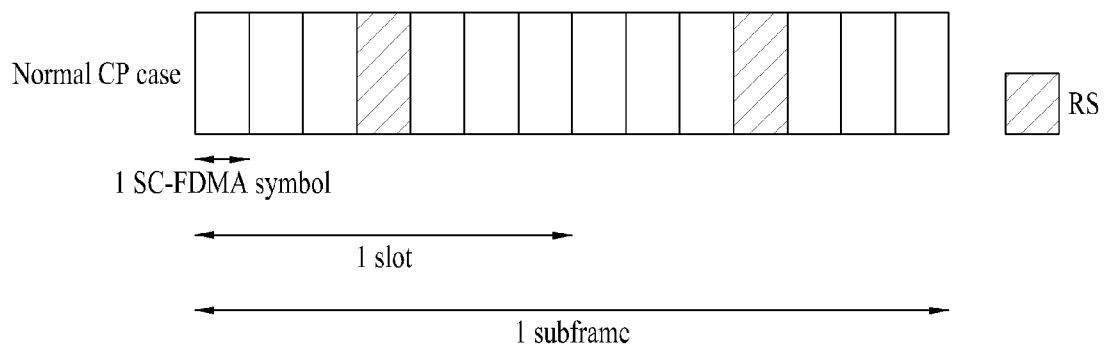
FIG. 12 illustrates a demodulation reference signal (DMRS) structure for a PUSCH.
Figure 12B:
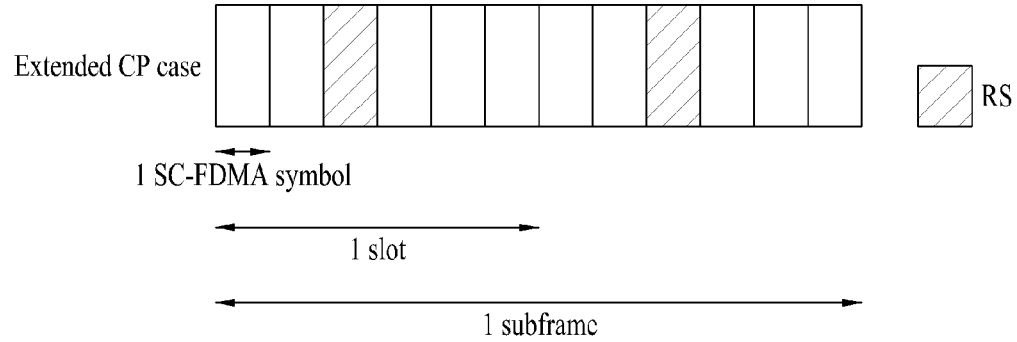

FIG. 12a shows a DMRS structure for PUSCH in case of normal CP and FIG. 12b shows a DMRS structure for PUSCH in case of extended CP. A DMRS is transmitted through the fourth and eleventh SC-FDMA symbols in FIG. 12a and transmitted through the third and ninth SC-FDMA symbols in FIG. 12b.

FIGS. 13 to 16 illustrate slot level structures of PUCCH formats. A PUCCH has the following formats in order to transmit control information.

(1) Format 1: on-off keying (OOK) modulation, used for scheduling request (SR).

(2) Formats 1a and 1b: used for ACK/NACK transmission.
1) Format 1a: BPSK ACK/NACK for one codeword
2) Format 1b: QPSK ACK/NACK for two codewords (3) Format 2: QPSK modulation, used for CQI transmission.

(4) Formats 2a and 2b: used for simultaneous transmission of CQI and ACK/NACK

Table 4 shows modulation schemes according to PUCCH format and the number of bits per subframe. Table 5 shows the number of RSs per slot according to PUCCH format and Table 6 shows SC-FDMA symbol position in an RS according to PUCCH format. In Table 4, PUCCH formats 2a and 2b correspond to normal CP.

TABLE 4

| PUCCH format | Modulation scheme | Number of bits per subframe ($M_{bit}$) |
|---|---|---|
| 1 | N/A | N/A |
| 1a | BPSK | 1 |
| 1b | QPSK | 2 |
| 2 | QPSK | 20 |
| 2a | QPSK + BPSK | 21 |
| 2b | QPSK + BPSK | 22 |

TABLE 5

| PUCCH format | Normal CP | Extended CP |
|---|---|---|
| 1, 1a, 1b | 3 | 2 |
| 2 | 2 | 1 |
| 2a, 2b | 2 | N/A |

TABLE 6

| PUCCH format | SC-FDMA symbol position in RS | |
|---|---|---|
| | Normal CP | Extended CP |
| 1, 1a, 1b | 2, 3, 4 | 2, 3 |
| 2, 2a, 2b | 1, 5 | 3 |

Figure 13:
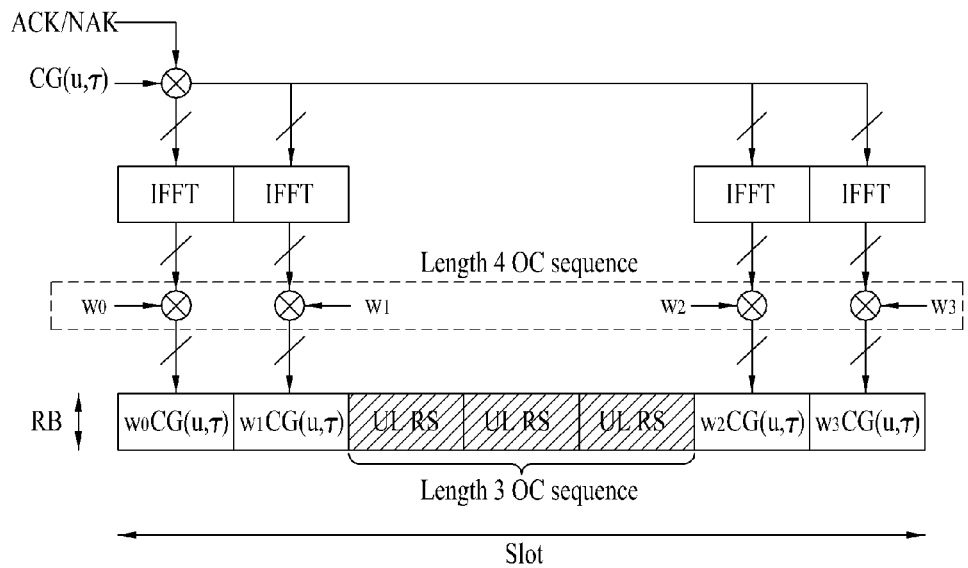
FIGS. 13 and 14 illustrate slot level structures of PUCCH formats 1a and 1b.
Figure 14:
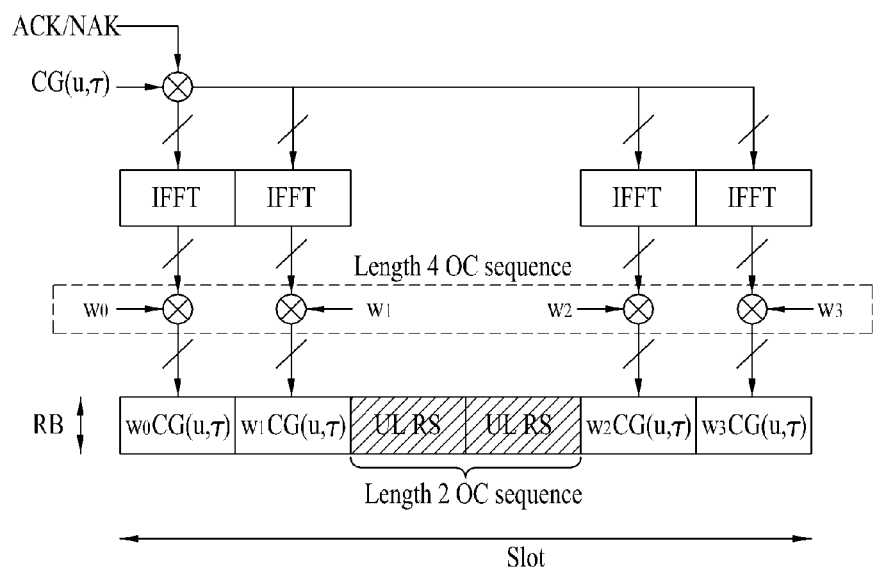

FIG. 13 illustrates PUCCH formats 1a and 1b in case of normal CP and FIG. 14 illustrates PUCCH formats 1a and 1b in case of extended CP. In PUCCH formats 1a and 1b, the same control information is repeated in a subframe on a slot-by-slot basis. ACK/NACK signals are respectively transmitted from UEs through different resources composed of different cyclic shifts (CSs) (frequency domain codes) and orthogonal cover codes (OCs or OCCs) (time domain spreading codes) of a computer-generated constant amplitude zero auto correlation (CG-CAZAC) sequence. An OC includes a Walsh/DFT orthogonal code, for example. If the number of CSs is 6 and the number of OCs is 3, a total of 18 UEs can be multiplexed in the same physical resource block (PRB) on a single antenna basis. Orthogonal sequence w0, w1, w2, w3 may be applied in an arbitrary time domain (after FFT) or in an arbitrary frequency domain (prior to FFT).

An ACK/NACK resource composed of a CS, OC and PRB may be given to a UE through radio resource control (RRC) for SR and persistent scheduling. The ACK/NACK resource may be implicitly provided to the UE by a lowest CCE index of a PUCCH corresponding to a PDSCH for dynamic ACK/NACK and non-persistent scheduling.

Figure 15:
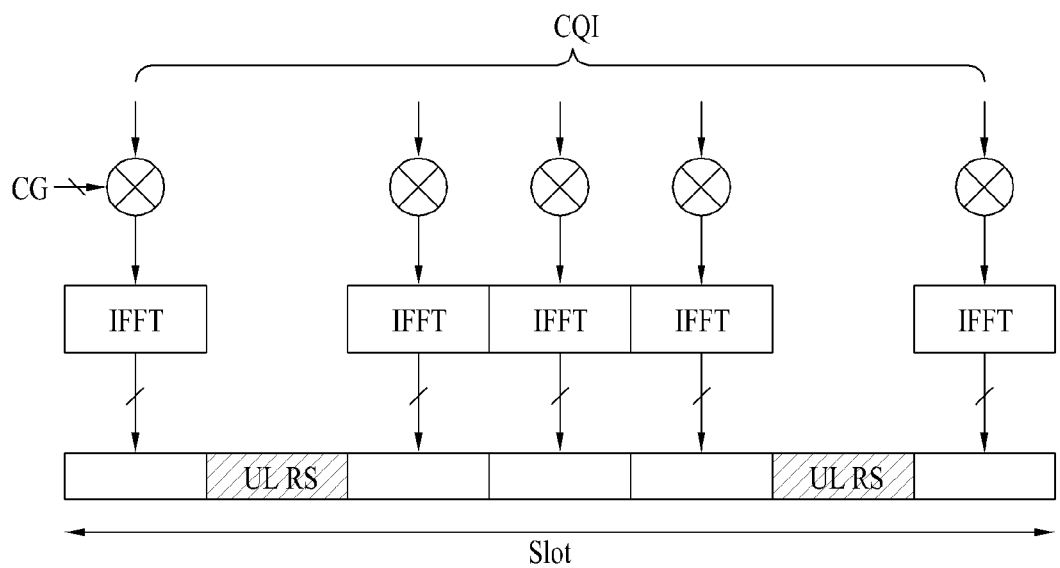
FIGS. 15 and 16 illustrate slot level structures of PUCCH formats 2/2a/2b.
Figure 16:
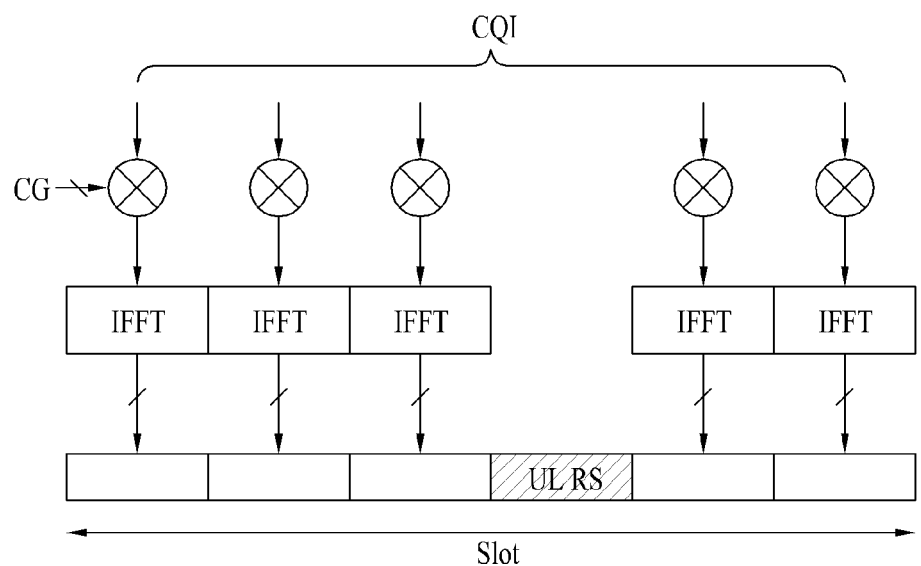

FIG. 15 illustrates PUCCH formats 2/2a/2b in case of normal CP and FIG. 16 illustrates PUCCH formats 2/2a/2b in case of extended CP. Referring to FIGS. 15 and 16, one subframe includes 10 QPSK data symbols in addition to RS symbols in case of normal CP. Each of the QPSK symbols is spread in the frequency domain according to CS and then mapped to a corresponding SC-FDMA symbol. SC-FDMA symbol level CS hopping may be applied to randomize intercell interference. An RS may be multiplexed according to CDM using CSs. For example, if the number of available CSs is 12 or 6, 12 or 6 UEs can be multiplexed in the same PRB. That is, a plurality of UEs can be multiplexed according to CS+OC+PRB and CS+PRB in PUCCH formats 1/1a/1b and 2/2a/2b.

Orthogonal sequences with length-4 and length-3 for PUCCH formats 1/1a/1b are shown in Table 7 and Table 8.

TABLE 7

Length-4 orthogonal sequences for PUCCH formats 1/1a/1b

| Sequence index $n_{oc}(n_s)$ | Orthogonal sequences $[w(0) \ldots w(N_{SF}^{PUCCH} - 1)]$ |
|---|---|
| 0 | [+1 +1 +1 +1] |
| 1 | [+1 −1 +1 −1] |
| 2 | [+1 −1 −1 +1] |

TABLE 8

Length-3 orthogonal sequences for PUCCH formats 1/1a/1b

| Sequence index $n_{oc}(n_s)$ | Orthogonal sequences $[w(0) \ldots w(N_{SF}^{PUCCH} - 1)]$ |
|---|---|
| 0 | [1 1 1] |
| 1 | $[1\ e^{j2\pi/3}\ e^{j4\pi/3}]$ |
| 2 | $[1\ e^{j4\pi/3}\ e^{j2\pi/3}]$ |

Orthogonal sequences for an RS in PUCCH formats 1/1a/1b are shown in Table 9.

TABLE 9

| | 1a and 1b | |
|---|---|---|
| Sequence index $\bar{n}_{oc}(n_s)$ | Normal cyclic prefix | Extended cyclic prefix |
| 0 | [1 1 1] | [1 1] |
| 1 | $[1\ e^{j2\pi/3}\ e^{j4\pi/3}]$ | [1 −1] |
| 2 | $[1\ e^{j4\pi/3}\ e^{j2\pi/3}]$ | N/A |

FIG. 17 illustrates ACK/NACK channelization for PUCCH formats 1a and 1b. FIG. 17 corresponds to a case of $\Delta_{shift}^{PUCCH} = 2$.

Figure 18:
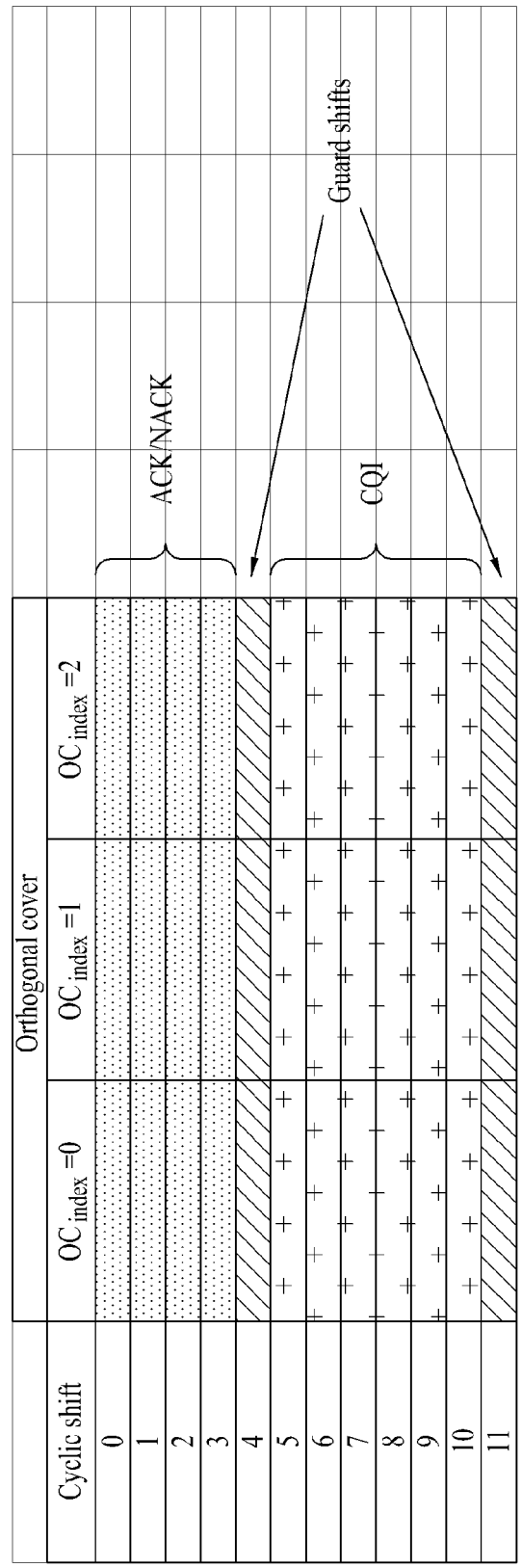
FIG. 18 illustrates channelization for a hybrid structure of PUCCH formats 1/1a/1b and 2/2a/2b in the same PRB.

FIG. 18 illustrates channelization for a hybrid structure of PUCCH formats 1/1a/1b and 2/2a/2b in the same PRB.

CS hopping and OC remapping may be applied as follows.

(1) Symbol-based cell-specific CS hopping for randomization of inter-cell interference (2) Slot level CS/OC remapping 1) For inter-cell interference randomization 2) Slot-based access for mapping between ACK/NACK channels and resources (k)

Resource $n_r$ for PUCCH formats 1/1a/1b includes the following combination.

(1) CS (corresponding to a DFT orthogonal code at a symbol level) $n_{cs}$ (2) OC (orthogonal code at a slot level) $n_{oc}$ (3) Frequency resource block (RB) $n_{rb}$ When indexes indicating CS, OC and RB are $n_{cs}$, $n_{oc}$, and $n_{rb}$, respectively, a representative index $n_r$ includes $n_{cs}$, $n_{oc}$ and $n_{rb}$. Here, $n_r$ satisfies $n_r = (n_{cs}, n_{oc}, n_{rb})$.

CQI, PMI, RI and a combination of CQI and ACK/NACK may be transmitted through PUCCH formats 2/2a/2b. In this case, Reed-Muller (RM) channel coding is applicable.

For example, channel coding for a UL CQI in an LTE system is described as follows. Bit sequence $a_0$, $a_1$, $a_2$, $a_3$, ..., $a_{A-1}$ is channel-coded using RM code (20,A). Table 10 shows a base sequence for code (20,A). Here, $a_0$ and $a_{A-1}$ denote a most significant bit (MSB) and a least significant bit (LSB). In the case of extended CP, a maximum number of information bits is 11 in cases other than a case in which CQI and ACK/NACK are simultaneously transmitted. The Ul CQI may be subjected to QPSK modulation after being coded into 20 bits using the RM code. The coded bits may be scrambled before being subjected to QPSK modulation.

TABLE 10

| I | $M_{i,0}$ | $M_{i,1}$ | $M_{i,2}$ | $M_{i,3}$ | $M_{i,4}$ | $M_{i,5}$ | $M_{i,6}$ | $M_{i,7}$ | $M_{i,8}$ | $M_{i,9}$ | $M_{i,10}$ | $M_{i,11}$ | $M_{i,12}$ |
|---|---|---|---|---|---|---|---|---|---|---|---|---|---|
| 0 | 1 | 1 | 0 | 0 | 0 | 0 | 0 | 0 | 0 | 0 | 1 | 1 | 0 |
| 1 | 1 | 1 | 1 | 0 | 0 | 0 | 0 | 0 | 0 | 1 | 1 | 1 | 0 |
| 2 | 1 | 0 | 0 | 1 | 0 | 0 | 1 | 0 | 1 | 1 | 1 | 1 | 1 |
| 3 | 1 | 0 | 1 | 1 | 0 | 0 | 0 | 0 | 1 | 0 | 1 | 1 | 1 |
| 4 | 1 | 1 | 1 | 1 | 0 | 0 | 0 | 1 | 0 | 0 | 1 | 1 | 1 |
| 5 | 1 | 1 | 0 | 0 | 1 | 0 | 1 | 1 | 1 | 0 | 1 | 1 | 1 |
| 6 | 1 | 0 | 1 | 0 | 1 | 0 | 1 | 0 | 1 | 1 | 1 | 1 | 1 |
| 7 | 1 | 0 | 0 | 1 | 1 | 0 | 0 | 1 | 1 | 0 | 1 | 1 | 1 |
| 8 | 1 | 1 | 0 | 1 | 1 | 0 | 0 | 1 | 0 | 1 | 1 | 1 | 1 |
| 9 | 1 | 0 | 1 | 1 | 1 | 0 | 1 | 0 | 0 | 1 | 1 | 1 | 1 |
| 10 | 1 | 0 | 1 | 0 | 0 | 1 | 1 | 1 | 0 | 1 | 1 | 1 | 1 |
| 11 | 1 | 1 | 1 | 0 | 0 | 1 | 1 | 0 | 1 | 0 | 1 | 1 | 1 |
| 12 | 1 | 0 | 0 | 1 | 0 | 1 | 0 | 1 | 1 | 1 | 1 | 1 | 1 |
| 13 | 1 | 1 | 0 | 1 | 0 | 1 | 0 | 1 | 0 | 1 | 1 | 1 | 1 |
| 14 | 1 | 0 | 0 | 0 | 1 | 1 | 0 | 1 | 0 | 0 | 1 | 0 | 1 |
| 15 | 1 | 1 | 0 | 0 | 1 | 1 | 1 | 1 | 0 | 1 | 1 | 0 | 1 |
| 16 | 1 | 1 | 1 | 0 | 1 | 1 | 1 | 0 | 0 | 1 | 0 | 1 | 1 |
| 17 | 1 | 0 | 0 | 1 | 1 | 1 | 0 | 0 | 1 | 0 | 0 | 1 | 1 |
| 18 | 1 | 1 | 0 | 1 | 1 | 1 | 1 | 1 | 0 | 0 | 0 | 0 | 0 |
| 19 | 1 | 0 | 0 | 0 | 0 | 1 | 1 | 0 | 0 | 0 | 0 | 0 | 0 |

Channel-coded bits $b_0, b_1, b_2, b_3, \ldots, b_{B-1}$ may be generated according to Equation 9.

$$b_i = \sum_{n=0}^{A-1} (a_n \cdot M_{i,n}) \bmod 2 \qquad \text{[Equation 9]}$$

Here, i=0, 1, 2, ..., B−1.

Table 11 shows an uplink control information (UCI) field for wideband report (single antenna port, transmit diversity or open loop spatial multiplexing PDSCH) CQI feedback.

TABLE 11

| Field | Band |
|---|---|
| Wideband CQI | 4 |

Table 12 shows a UCI field for wideband CQI and PMI feedback. This field reports closed loop spatial multiplexing PDSCH transmission.

TABLE 12

| Field | Band | | | |
|---|---|---|---|---|
| | 2 antenna ports | | 4 antenna ports | |
| | Rank = 1 | Rank = 2 | Rank = 1 | Rank > 1 |
| Wideband CQI | 4 | 4 | 4 | 4 |
| Spatial differential CQI | 0 | 3 | 0 | 3 |
| PMI (Precoding Matrix Index) | 2 | 1 | 4 | 4 |

Table 13 shows a UCI field for RI feedback for wideband report.

TABLE 13

| Field | Bit widths | | |
|---|---|---|---|
| | 2 antenna ports | 4 antenna ports | |
| | | Maximum 2 layers | Maximum 4 layers |
| RI (Rank Indication) | 1 | 1 | 2 |

Figure 19:
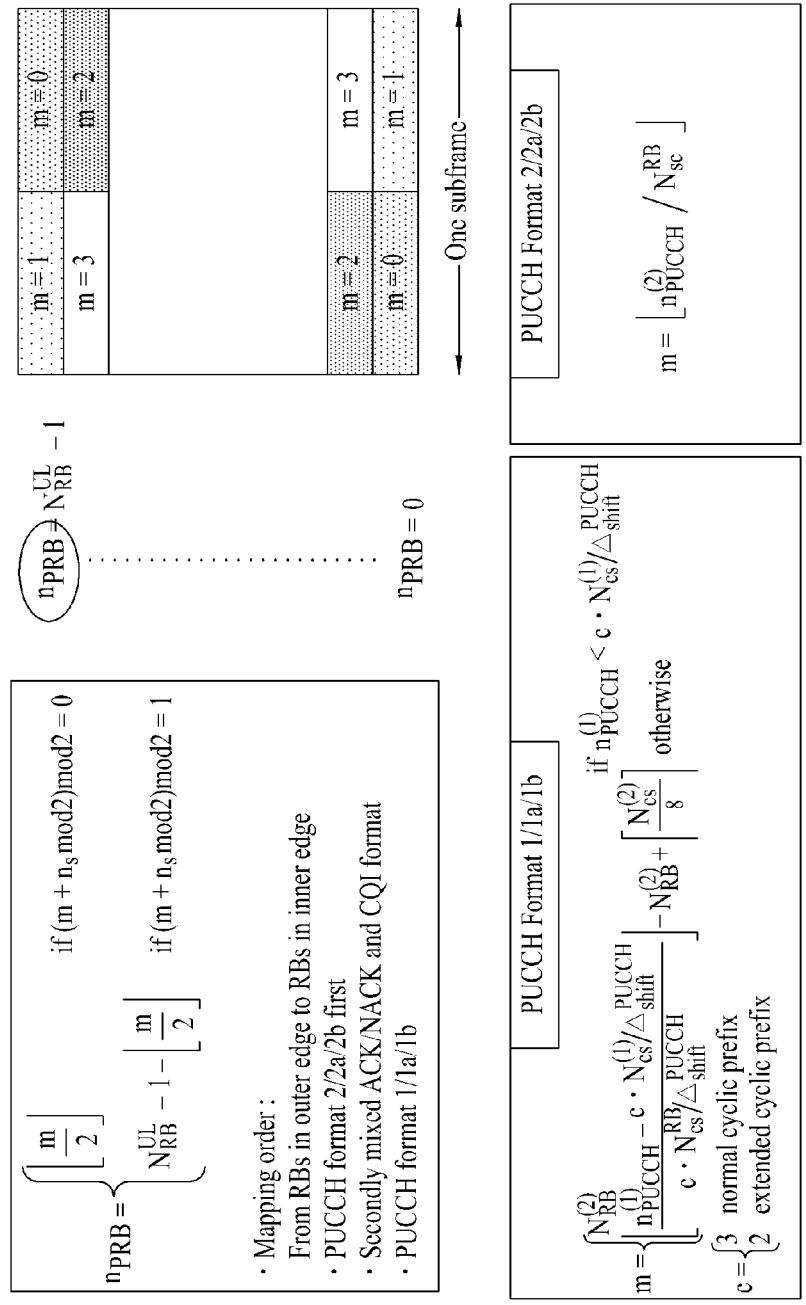
FIG. 19 illustrates PRB allocation for PUCCH transmission.

FIG. 19 illustrates PRB allocation. As shown in FIG. 19, a PRB may be used for PUCCH transmission in slot $n_s$.

A multi-carrier system or a carrier aggregation system means a system using aggregation of a plurality of carriers having a bandwidth narrower than a target bandwidth for supporting a wideband. When the plurality of carriers having a bandwidth narrower than the target bandwidth are aggregated, the bandwidth of the aggregated carriers may be limited to the bandwidths used in existing systems for backward compatibility with the existing systems. For example, an LTE system supports bandwidths of 1.4 MHz, 3 MHz, 5 MHz, 10 MHz, 15 MHz and 20 MHz and an LTE-A system evolved from the LTE system can support bandwidths wider than 20 MHz using bandwidths supported by the LTE system. Alternatively, a new bandwidth may be defined to support carrier aggregation irrespective of the bandwidths used in existing systems. The term 'multi-carrier' can be used with carrier aggregation and bandwidth aggregation. Carrier aggregation includes both contiguous carrier aggregation and non-contiguous carrier aggregation.

Figure 20:
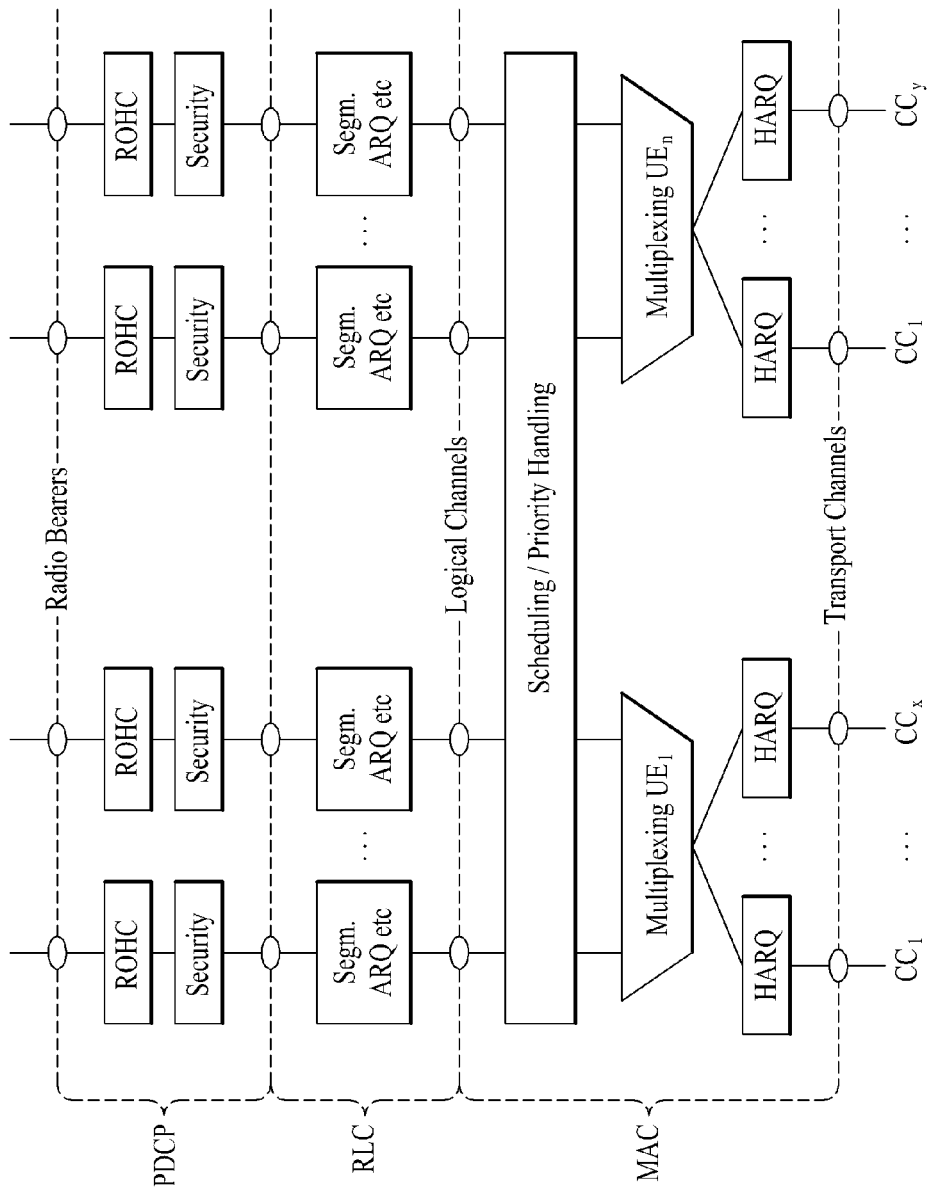
FIG. 20 illustrates a concept of management of downlink component carriers in a base station (BS)
Figure 21:
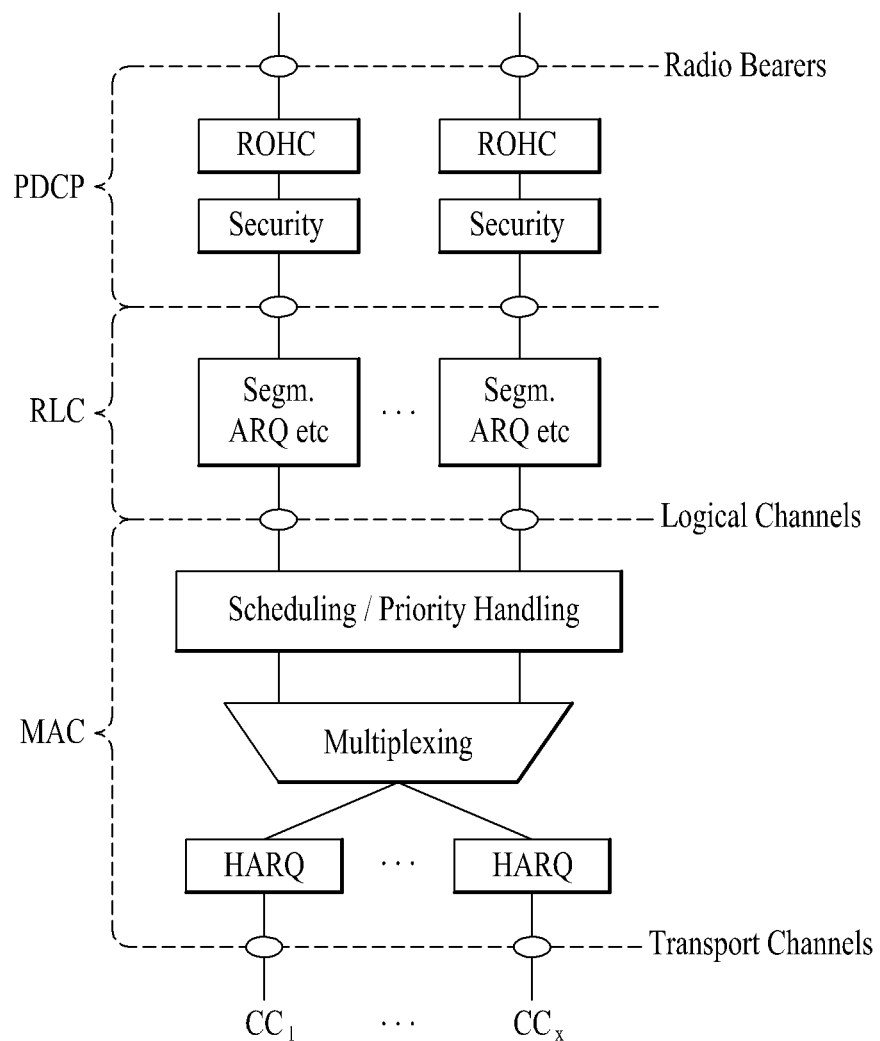
FIG. 21 illustrates a concept of management of uplink component carriers in a user equipment (UE)

FIG. 20 illustrates a concept of management of downlink component carriers in a BS and FIG. 21 illustrates a concept of management of uplink component carriers in a UE. For convenience, higher layers are simply referred to as a MAC layer in the following description.

Figure 22:
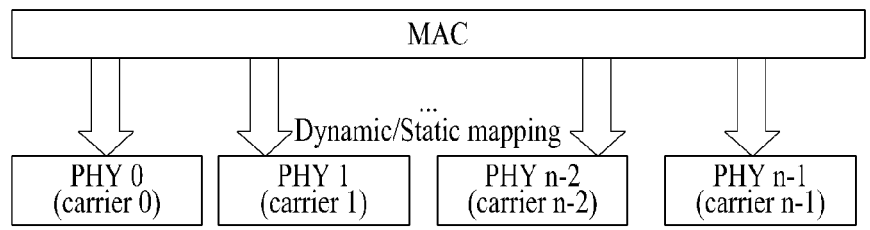
FIG. 22 illustrates a concept of management of multiple carriers by one MAC layer in a BS.
Figure 23:
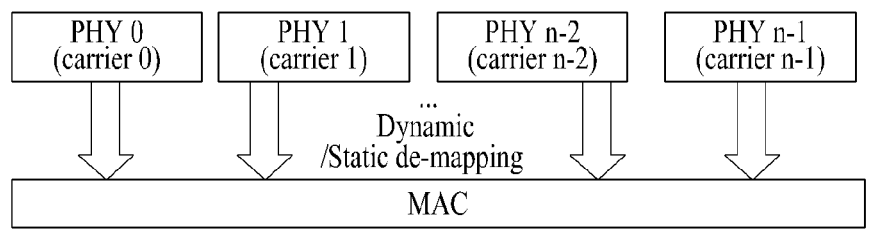
FIG. 23 illustrates a concept of management of multiple carriers by one MAC layer in a UE.

FIG. 22 illustrates a concept of management of multiple carriers by one MAC layer in a BS and FIG. 23 illustrates a concept of management of multiple carriers by MAC layer in a UE.

Referring to FIGS. 22 and 23, one MAC layer manages and operates one or more frequency carriers for transmission and reception. In this case, resource management is flexible because frequency carriers managed by one MAC layer need not be contiguous. In FIGS. 22 and 23, one PHY layer corresponds to one component carrier. Here, one PHY layer does not necessarily mean an independent radio frequency (RF) device. While one independent RF device means one PHY layer in general, one RF device is not limited thereto and may include multiple PHY layers.

Figure 24:
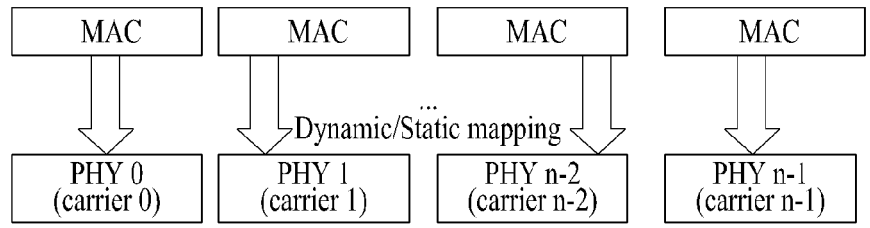
FIG. 24 illustrates a concept of management of multiple carriers by multiple MAC layers in a BS.
Figure 25:
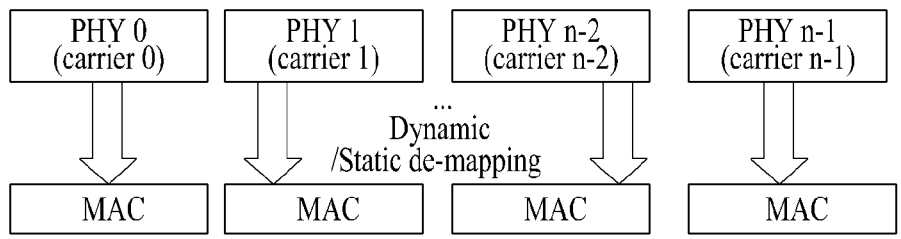
FIG. 25 illustrates a concept of management of multiple carriers by multiple MAC layers in a UE.
Figure 26:
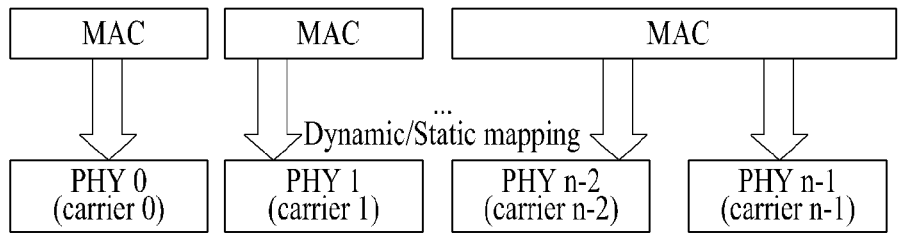
FIG. 26 illustrates a concept of management of multiple carriers by multiple MAC layers in a BS.
Figure 27:
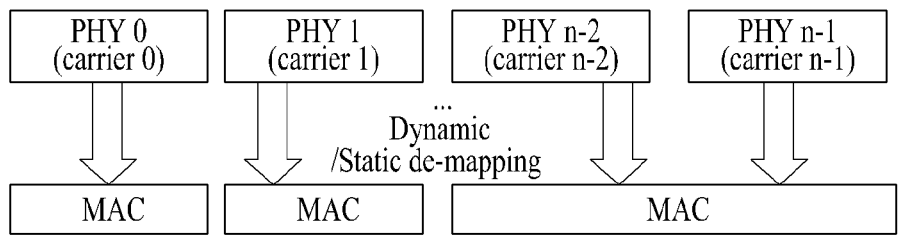
FIG. 27 illustrates a concept of management of multiple carriers by one or more MAC layers at a receiver of a UE.

FIG. 24 illustrates a concept of management of multiple carriers by multiple MAC layers in a BS and FIG. 25 illustrates a concept of management of multiple carriers by multiple MAC layers in a UE. FIG. 26 illustrates a concept of management of multiple carriers by multiple MAC layers in a BS and FIG. 27 illustrates a concept of management of multiple carriers by one or more MAC layers in a UE.

Distinguished from the structures shown in FIGS. 22 and 23, multiple carriers may be controlled by multiple MAC layers as shown in FIGS. 24 to 27.

Multiple MAC layers may control one-to-one multiple carriers as shown in FIGS. 24 and 25. Referring to FIGS. 26 and 27, MAC layers may control one-to-one some carriers and one MAC layer may control other carriers.

The above-described system includes one to N carriers which are contiguous or non-contiguous. This can be applied in both uplink and downlink. A TDD system is configured such that N carriers for downlink transmission and uplink transmission are operated and an FDD system is configured such that multiple carriers are respectively used for uplink and downlink. The FDD system may support asymmetrical carrier aggregation in which the numbers of aggregated carriers and/or carrier bandwidths are different between uplink and downlink.

When the number of aggregated component carriers in uplink equals that in downlink, it is possible to configure all component carriers such that they are compatible with existing systems. However, component carriers that do not consider compatibility are not excluded from the present invention.

While the following description is made on the assumption that, when a PDCCH is transmitted using downlink component carrier #0, a PDSCH corresponding to the PDCCH is transmitted through downlink component carrier #0, it is apparent that the PDSCH can be transmitted through a different downlink component carrier using cross-carrier scheduling. The term 'component carrier' can be replaced with an equivalent term (e.g. cell).

Figure 28:
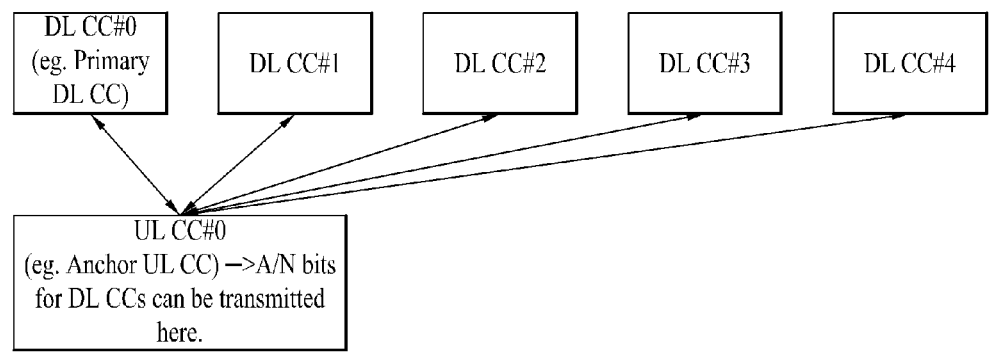
FIG. 28 illustrates asymmetrical carrier aggregation in which a plurality of DL CCs are linked to one UL CC.

FIG. 28 illustrates a scenario of transmitting UCI in a wireless communication system that supports carrier aggregation. This scenario is based on the assumption that UCI is ACK/NACK (A/N). However, this is exemplary and UCI can include control information such as channel status information (e.g. CQI, PMI, RI, etc.) and scheduling request information (e.g. SR).

FIG. 28 illustrates asymmetrical carrier aggregation in which 5 DL CCs are linked to one UL CC. This asymmetrical carrier aggregation may be set from the viewpoint of UCI transmission. That is, DL CC-UL CC linkage for the UCI and DL CC-UL CC linkage for data may be different from each other. When it is assumed that one DL CC can transmit a maximum of two codewords, at least two UL ACK/NACK bits are needed. In this case, at least 10 ACK/NACK bits are necessary to transmit ACK/NACK information for data, received through 5 DL CCs, using one UL CC. If DTX status is also supported for each DL CC, at least 12 bits ($=5^5=3125=11.6$ bits) are needed for ACK/NACK transmission. The conventional PUCCH formats 1a/1b can transmit ACK/NACK information having a maximum of 2 bits, and thus it cannot transmit ACK/NACK information having an increased number of bits. While it has been described that carrier aggregation increases the quantity of UCI, an increase in the number of antennas, presence of a backhaul subframe in a TDD system and a relay system, etc. may cause an increase in the quantity of UCI. Similarly to ACK/NACK information, when control information related to a plurality of DL CCs is transmitted through one UL CC, the quantity of the control information increases. For example, when CQI/PMI/RI related to a plurality of DL CCs is transmitted, a CQI payload may increase. A DL CC and a UL CC may also be respectively called a DL cell and a UL cell and an anchor DL CC and an anchor UL CC may be respectively called a DL primary cell (PCell) and a UL PCell.

The DL primary CC may be defined as a DL CC linked with the UL primary CC. Here, linkage includes both implicit linkage and explicit linkage. In LTE, one DL CC and one UL CC are uniquely paired. For example, a DL CC linked with the UL primary CC according to LTE paring can be called the DL primary CC. This can be regarded as implicit linkage. Explicit linkage means that a network configures a linkage in advance and it may be signaled through RRC. In explicit linkage, a DL CC paired with the UL primary CC may be called the DL primary CC. Here, the UL primary (anchor) CC may be a UL CC that carries a PUCCH. Otherwise, the UL primary CC may be a UL CC that carries UCI over a PUCCH or a PUSCH. The DL primary CC can be configured through higher layer signaling. The DL primary CC may be a DL CC through which a UE performs initial access. DL CCs other than the DL primary CC can be called DL secondary CCs. Similarly, UL CCs other than the UL primary CC can be called UL secondary CCs.

DL-UL pairing may correspond to FDD only. DL-UL pairing may not be additionally defined for TDD because TDD uses the same frequency. DL-UL linkage may be determined from UL linkage through UL EARFCN information of SIB2. For example, DL-UL linkage can be obtained through SIB2 decoding in the event of initial access and acquired through RRC signaling in other cases. Accordingly, only SIB2 linkage is present and other DL-UL pairing may not be explicitly defined. For example, in a 5DL:1UL structure shown in FIG. 28, DL CC#0 and UL CC#0 is in a SIB2 linkage relationship and other DL CCs may be in the SIB2 linkage relationship with other UL CCs that are not set to the corresponding UE.

While some embodiments of the present invention are focused on asymmetrical carrier aggregation, they are exemplary and the present invention is applicable to various carrier aggregation scenarios including symmetrical carrier aggregation.

A scheme for efficiently transmitting an increased quantity of UCI will now be described. Specifically, a new PUCCH format/signal processing procedure/resource allocation method for transmitting an increased quantity of UCI are proposed. In the following description, the new PUCCH format proposed by the present invention is referred to as an LTE-A PUCCH format, or PUCCH format 3 in view of the fact that up to PUCCH format 2 has been defined in LTE. The technical spirit of the PUCCH format proposed by the present invention can be easily applied to an arbitrary physical channel (e.g. PUSCH) capable of transmitting UCI using the same scheme or a similar scheme. For example, an embodiment of the present invention can be applied to a periodic PUSCH structure that periodically transmits control information or an aperiodic PUSCH structure that aperiodically transmits control information.

In the following description, the UCI/RS symbol structure of the existing PUCCH format 1 (normal CP) of LTE is used as a subframe/slot based UCI/RS symbol structure applied to PUCCH format 3 according to an embodiment of the present invention. However, the subframe/slot based UCI/RS symbol structure is exemplary and the present invention is not limited to a specific UCI/RS symbol structure. In PUCCH format 3 according to the present invention, the number of UCI/RS symbols, positions of the UCI/RS symbols, etc. may be freely changed according to system layout. For example, PUCCH format 3 can be defined using the RS symbol structures of PUCCH format 2/2a/2b of LTE.

PUCCH format 3 according to embodiments of the present invention can be used to transmit UCI of an arbitrary type and in an arbitrary size. For example, PUCCH format 3 can transmit information such as ACK/NACK, CQI, PMI, RS, SR, etc. This information may have a payload of an arbitrary size. Description of the following embodiments and drawings are focused on a case in which PUCCH format 3 according to the present invention transmits ACK/NACK information.

Embodiment 1

FIGS. 29a to 29f illustrate structures of PUCCH format 3 and signal processing procedures for the same according to an embodiment of the present invention.

Figure 29A:
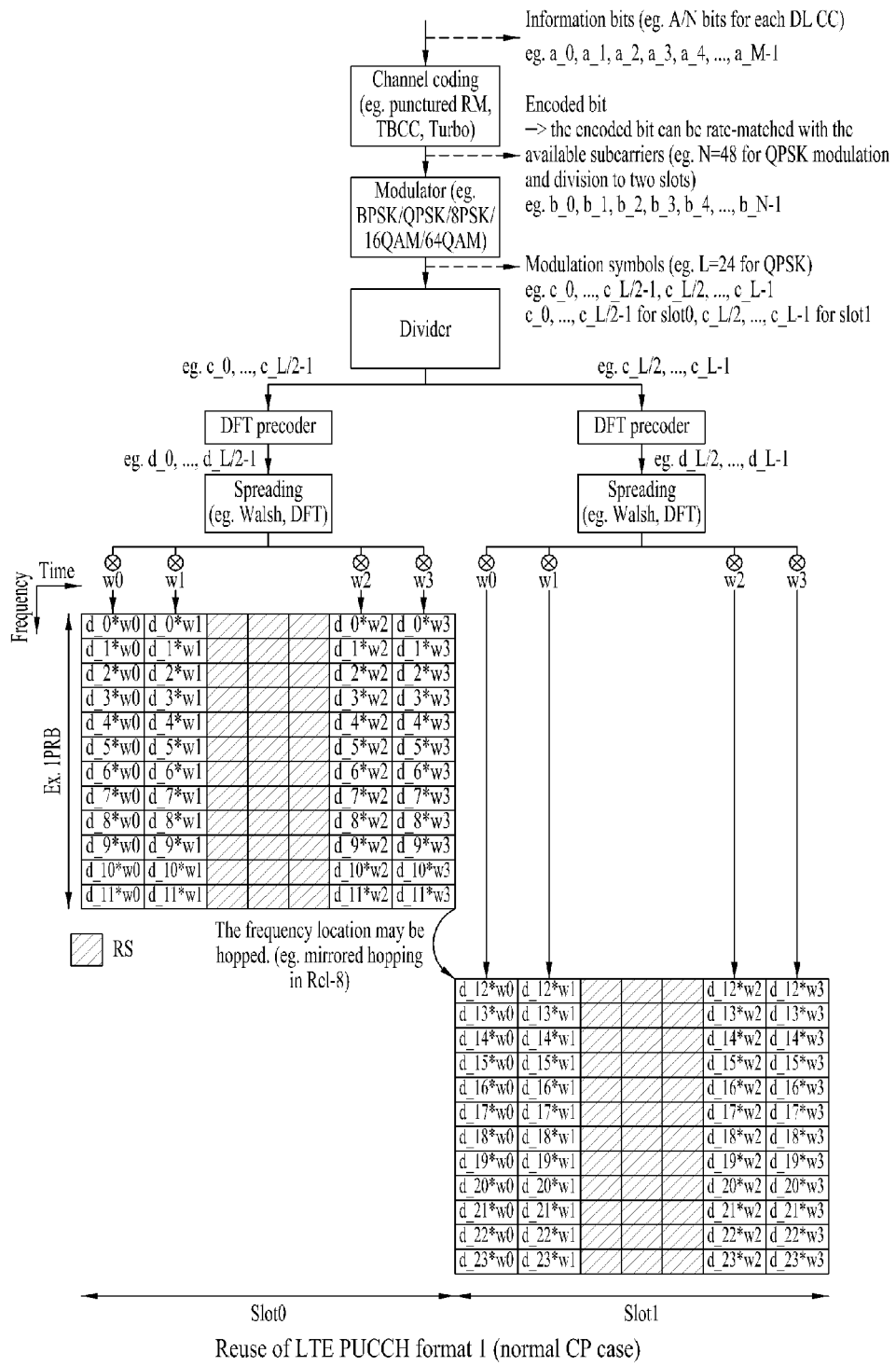
FIGS. 29 and 30 illustrate a PUCCH format and a signal processing procedure for the same according to an embodiment of the present invention.

FIG. 29a illustrates a case in which PUCCH format 3 according to the present invention is applied to PUCCH format 1 (normal CP). Referring to FIG. 29a, a channel coding block channel-codes information bits $a\_0, a\_1, \ldots, a\_M-1$ (e.g. multiple ACK/NACK bits) to generate encoded bits (coded bits or coding bits) (or a codeword) $b\_0, b\_1, \ldots, b\_N-1$. Here, M denotes an information bit size and N denotes an encoded bit size. The information bits include multiple ACK/NACK bits for a plurality pieces of data (or PDSCH) received through a plurality of DL CCs, for example. The information bits a 0, $a\_1, \ldots, a\_M-1$ are joint-coded regardless of the type/number/size of UCI that forms the information bits. For example, when the information bits include multiple ACK/NACK bits for a plurality of DL CCs, channel coding is performed for all information bits instead of each DL CC and each ACK/NACK bit to generate a single codeword. Channel coding includes simple repetition, simplex coding, RM coding, punctured RM coding, Tail-biting convolutional coding (TBCC), low-density parity-check (LDPC) or turbo-coding but is not limited thereto. The encoded bits can be rate-matched in consideration of a modulation order and resource quantity, which is not shown in the figure. The rate matching function may be included in the channel coding block or may be executed through a separate functional block.

A modulator modulates the encoded bits $b\_0, b\_1, \ldots, b\_N-1$ to generate modulation symbols $c\_0, c\_1, \ldots, c\_L-1$ where L denotes the size of the modulation symbols. A modulation method is performed by modifying the size and phase of a transport signal. For example, the modulation method includes n-PSK (Phase Shift Keying) and n-QAM (Quadrature Amplitude Modulation) (n being an integer greater than or equal to 2). Specifically, the modulation method may include BPSK (Binary PSK), QPSK (Quadrature PSK), 8-PSK, QAM, 16-QAM, 64-QAM, etc.

A divider divides the modulation symbols $c\_0, c\_1, \ldots, c\_L-1$ to slots. The order/pattern/scheme of dividing the modulation symbols to slots are not particularly limited. For example, the divider can sequentially divide the modulation symbols to the slots (localized type). In this case, modulation symbols $c\_0, c\_1, \ldots, c\_L/2-1$ can be divided to slot 0 and modulation symbols $c\_L/2, c\_L/2+1, \ldots, c\_L-1$ can be divided to slot 1, as shown in FIG. 29a. Furthermore, the modulation symbols may be interleaved (permuted) when divided to the slots. For example, even-numbered modulation symbols can be divided to slot 0 and odd-numbered modulation symbols can be divided to slot 1. The order of the modulation operation and division operation may be changed.

A DFT precoder performs DFT precoding (e.g. 12-point DFT) for the modulation symbols divided to each slot in order to generate a single carrier waveform. Referring to FIG. 29a, the modulation symbols $c\_0, c\_1, \ldots, c\_L/2-1$ divided to slot 0 can be DFT-precoded into DFT symbols $d\_0, d\_1, \ldots,$ d_L/2−1 and the modulation symbols c_L/2, c_L/2+1, ..., c_L−1 divided to slot 1 can be DFT-precoded into DFT symbols d_L/2, d_L/2+1, ..., d_L−1. DFT precoding can be replaced by other corresponding linear operation (e.g. Walsh precoding).

A spreading block spreads a DFT precoded signal at an SC-FDMA symbol level (time domain). SC-FDMA symbol level time domain spreading is performed using a spreading code (sequence). The spreading code includes a quasi-orthogonal code and an orthogonal code. The quasi-orthogonal code includes a pseudo noise (PN) code. However, the quasi-orthogonal code is not limited thereto. The orthogonal code includes a Walsh code and a DFT code. However, the orthogonal code is not limited thereto. In the following description, the orthogonal code is used as the spreading code for ease of description. However, the orthogonal code is exemplary and can be replaced by the quasi-orthogonal code. A maximum spreading code size (or spreading factor SF) is limited by the number of SC-FDMA symbols used for control information transmission. For example, when 4 SC-FDMA symbols are used for control information transmission in one slot, a (quasi) orthogonal code w0, w1, w2, w3 having a length of 4 can be used for each slot. The SF means a spreading degree of control information and may be related to a UE multiplexing order or an antenna multiplexing order. The SF can be changed to 1, 2, 3, 4, ... according to system requirements and pre-defined between a BS and a UE or signaled to the UE through DCI or RRC signaling. For example, when one of SC-FDMA symbols for control information is punctured in order to transmit an SRS, a spreading code with a reduced SF (e.g. SF=3 instead of SF=4) can be applied to control information of a corresponding slot.

The signal generated through the above-mentioned procedure is mapped to subcarriers in a PRB and then subjected to IFFT to be transformed into a time domain signal. A cyclic prefix is added to the time domain signal to generate SC-FDMA symbols which are then transmitted through an RF unit.

The above-mentioned procedure will now be described in more detail on the assumption that ACK/NACK bits for 5 DL CCs are transmitted. When each DL CC can transmit 2 PDSCHs, ACK/NACK bits for the DL CC may be 12 bits when they include a DTX status. A coding block size (after rate matching) may be 48 bits on the assumption that QPSK and SF=4 time spreading are used. Encoded bits are modulated into 24 QPSK symbols and 12 QPSK symbols are divided per slot. In each slot, 12 QPSK symbols are converted to 12 DFT symbols through 12-point DFT. In each slot, 12 DFT symbols are spread and mapped to 4 SC-FDMA symbols using a spreading code with SF=4 in the time domain. Since 12 bits are transmitted through [2 bits×12 subcarriers×8 SC-FDMA symbols], the coding rate is 0.0625(=12/192). In the case of SF=4, a maximum of 4 UEs can be multiplexed per PRB.

The signal mapped to the PRB in the procedure shown in FIG. 29a may be obtained through various equivalent signal processing procedures. Signal processing procedures equivalent to the signal processing procedure of FIG. 29a will now be described with reference to FIGS. 29b to 29g.

Figure 29B:
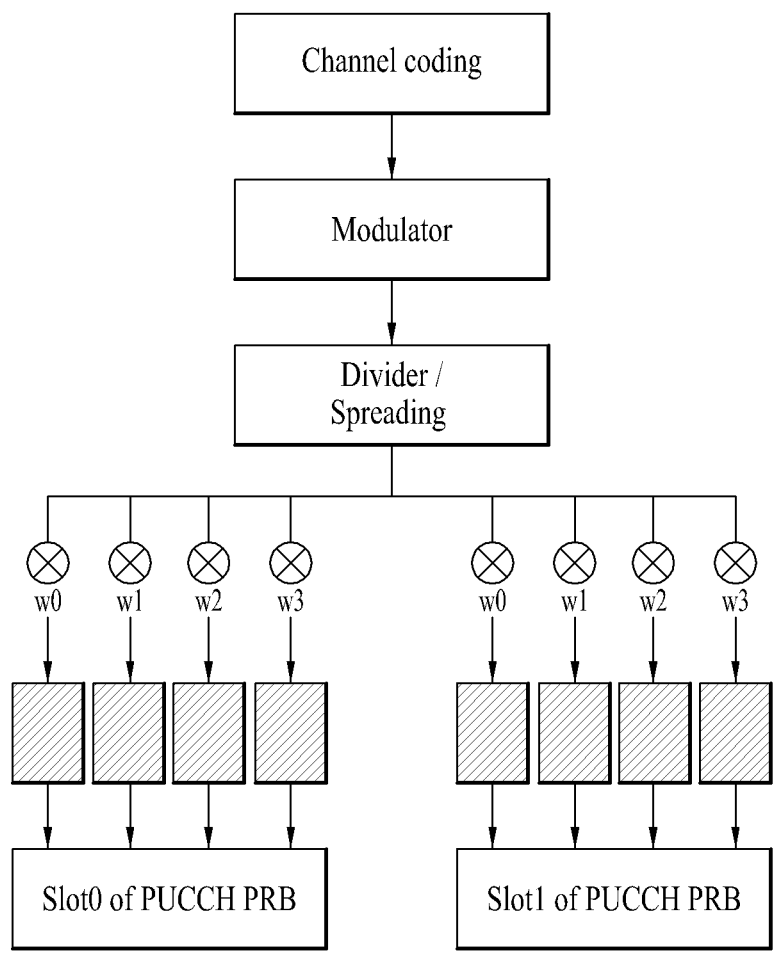

FIG. 29b shows a case in which the order of operations of the DFT precoder and the spreading block of FIG. 29a is changed. The function of the spreading block corresponds to operation of multiplying a DFT symbol sequence output from the DFT precoder by a specific constant at the SC-FDMA symbol level, and thus the same signal value is mapped to SC-FDMA symbols even though the order of operations of the DFT precoder and the spreading block is changed.

Accordingly, the signal processing procedure for PUCCH format 3 can be performed in the order of channel coding, modulation, division, spreading and DFT precoding. In this case, the division and spreading may be performed by one functional block. For example, modulation symbols can be alternately divided to slots and, simultaneously, spread at the SC-FDMA symbol level. Alternatively, the modulation symbols can be copied such that they correspond to the size of a spreading code when divided to the slots, and the copied modulation symbols can be multiplied one-to-one by respective elements of the spreading code. Accordingly, a modulation symbol sequence generated for each slot is spread to a plurality of SC-FDMA symbols. Then, a complex symbol sequence corresponding to the SC-FDMA symbols is DFT-precoded for each SC-FDMA symbol.

Figure 29C:
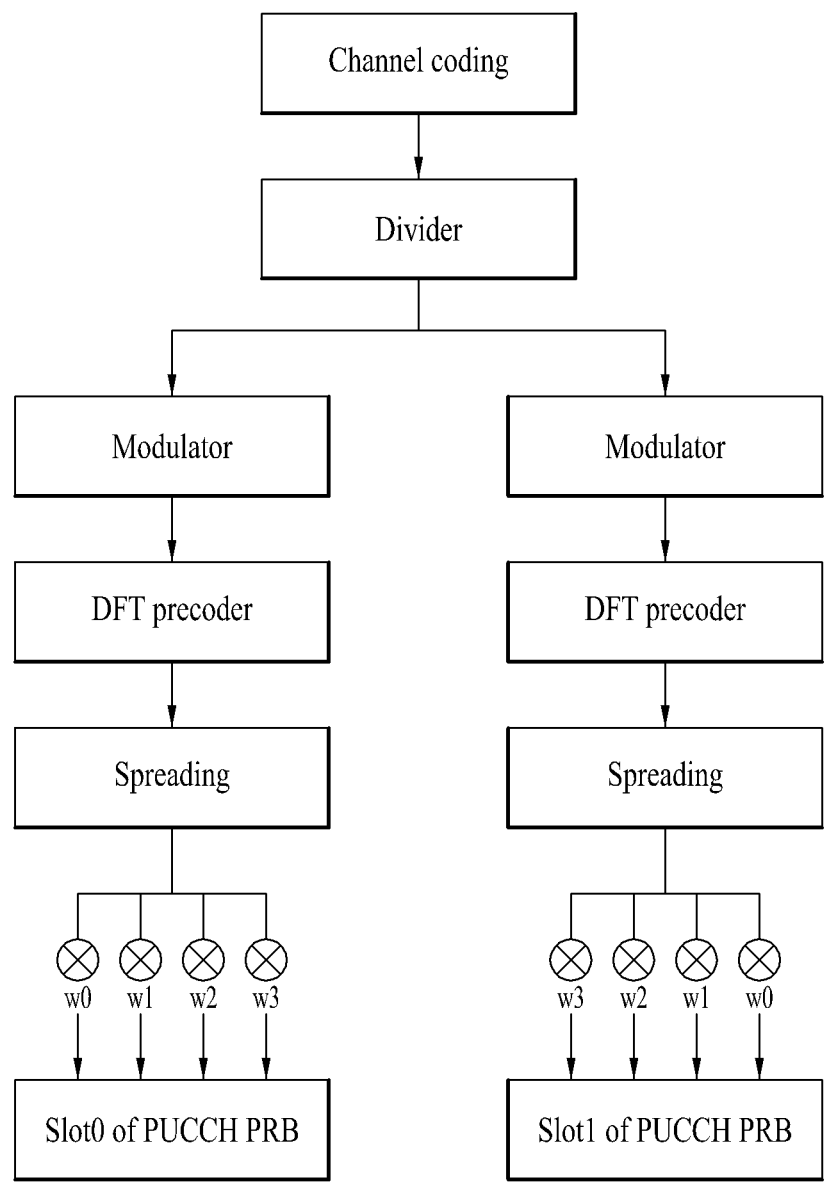

FIG. 29c shows a case in which the order of operations of the modulator and the divider of FIG. 29a is changed. In this case, in the signal processing procedure for PUCCH format 3, joint channel coding and division are performed at the subframe level, and modulation, DFT precoding and spreading are sequentially performed at the slot level.

Figure 29D:
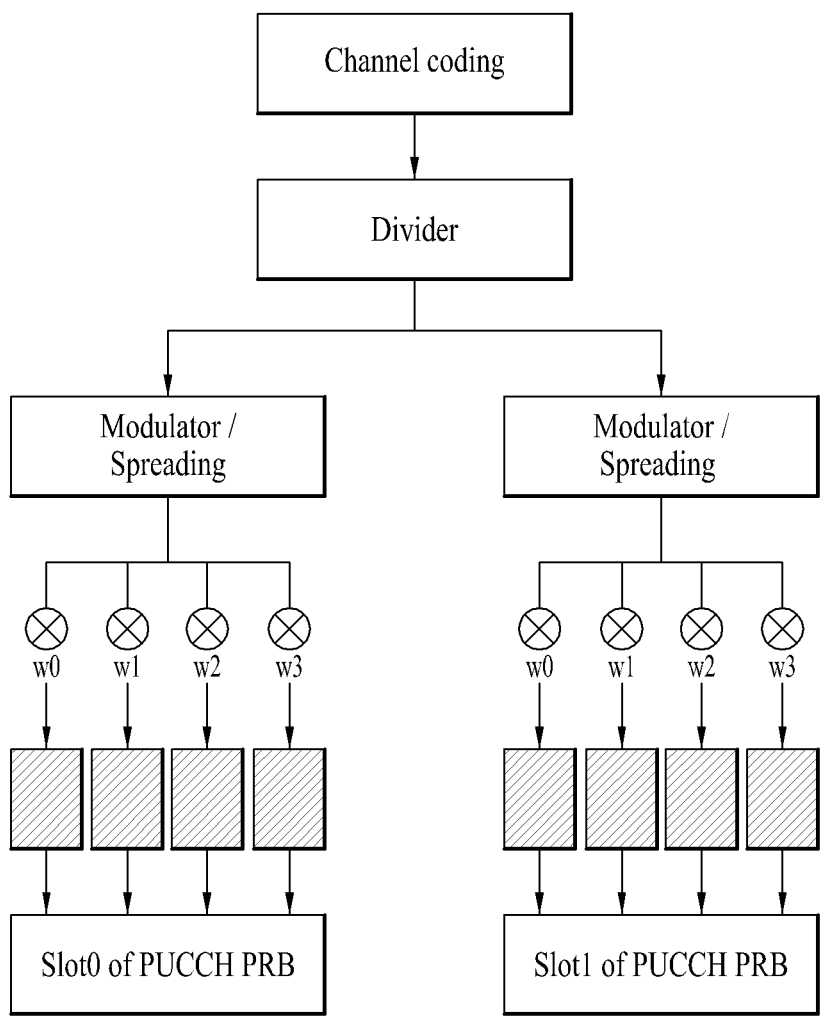

FIG. 29d shows a case in which the order of operations of the DFT precoder and the spreading block of FIG. 29c is changed. As described above, since the function of the spreading block corresponds to operation of multiplying a DFT symbol sequence output from the DFT precoder by a specific constant at the SC-FDMA symbol level, the same signal value is mapped to SC-FDMA symbols even though the order of operations of the DFT precoder and the spreading block is changed. Accordingly, in the signal processing procedure for PUCCH format 3, joint channel coding and division are performed at the subframe level, and modulation is carried out at the slot level. The modulation symbol sequence generated for each slot is spread to a plurality of SC-FDMA symbols and DFT-precoded for each SC-FDMA symbol. In this case, the modulation and spreading operations can be performed by one functional block. For example, the generated modulation symbols can be directly spread at the SC-FDMA symbol level during modulation of the encoded bits. Alternatively, during modulation of the encoded bits, the generated modulation symbols can be copied such that they correspond to the size of the spreading code and multiplied one-to-one by respective elements of the spreading code.

Figure 29E:
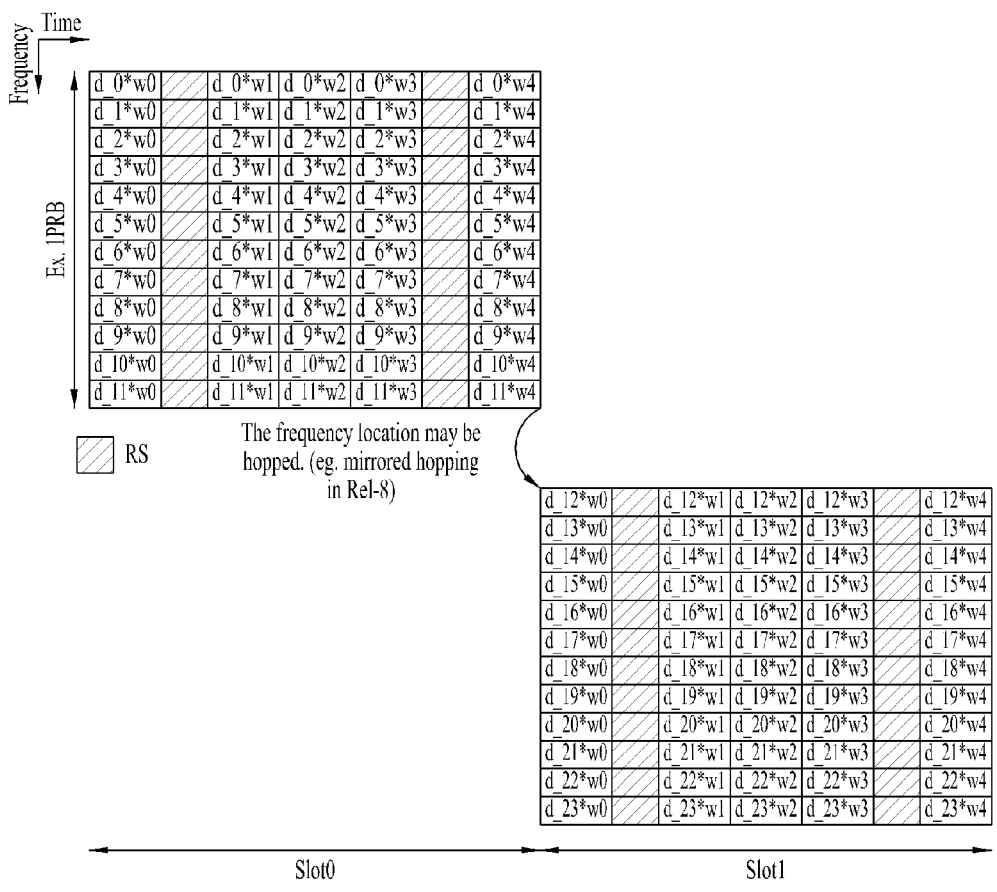
Figure 29F:
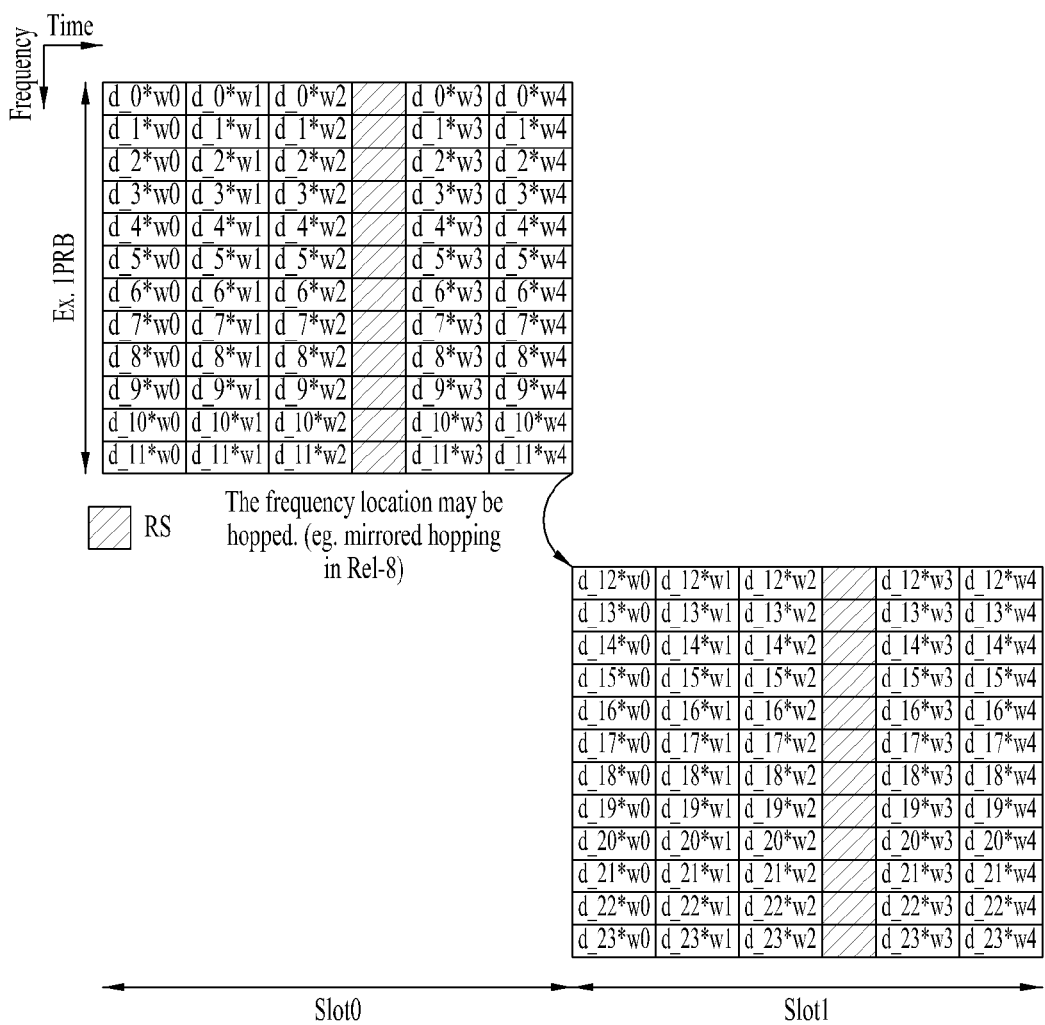

FIG. 29e shows a case in which PUCCH format 3 according to the present embodiment is applied to PUCCH format 2 (normal CP) and FIG. 29f shows a case in which PUCCH format 3 according to the present embodiment is applied to PUCCH format 2 (extended CP). While a basic signal processing procedure is the same as the procedures described with reference to FIGS. 29a to 29d, the numbers/positions of UCI SC-FDMA symbols and RS SC-FDMA symbols are different from those of FIG. 29a since PUCCH format 2 of LTE is reused.

Table 14 shows RS SC-FDMA symbol position in PUCCH format 3. It is assumed that the number of SC-FDMA symbols in a slot is 7 (indexes: 0 to 6) in case of normal CP and 6 (indexes: 0 to 5) in case of extended CP.

TABLE 14

| | RS SC-FDMA symbol position | | |
| --- | --- | --- | --- |
| | Normal CP | Extended CP | Note |
| PUCCH format 3 | 2, 3, 4 | 2, 3 | Reuse PUCCH format 1 |

TABLE 14-continued

| | RS SC-FDMA symbol position | |
|---|---|---|
| Normal CP | Extended CP | Note |
| 1, 5 | 3 | Reuse PUCCH format 2 |

Tables 15 and 16 show exemplary spreading codes according to SF value. Table 15 shows DFT codes with SF=5 and SF=3 and Table 16 shows Walsh codes with SF=4 and SF=2. A DFT code is an orthogonal code represented by $\overline{w}_m=[w_0\ w_1\ \ldots\ w_{k-1}]$, where $w_k=\exp(j2\pi km/SF)$ where k denotes a DFT code size or SF value and m is 0, 1, ..., SF–1. The following tables 15 and 16 show a case in which m is used as an index for an orthogonal code.

TABLE 15

| | Orthogonal code $\overline{w}_m = [w_0\ w_1\ \ldots\ w_{k-1}]$ | |
|---|---|---|
| Index m | SF = 5 | SF = 3 |
| 0 | [1 1 1 1 1] | [1 1 1] |
| 1 | [1 $e^{j2\pi/5}$ $e^{j4\pi/5}$ $e^{j6\pi/5}$ $e^{j8\pi/5}$] | [1 $e^{j2\pi/3}$ $e^{j4\pi/3}$] |
| 2 | [1 $e^{j4\pi/5}$ $e^{j8\pi/5}$ $e^{j2\pi/5}$ $e^{j6\pi/5}$] | [1 $e^{j4\pi/3}$ $e^{j2\pi/3}$] |
| 3 | [1 $e^{j6\pi/5}$ $e^{j2\pi/5}$ $e^{j8\pi/5}$ $e^{j4\pi/5}$] | |
| 4 | [1 $e^{j8\pi/5}$ $e^{j6\pi/5}$ $e^{j4\pi/5}$ $e^{j2\pi/5}$] | |

TABLE 16

| | Orthogonal code | |
|---|---|---|
| Index m | SF = 4 | SF = 2 |
| 0 | [+1 +1 +1 +1] | [+1 +1] |
| 1 | [+1 −1 +1 −1] | [+1 −1] |
| 2 | [+1 +1 −1 −1] | |
| 3 | [+1 −1 −1 +1] | |

Code index m may be designated in advance or signaled from the BS. For example, the code index m can be implicitly linked with a CCE index (e.g. the lowest CCE index) constituting a PDCCH. The code index m may be explicitly designated through a PDCCH or RRC signaling. Furthermore, the code index m may be derived from a value designated through the PDCCH or RRC signaling. The code index m may be independently given on a subframe/slot/multi-SC-FDMA symbol basis. Preferably, the code index m can be changed on a subframe/slot/multi-SC-FDMA symbol basis. That is, the code index m can be hopped at a predetermined interval.

Cell-specific scrambling using a scrambling code (e.g. a PN code such as a Gold code) corresponding to a physical cell ID (PCI) or UE-specific scrambling using a scrambling code corresponding to a UE ID (e.g. RNTI) can be additionally applied for inter-cell interference randomization, which is not shown in the figure. Scrambling may be performed for the entire information, performed in SC-FDMA symbols, carried out between SC-FDMA symbols, or carried out for both the entire information and SC-FDMA symbols. Scrambling the entire information can be achieved by performing scrambling on the information bits, encoded bits and modulation symbols prior to division. Intra-SC-FDMA symbol scrambling may be implemented by performing scrambling on the modulation symbols or DFT symbols after division. Inter-SC-FDMA symbol scrambling may be achieved by carrying out scrambling on the SC-FDMA symbols in the time domain after spreading.

UE multiplexing can be achieved by applying CDM to a signal before being subjected to the DFT precoder. For example, the signal before being subjected to the DFT precoder is a time domain signal, and thus CDM can be implemented through circular shift (or cyclic shift) or Walsh (or DFT) spreading. CDM can be performed for one of the information bits, encoded bits and modulation symbols. Specifically, a case of multiplexing 2 UEs to one SC-FDMA symbol using a Walsh code with SF=2 is exemplified. When QPSK is performed on 12 encoded bits, a complex signal of $a_0\ a_1\ a_2\ a_3\ a_4\ a_5$ is generated. Control information of each UE is spread using Walsh code [+1 +1] [+1 −1] as follows.

UE#0: [+1 +1] is applied. $a_0\ a_1\ a_2\ a_3\ a_4\ a_5\ a_0\ a_1\ a_2\ a_3\ a_4\ a_5$ are transmitted.

UE#1: [+1 −1] is applied. $a_0\ a_1\ a_2\ a_3\ a_4\ a_5\ -a_0\ -a_1\ -a_2\ -a_3\ -a_4\ -a_5$ are transmitted.

In this case, interleaving may be additionally performed. The interleaving may be applied before or after spreading. Both the spreading and interleaving are applied as follows.

UE#0: [+1 +1] is applied. $a_0\ a_0\ a_1\ a_1\ a_2\ a_2\ a_3\ a_3\ a_4\ a_4\ a_5\ a_5$ are transmitted.

UE#1: [+1 −1] is applied. $a_0,\ -a_0,\ a_1,\ -a_1,\ a_2,\ -a_2,\ a_3,\ -a_3,\ a_4,\ -a_4,\ a_5,\ -a_5$ are transmitted.

A signal generated from spreading and/or interleaving in a stage prior to the DFT precoder is subjected to DFT precoding (and additionally subjected to SC-FDMA symbol level time spreading as necessary) and mapped to subcarriers of the corresponding SC-FDMA symbols.

Figure 30:
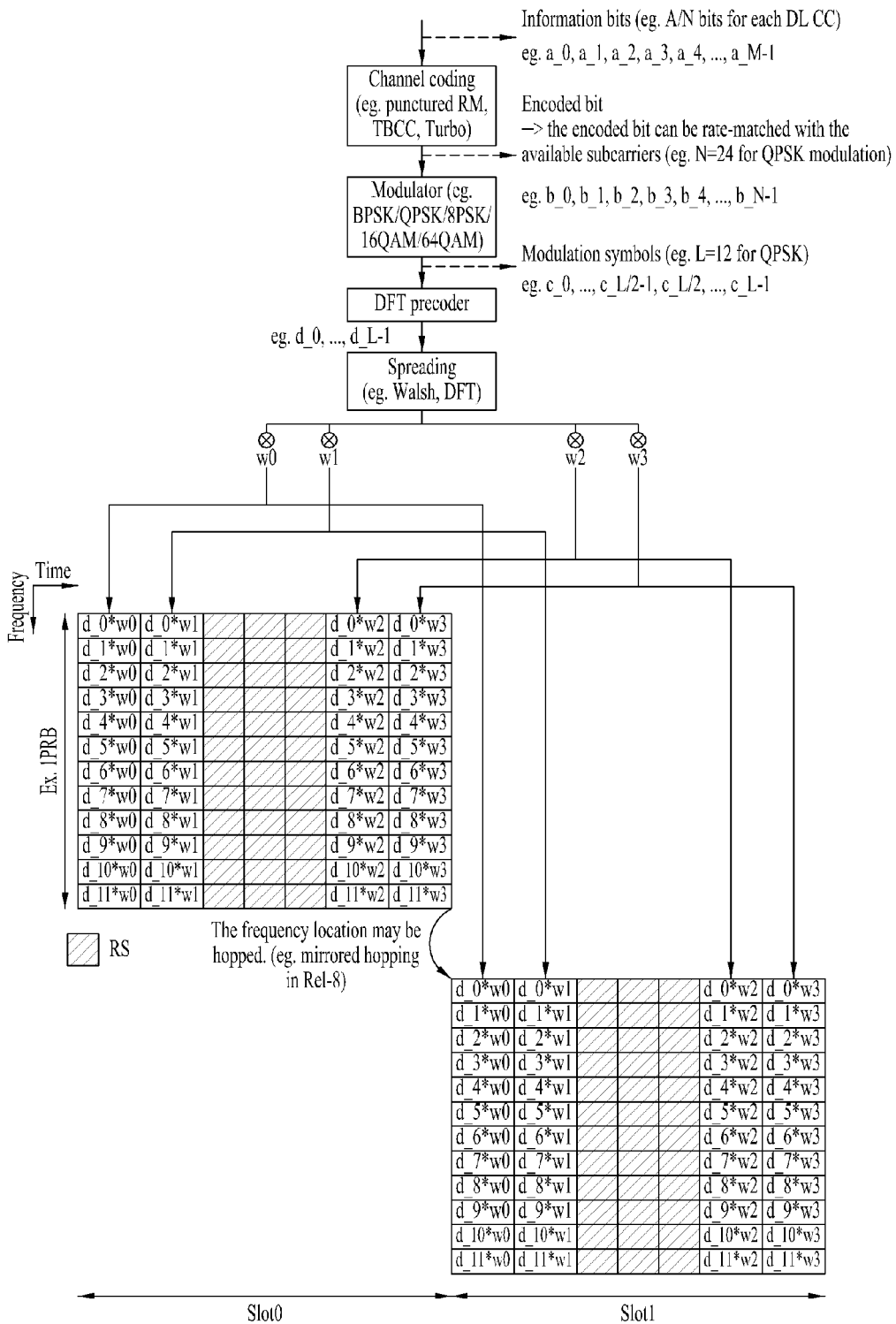

FIG. 30 illustrates another exemplary PUCCH format 3 according to the present embodiment of the invention. While PUCCH format 3 shown in FIG. 30 has the same basic structure as that of the PUCCH format shown in FIG. 29, the PUCCH format of FIG. 30 is distinguished from the PUCCH format of FIG. 29 in that the same encoded bits are repeated on a slot-by-slot basis. Accordingly, a signal processing block shown in FIG. 30 does not include a divider.

A description will be given of methods of allocating a PUCCH resource to a UE on the assumption that multiple ACK/NACK bits are transmitted for data received through a plurality of DL CCs. For convenience of description, the PUCCH resource includes a resource for control information transmission and/or a resource for RS transmission and it is assumed that a (quasi) orthogonal resource for control information transmission is referred to as resource A and a (quasi) orthogonal resource for RS transmission is referred to as resource B. Resource A includes at least one of a PRB index and a spreading code (e.g. Walsh code) index. One representative logical index may be given for resource A and the PRB index and spreading code index may be derived from the representative logical index. Resource B includes at least one of a PRB index, a circular shift index and an orthogonal cover index. One representative logical index may be given for resource B, and the PRB index, circular shift index and orthogonal cover index may be inferred from the representative logical index. The logical indexes of resource A and resource B may be linked with each other. Furthermore, indexes of resources constituting resource A and resource B may be linked with each other. Alternatively, a separate (representative) PUCCH resource index may be defined and linked with resource A and/or resource B. That is, resource A and/or resource B may be inferred from the separate PUCCH resource index.

A first resource allocation method signals both resource A and resource B. For example, both resource A and resource B can be signaled through physical control channel (e.g. PUCCH) or RRC signaling. In this case, the resource A index for control information transmission and the resource B index for RS transmission may be respectively signaled or only one thereof may be signaled. For example, if RS format and indexing conform to LTE, only resource B index for RS transmission can be signaled. Because it is preferable to transmit control information in the same PRB as that of the RS, the PRB index for the control information may be derived from the resource B index for the RS and the control information may be transmitted through a PRB corresponding to the PRB index. The orthogonal code index used for the control information may be derived from the orthogonal cover index or circular shift index used for the RS. Alternatively, it is possible to signal an additional PUCCH resource index and infer resource A and/or resource B from the additional PUCCH resource index. That is, when the additional PUCCH resource index is given, the PRB and/or the orthogonal cover index for the control information and the PRB, orthogonal cover index and/or circular shift index for the RS can be inferred from the additional PUCCH resource index.

To reduce signaling overhead and resources, a plurality of candidate PUCCH resources (indexes) can be signaled to a UE or a UE group through higher layer signaling (e.g. RRC signaling) and a specific PUCCH resource (index) can be indicated through a physical control channel (e.g. PUCCH). As described above, a PUCCH resource (index) can be given as [resource A index and resource B index], [resource A index or resource B index] or [separate PUCCH resource index]. Specifically, the PUCCH resource index can be signaled through a PDCCH of a DL secondary CC. When carrier aggregation is applied, transmit power control (TPC) of a DL secondary CC need not be used because a PUCCH is transmitted through the UL primary CC only. Accordingly, the PUCCH resource (index) can be signaled through a TPC field of a PDCCH transmitted through a DL secondary CC.

A second resource allocation method reuses the implicit method of LTE in case of dynamic ACK/NACK resource allocation. For example, a resource index that corresponds to a lowest CCE index of a PDCCH corresponding to a DL grant of a specific DL CC (e.g. primary DL CC) and conforms to LTE rule ($n_r=n_{cce}+N\_PUCCH^{(1)}$) can be inferred. Here, $n_r$ denotes the resource A (and/or resource B) index, $n_{cce}$ denotes the lowest CCE index constituting the PDCCH, and $N\_PUCCH^{(1)}$ denotes a value set by a higher layer. For example, the RS can use a resource corresponding to the inferred resource index. In the case of control information, the PRB index can be derived from the inferred resource index and ACK/NACK information for a plurality of DL CCs can be transmitted using a corresponding resource (e.g. spreading code) in the PRB corresponding to the PRB index. When the resource index corresponding to the RS is inferred from the resource index corresponding to the control information, the circular shift index used for the RS cannot be derived from the resource index corresponding to the control information because the resource corresponding to the circular shift index from among RS resources (e.g. a combination of the circular shift, orthogonal cover and PRB index) is not used for the control information. In this case, the circular shift index of the RS resource can be assumed to be a specific value (e.g. $n_{cs}=0$).

A scheme of transmitting a PUCCH using a multi-antenna transmission method will now be described. While 2Tx transmit diversity scheme is described in the following embodiment, the embodiment can be equally/similarly applied to an n-Tx transmit diversity scheme. It is assumed that a (quasi) orthogonal resource for control information transmission is referred to as resource A and a (quasi) orthogonal resource for RS transmission is referred to as resource B. Logical indexes of resource A and resource B may be liked with each other. For example, if the logical index of resource B is given, the logical index of resource A can be automatically provided. The logical indexes of resource A and resource B may be configured through different physical configuration methods. The following two cases are present.

1) Control information can be transmitted through the same PRB at all antennas (ports).

A. The control information can be transmitted through two different resources A (e.g. Walsh or DFT codes with different indexes) selected for each antenna (port).

B. An RS can be transmitted through two different resources B (e.g. a combination of a circular shift and a DFT cover) selected for each antenna (port).

2) The control information can be transmitted through different PRBs for antennas. For example, the control information can be transmitted through PRB#4 at antenna (port) 0 and transmitted through PRB#6 at antenna (port) 1.

A. Resources for the control information transmitted through different antennas (ports) are not particularly limited (i.e. the resources can be equal to and different from each other).

B. Resources for RSs transmitted through different antennas (ports) are not particularly limited (i.e. the resources can be equal to and different from each other).

In a multi-antenna transmit (e.g. 2Tx transmit) mode, two resources A (e.g. orthogonal codes) for control information transmission and two resources B (e.g. a combination of a circular shift and a DFT cover) for RS transmission can be defined in advance or provided through physical control channel (e.g. PDCCH)/RRC signaling. In this case, signaling for the control information and signaling for the RS can be individually performed. When resource information for one antenna (port) is signaled, resource information for the other antenna (port) can be inferred from the previously signaled resource information. For example, the spreading code index m for the control information can be designated in advance or signaled from the BS. Otherwise, the spreading code index m can be implicitly linked with a CCE index that configures a PDCCH. Or, the spreading code index m can be explicitly designated through PDCCH or RRC signaling. The spreading code index m can be linked with the orthogonal code index or circular shift index for the RS. The spreading code index m can be changed on a subframe/slot/multi-SC-FDMA symbol basis. That is, the spreading code index m can be hopped in the unit of a specific interval (e.g. slot).

Embodiment 2

Figure 31:
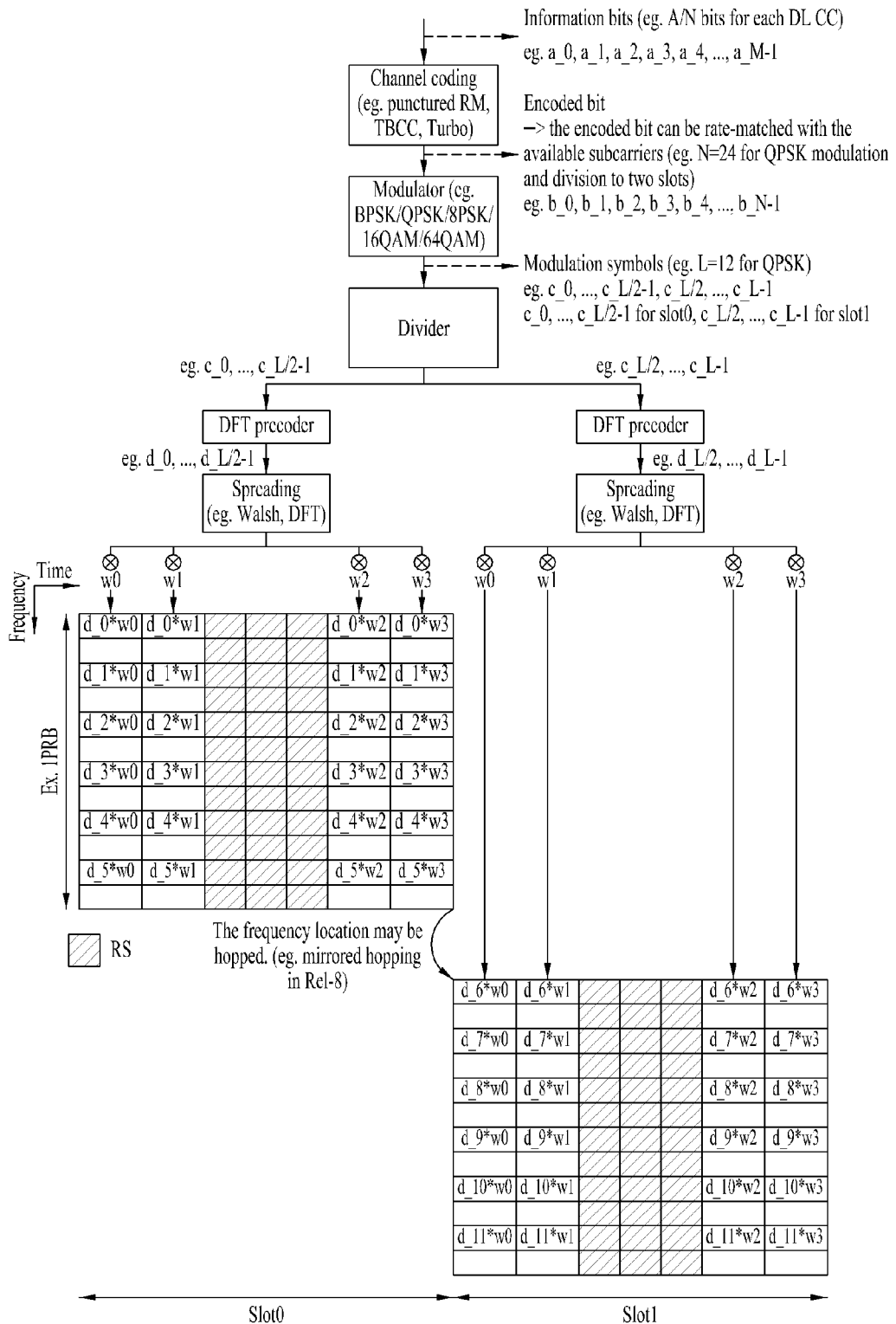
FIGS. 31 to 34 illustrate a PUCCH format and a signal processing procedure for the same according to another embodiment of the present invention.
Figure 32:
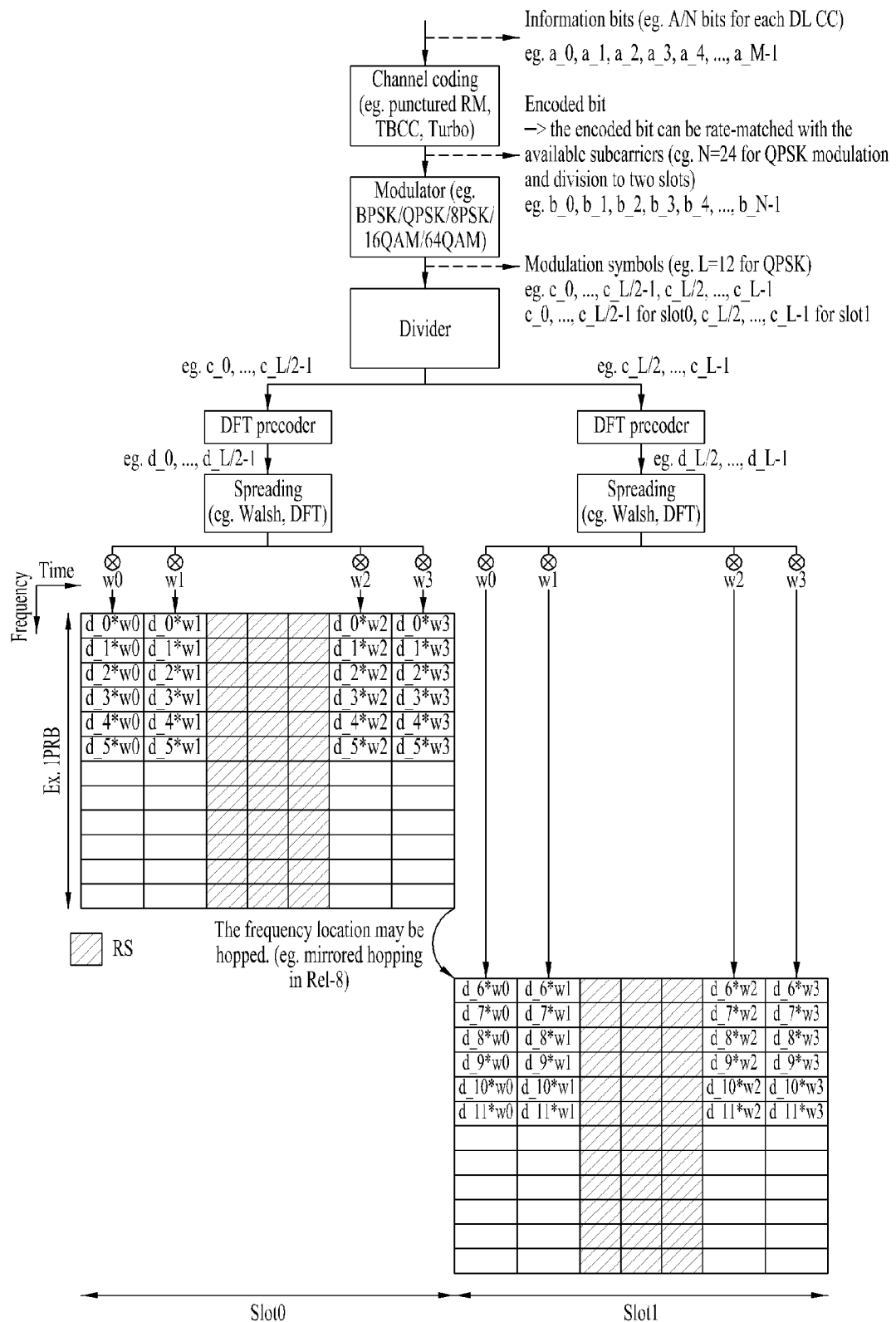

FIGS. 31 and 32 illustrate structures of PUCCH format 3 and signal processing procedures for the same according to another embodiment of the present invention. In the present embodiment, control information is FDM-mapped to the frequency domain according to interleaving and local schemes. FDM mapping can be used for UE multiplexing or antenna (port) multiplexing. The present embodiment can be applied to CDM mapping using time/frequency domain cyclic shift.

Referring to FIG. 31, a channel coding block channel-codes information bits a_0, a_1, . . . , a_M−1 (e.g. multiple ACK/NACK bits) to generate encoded bits (coded bits or coding bits) (or a codeword) b_0, b_1, . . . , b_N−1. Here, M denotes an information bit size and N denotes an encoded bit size.

The information bits include UCI, e.g. multiple ACK/NACK bits. The information bits a_0, a_1, . . . , a_M−1 are joint-coded regardless of the type/number/size of UCI that forms the information bits. For example, when the information bits include multiple ACK/NACK bits for a plurality of DL CCs, channel coding is performed for all information bits instead of each DL CC and each ACK/NACK bit to generate a single codeword. Channel coding includes simple repetition, simplex coding, RM coding, punctured RM coding, Tail-biting convolutional coding (TBCC), low-density parity-check (LDPC) or turbo-coding. However, channel coding is not limited thereto. The encoded bits can be rate-matched in consideration of a modulation order and resource quantity, which is not shown in the figure. The rate matching function may be included in the channel coding block or may be executed through a separate functional block.

A modulator modulates the encoded bits $b\_0, b\_1, \ldots, b\_N-1$ to generate modulation symbols $c\_0, c\_1, \ldots, c\_L-1$ where L denotes the size of the modulation symbols. A modulation method is performed by modifying the size and phase of a transport signal. For example, the modulation method includes n-PSK and n-QAM (n being an integer greater than or equal to 2). Specifically, the modulation method may include BPSK, QPSK, 8-PSK, QAM, 16-QAM, 64-QAM, etc.

A divider divides the modulation symbols $c\_0, c\_1, \ldots, c\_L-1$ to slots. The order/pattern/scheme of dividing the modulation symbols to slots are not particularly limited. For example, the divider can sequentially divide the modulation symbols to the slots (localized type). In this case, modulation symbols $c\_0, c\_1, \ldots, c\_L/2-1$ can be divided to slot 0 and modulation symbols $c\_L/2, c\_L/2+1, \ldots, c\_L-1$ can be divided to slot 1, as shown in FIG. 31. Furthermore, the modulation symbols may be interleaved (or permuted) when divided to the slots. For example, even-numbered modulation symbols can be divided to slot 0 and odd-numbered modulation symbols can be divided to slot 1. The order of the modulation operation and division operation may be changed.

A DFT precoder performs DFT precoding (e.g. 6-point DFT) for the modulation symbols divided to each slot in order to generate a single carrier waveform. Referring to FIG. 31, the modulation symbols $c\_0, c\_1, \ldots, c\_L/2-1$ divided to slot 0 can be DFT-precoded into DFT symbols $d\_0, d\_1, \ldots, d\_L/2-1$ and the modulation symbols $c\_L/2, c\_L/2+1, \ldots, c\_L-1$ divided to slot 1 can be DFT-precoded into DFT symbols $d\_L/2, d\_L/2+1, \ldots, d\_L-1$. DFT precoding can be replaced by a corresponding linear operation (e.g. Walsh precoding).

A spreading block spreads a DFT precoded signal at an SC-FDMA symbol level (time domain). SC-FDMA symbol level time domain spreading is performed using a spreading code (sequence). The spreading code includes a quasi-orthogonal code and an orthogonal code. The orthogonal code includes a Walsh code and a DFT code. However, the orthogonal code is not limited thereto. A maximum spreading code size (or spreading factor SF) is limited by the number of SC-FDMA symbols used for control information transmission. For example, when 4 SC-FDMA symbols are used for control information transmission in one slot, a (quasi) orthogonal code w0, w1, w2, w3 having a length of 4 can be used for each slot. The SF means a spreading degree of control information and may be related to a UE multiplexing order or an antenna multiplexing order. The SF can be changed to 1, 2, 3, 4, . . . according to system requirements and pre-defined between a BS and a UE or signaled to the UE through DCI or RRC signaling. For example, when an SC-FDMA symbol for transmitting control information is punctured according to an SRS, a spreading code with SF=3 can be applied to control information of a corresponding slot. Examples of the spreading code may refer to Tables 15 and 16.

The signal generated through the above-mentioned procedure is mapped to subcarriers in a PRB. Distinguished from the first embodiment, the spread signal is non-contiguously mapped to the subcarriers in SC-FDMA symbols in the second embodiment. FIG. 31 shows a case in which the spread signal is mapped in the SC-FDMA symbols in an interleaving manner and FIG. 32 shows a case in which the spread signal is mapped in the SC-FDMA symbols in a localized manner. The frequency domain signal mapped to the subcarriers is transformed to a time domain signal through IFFT. A CP is added to the time domain signal to generate SC-FDMA symbols which are then transmitted through an RF unit.

The above-mentioned procedure will now be described in more detail on the assumption that ACK/NACK bits for 5 DL CCs are transmitted. When each DL CC can transmit 2 PDSCHs, ACK/NACK bits for the DL CC may be 12 bits when they include a DTX status. A coding block size (after rate matching) may be 24 bits on the assumption that QPSK, SF=4 time spreading and non-contiguous mapping are used. Encoded bits are modulated into 12 QPSK symbols after being subjected to QPSK and 6 QPSK symbols are divided per slot. In each slot, 6 QPSK symbols are converted to 6 DFT symbols through 6-point DFT. In each slot, 6 DFT symbols are spread and mapped to 4 SC-FDMA symbols using a spreading code with SF=4 in the time domain. Since 12 bits are transmitted through [2 bits×6 subcarriers×8 SC-FDMA symbols], the coding rate for ACK/NACK information is 0.125(=12/96). In the case of SF=4, a maximum of 8 UEs can be multiplexed per PRB.

If a subcarrier interval is changed from 2 blocks to 3 blocks when the DFT symbols are mapped to the frequency domain, a maximum of 12 UEs can be multiplexed. When the subcarrier interval is set to 4/6 blocks, a maximum of 16/24 UEs can be multiplexed. Here, the RS can employ the DFT code with SF=3 and circular shift used in LTE. In the case of a Walsh code with SF=4 in LTE, [1 1 −1 −1] is not used because the multiplexing order is limited by SF=3 of the RS. However, the present invention can define [1 1 −1 −1] such that it can be reused.

Cell-specific scrambling using a scrambling code (e.g. a PN code such as a Gold code) corresponding to a physical cell ID (PCI) or UE-specific scrambling using a scrambling code corresponding to a UE ID (e.g. RNTI) can be additionally applied for inter-cell interference randomization, which is not shown in the figure. Scrambling may be performed for the entire information, performed in SC-FDMA symbols, carried out between SC-FDMA symbols, or carried out for both the entire information and SC-FDMA symbols. Scrambling the entire information can be achieved by performing scrambling on the information bits, encoded bits and modulation symbols prior to division. Intra-SC-FDMA symbol scrambling may be implemented by performing scrambling on the modulation symbols or DFT symbols after division. Inter-SC-FDMA symbol scrambling may be achieved by carrying out scrambling on the SC-FDMA symbols in the time domain after spreading.

UE multiplexing can be achieved by applying CDM to a signal before being subjected to the DFT precoder. For example, the signal before being subjected to the DFT precoder is a time domain signal, and thus CDM can be implemented through circular shift (or cyclic shift) or Walsh (or DFT) spreading. CDM can be performed for one of the information bits, encoded bits and modulation symbols. Specifically, a case of multiplexing 2 UEs to one SC-FDMA symbol using a Walsh code with SF=2 is exemplified. When QPSK is performed on 6 encoded bits, a complex signal of $a_0, a_1, a_2$ is generated. Control information of each UE is spread using Walsh code [+1 +1] [+1 −1] as follows.

UE#0: [+1 +1] is applied. $a_0, a_1, a_2, a_0, a_1, a_2$ are transmitted.

UE#1: [+1 −1] is applied. $a_0, a_1, a_2, -a_0, -a_1, -a_2$ are transmitted.

In this case, interleaving may be additionally performed. The interleaving may be applied before or after spreading. Both the spreading and interleaving are applied as follows.

UE#0: [+1 +1] is applied. $a_0, a_0, a_1, a_1, a_2, a_2$ are transmitted.

UE#1: [+1 −1] is applied. $a_0, -a_0, a_1, -a_1, a_2, -a_2$ are transmitted.

Figure 33:
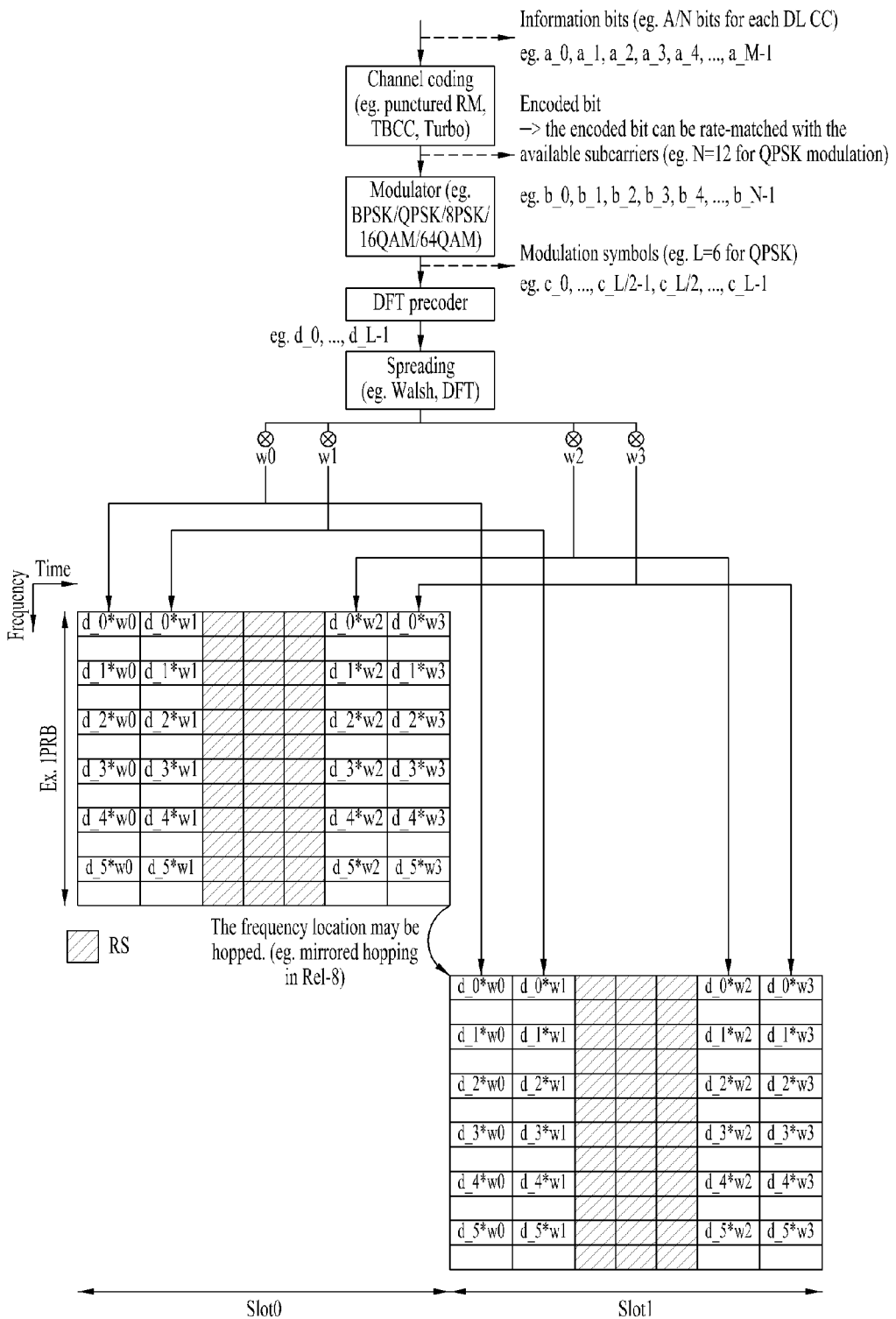
Figure 34:
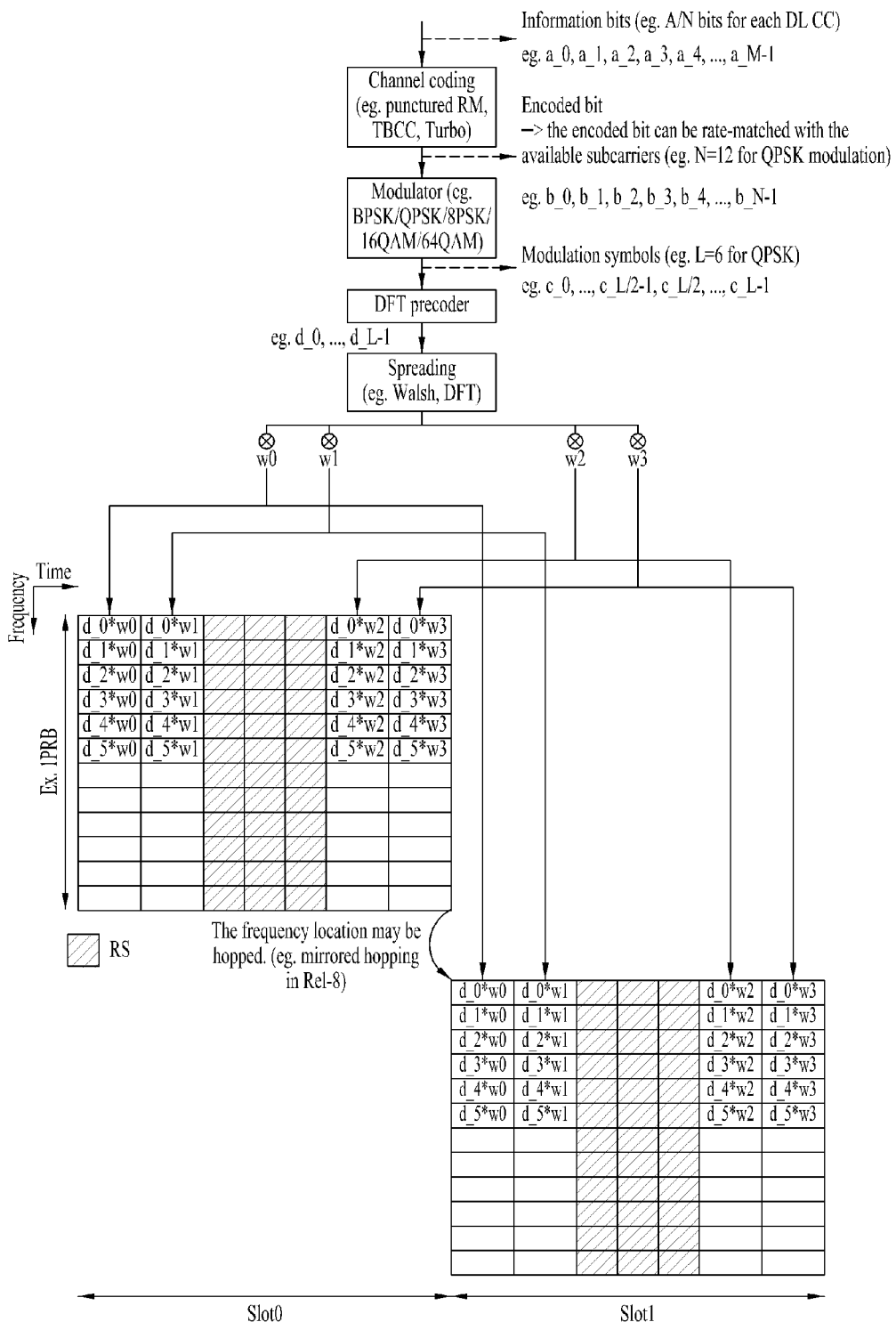

FIGS. 33 and 34 illustrate another exemplary structure of PUCCH format 3 according to the present embodiment of the invention. While the structures of PUCCH format 3 shown in FIGS. 33 and 34 have the same basic structure as those of PUCCH format 3 shown in FIGS. 31 and 32, the PUCCH format of FIGS. 33 and 34 is distinguished from the PUCCH format of FIGS. 31 and 32 in that the same encoded bits are repeated on a slot-by-slot basis. Accordingly, a signal processing block shown in FIGS. 33 and 34 does not include a divider.

A description will be given of methods of allocating a PUCCH resource to a UE on the assumption that multiple ACK/NACK bits are transmitted for data received through a plurality of DL CCs. For convenience of description, it is assumed that a (quasi) orthogonal resource for control information transmission is referred to as resource A and a (quasi) orthogonal resource for RS transmission is referred to as resource B. Resource A includes at least one of a PRB index, a spreading code (e.g. Walsh code) index and a subcarrier shift (or offset or index) according to frequency factor. One representative logical index may be given for resource A and the PRB index, spreading code index and a subcarrier shift (or offset or index) according to frequency factor may be derived from the representative logical index. Resource B includes at least one of a PRB index, a circular shift index and an orthogonal cover index. One representative logical index may be given for resource B, and the PRB index, circular shift index and orthogonal cover index may be inferred from the representative logical index. The logical indexes of resource A and resource B may be linked with each other. Furthermore, indexes of resources constituting resource A and resource B may be linked with each other.

A first resource allocation method signals both resource A and resource B. For example, both resource A and resource B can be signaled through physical control channel (e.g. PUCCH) or RRC signaling. In this case, the resource A index for control information transmission and the resource B index for RS transmission may be respectively signaled or only one thereof may be signaled. For example, if RS format and indexing conform to LTE, only resource B index for RS transmission can be signaled. Because it is preferable to transmit control information in the same PRB as that of the RS, the PRB index for the control information may be derived from the resource B index for the RS and the control information may be transmitted through a PRB corresponding to the PRB index. The orthogonal code index used for the control information may be derived from the orthogonal cover index used for the RS. The subcarrier shift (or offset or index) according to frequency factor for resource A may be inferred from the circular shift index used for the RS. Alternatively, the subcarrier shift (or offset or index) according to frequency factor for resource A may be RRC signaled. Here, the frequency factor (or linear operation corresponding thereto, e.g. the reciprocal of the frequency factor) can be RRC signaled or implicitly determined on the basis of the number of DL CCs. That is, the frequency factor can be configured by the system or previously designated.

FDM mapping can also be applied to the RS. The RS can be directly generated in the frequency domain without a DFT precoder (i.e. the DFT precoder can be omitted) because a previously designated low-CM sequence is used whereas a low PAPR/CM signal is generated using DFT precoding in the case of control information. However, it may be technically preferable to apply CDM mapping using circular shift to the RS rather than FDM mapping for the following reason.

Design of sequences with various lengths is required when FDM mapping is used for the RS. That is, a new sequence with a length of 6 is needed when a frequency factor (FF) (or subcarrier interval) is 2 although a minimum sequence length for the RS is 12 in LTE.

When FDM mapping is used for the RS, channel estimation performance may be deteriorated in a high frequency selective channel because a channel of a specific frequency position is estimated and interpolation is performed on other positions. However, the channel estimation performance is not deteriorated because the RS covers all frequency regions in the case of CDM mapping.

A second resource allocation method reuses the implicit method of LTE in case of dynamic ACK/NACK resource allocation. For example, a resource index that corresponds to a lowest CCE index of a PDCCH corresponding to a DL grant of a specific DL CC (e.g. primary DL CC) and conforms to LTE rule ($n_r=n_{cce}+N\_PUCCH^{(1)}$) can be inferred. Here, $n_r$ denotes the resource A (and/or resource B) index, $n_{cce}$ denotes the lowest CCE index constituting the PDCCH, and $N\_PUCCH^{(1)}$) denotes a value set by a higher layer. For example, the RS can use a resource corresponding to the inferred resource index. In the case of control information, the PRB index can be derived from the inferred resource index and ACK/NACK information for a plurality of DL CCs can be transmitted using a corresponding resource (e.g. spreading code and/or subcarrier shift (or offset or index) according to frequency factor) in the PRB corresponding to the PRB index. When the resource index corresponding to the RS is inferred from the resource index corresponding to the control information, the circular shift index used for the RS cannot be derived from the resource index corresponding to the control information because the resource corresponding to the circular shift index from among RS resources (e.g. a combination of the circular shift, orthogonal cover and PRB index) is not used for the control information. In this case, the circular shift index of the RS resource can be assumed to be a specific value (e.g. $n_{cs}=0$).

FIGS. 35 to 41 illustrate a method of defining a resource index according to an embodiment of the present invention. FIGS. 35 and 41 show a case in which a resource index (i.e. resource A index) for control information is defined as a combination of a subcarrier mapping pattern/position (e.g. subcarrier index of offset) and a spreading code (e.g. orthogonal code). When a PRB for RS transmission is confirmed, a PRB for control information transmission can be set as the PRB for RS transmission. Otherwise, the PRB for control information transmission can be signaled through physical control channel (e.g. PDCCH)/RRC signaling. In the present embodiment, a subcarrier shift (or offset or index) according to frequency factor for the control information can be inferred from the circular shift index of the RS. Otherwise, the subcarrier shift (or offset or index) according to frequency factor can be RRC signaled. Here, the frequency factor can be RRC signaled or implicitly determined on the basis of the number of DL CCs. That is, the frequency factor can be configured by the system or previously designated. In this case, a representative index for indicating a combination (e.g. [PRB, spreading code] or [PRB, spreading code, frequency factor]) of detailed resources may not be separately defined in a channel resource for the control information.

Referring to FIGS. 35 to 41, numerals in boxes mean resource indexes (i.e. resource A indexes for control information transmission). In the present embodiment, resource indexes for the control information are linked with [orthogonal code indexes, subcarrier shifts (or offsets or indexes)]. Accordingly, the control information is spread at the SC-FDMA symbol level using an orthogonal code corresponding to resource indexes and mapped to subcarriers corresponding to the resource indexes. While the resource indexes are counted in ascending order of frequency resource (subcarrier index) in FIGS. 35 to 41, the resource indexes may be counted on the basis of the orthogonal code index axis. FIGS. 35b, 36b, 37b, 38b, 39b and 40b show that resource indexing for the control information is limited by an RS multiplexing order. For example, if the RS multiplexing order is 3 and a Walsh code with SF=4 is used for control information transmission, [+1 +1 −1 −1] (resource index 3) may not be used, as in LTE.

The resource indexes may be relative values (e.g. offset). For example, PUCCH format 2/2a/2b may be transmitted through the outermost portion of a band, 1 PRB in which PUCCH formats 1/1a/1b and 2/2a/2b coexist may be located inside the outermost portion of the band, and PUCCH format 1/1a/1b may be transmitted through a portion inside the portion where PUCCH formats 1/1a/1b and 2/2a/2b coexist in LTE. When a PRB for PUCCH format 1/1a/1b and a PRB for PUCCH format 2/2a/2b are present together (only one PRB is allowed in LTE), if the number of ACK/NACK resources is M in the corresponding PRBs, n represents M+n. Here, each frequency resource (e.g. frequency factor) or orthogonal code index can be cell-specifically/UE-specifically hopped at the SC-FDMA symbol level/slot level.

FIG. 41 illustrates a case in which orthogonal resource indexes are staggered for each orthogonal code index or circularly shifted along the frequency axis. In this case, the resource indexes in FIG. 37a are staggered on a subcarrier-by-subcarrier basis for each orthogonal code index. Circular shifts or orthogonal code indexes can be cell-specifically/UE-specifically hopped at the SC-FDMA symbol level/slot level.

FIG. 42 illustrates a resource indexing method for an RS. Resource indexing for an RS may conform to the method defined in LTE.

Referring to FIG. 42, numerals in boxes denote resource indexes (i.e. indexes of resource B for RS transmission). In this example, the resource indexes for the RS are linked with [circular shift values, orthogonal code indexes]. Accordingly, an RS sequence is circular-shifted by a value corresponding to a resource index along the frequency axis and covered in the time domain with an orthogonal code corresponding to the resource index. In FIG. 42, $\Delta_{shift}^{PUCCH}$ denotes a circular shift interval and a used circular shift value may be $c \cdot \Delta_{shift}^{PUCCH}$ (c being a positive integer). A phase shift value according to a circular shift can be given as $\alpha(n_s,l)=2\pi \cdot n_{cs}(n_s,l)/N_{sc}^{RB}$ where $n_s$ is a slot index, $l$ is an SC-FDMA symbol index, $n_{cs}(n_s,l)$ is a circular shift value, and $N_{sc}^{RB}$ denotes the number of subcarriers that form a resource block.

In this example, the resource indexes for the RS are counted first along the circular shift axis. However, the resource indexes may be counted first along the orthogonal code axis.

$\Delta_{shift}^{PUCCH}$ of the RS and the frequency factor (or a linear operation corresponding to the frequency factor, e.g. the reciprocal of the frequency factor) can be signaled through physical control channel (e.g. PDCCH) or RRC signaling.

Resource indexing for the control information may correspond to resource indexing for the RS. In this case, only one of the control information resource index and RS resource index may be signaled to a UE through physical control channel (e.g. PDCCH)/RRC signaling and the other may be inferred from the resource index signaled to the UE. For example, the frequency factor can be inferred from information (e.g. the circular shift interval) about circular shift used in the RS. If conventional $\Delta_{shift}^{PUCCH}$ signaling is shift reused, both $\Delta_{shift}^{PUCCH}$ for the RS and the frequency factor (interval) for the control information can be designated through one-time $\Delta_{shift}^{PUCCH}$ signaling. Specifically, resource indexing shown in FIG. 42 can be linked with resource indexing shown in FIGS. 35b, 36b, 37b, 38b, 39b and 40b.

shift Table 17 shows an example of mapping $\Delta_{shift}^{PUCCH}$ and the frequency factor.

TABLE 17

| $\Delta_{shift}^{PUCCH}$ | Frequency Factor (FF) |
| --- | --- |
| 1 | 1 |
| 2 | 2 |
| 3 | 3 |
| 4 | 4 |
| 6 | 6 |
| 12 | 12 |

Table 18 shows an example of mapping $\Delta_{shift}^{PUCCH}$ and the frequency factor in consideration of the number of available resources (i.e. multiplexing order). For example, when the multiplexing order according to circular shift is 6 in one SC-FDMA symbol, $\Delta_{shift}^{PUCCH}$=2 and FF=6 can be paired.

TABLE 18

| $\Delta_{shift}^{PUCCH}$ | Frequency Factor (FF) | Multiplexing order due to circular shift only |
| --- | --- | --- |
| 1 | 12 | 12 |
| 2 | 6 | 6 |
| 3 | 4 | 4 |
| 4 | 3 | 3 |
| 6 | 2 | 2 |
| 12 | 1 | 1 |

Alternatively, the frequency factor can be RRC signaled or implicitly determined on the basis of the number of DL CCs. Implicit change of the frequency factor according to the number of DL CCs is exemplified. Specifically, the frequency factor can be implicitly determined on the basis of the number of configured DL CCs or on the basis of the number of activated DL CCs. For example, a frequency factor for 5 configured (activated) DL CCs can be set to 2 in advance and used. Frequency factors for 4, 3, 2 and 1 configured (activated) DL CCs can be implicitly set to 3, 4, 6 and 12 and used, respectively.

FIG. 43a illustrates a signal processing procedure to transmit control information through multiple antennas according to the present embodiment. Since the overall flow of the signal processing procedure shown in FIG. 43a is similar to those of embodiments 1 and 2, described with reference to FIGS. 29 to 34, the following description is focused on a transmit diversity (TxD) mapper, which is a main difference between the signal processing procedure of FIG. 43a and the signal processing procedures of FIGS. 29 to 34. The TxD mapper performs resource allocation/MIMO (Multiple Input Multiple Output) precoding/process for transmitting the control information through multiple antennas (ports).

A description will be given of a scheme of transmitting a PUCCH in a MIMO mode using the TxD mapper. While 2Tx transmit diversity scheme is described in the following embodiment, the embodiment can be equally/similarly applied to an n-Tx transmit diversity scheme. It is assumed that a (quasi) orthogonal resource for control information transmission is referred to as resource A and a (quasi) orthogonal resource for RS transmission is referred to as resource B. Logical indexes of resource A and resource B may be liked with each other. For example, if the logical index of resource B is given, the logical index of resource A can be automatically provided. The logical indexes of resource A and resource B may be configured through different physical configuration methods. The following two cases are present.

1) Control information can be transmitted through the same PRB at all antennas (ports).

A. The control information can be transmitted through two different resources A (e.g. a combination of an orthogonal code and a subcarrier shift (or offset or index) according to frequency factor). For example, the orthogonal code includes a Walsh code and a DFT code and the frequency factor can be given as $N_{sc}/N_{freq}$ or the reciprocal thereof. Here, $N_{sc}$ denotes the number of subcarriers in a PRB and $N_{freq}$ denotes the number of subcarriers used for control information transmission.

B. An RS can be transmitted through two different resources B (e.g. a combination of a circular shift and a DFT cover) selected for each antenna (port).

2) The control information can be transmitted through different PRBs for antennas. For example, the control information can be transmitted through PRB#4 at antenna (port) 0 and transmitted through PRB#6 at antenna (port) 1.

A. Resources for the control information transmitted through different antennas (ports) are not particularly limited (i.e. the resources can be equal to and different from each other).

B. Resources for RSs transmitted through different antennas (ports) are not particularly limited (i.e. the resources can be equal to and different from each other).

In a multi-antenna transmit (e.g. 2Tx transmit) mode, two resources A (e.g. a combination of an orthogonal code and subcarrier position (e.g. shift, offset or index) according to frequency factor) for control information transmission and two resources B (e.g. a combination of a circular shift and a DFT cover) for RS transmission can be defined in advance or provided through physical control channel (e.g. PDCCH)/ RRC signaling. In this case, signaling for the control information and signaling for the RS can be individually performed. When resource information for one antenna (port) is signaled, resource information for the other antenna (port) can be inferred from the previously signaled resource information. For example, code index m and/or the subcarrier position (e.g. shift, offset or index) according to frequency factor can be designated in advance or signaled from the BS. Otherwise, code index m and/or the subcarrier position (e.g. shift, offset or index) according to frequency factor can be implicitly linked with a CCE index that configures a PDCCH. Or, code index m and/or the subcarrier position (e.g. shift, offset or index) according to frequency factor can be explicitly designated through PDCCH or RRC signaling. The code index m and/or the subcarrier position (e.g. shift, offset or index) according to frequency factor can be changed on a subframe/slot/multi-SC-FDMA symbol basis. That is, the code index m and/or the subcarrier position (e.g. shift, offset or index) according to frequency factor can be hopped in the unit of a specific interval (e.g. slot).

If the multiplexing order for the RS is more than twice the multiplexing order for the control information, the following 2Tx transport diversity scheme can be applied. In this case, two from among resources CS+OC+PRB for the RS may be used for channel estimation of each transport antenna and only one resource (subcarrier position+OC+PRB) may be used for the control information.

As another transport diversity scheme, the Alamouti scheme can be applied to an output value of the DFT precoder in the frequency domain. The Alamouti scheme can be represented by the following matrix.

$$\begin{pmatrix} s_1 & -s_2^* \\ s_2 & s_1^* \end{pmatrix} \quad \text{[Equation 10]}$$

Here, column 0 and column 1 respectively denote signal vectors transmitted through antenna (port) 0 and antenna (port) 1, row 0 and row 1 respectively denote complex signal vectors transmitted through first and second subcarriers, * represents a complex conjugate operation. Any form linearly transformed from the matrix can be applied to the present invention.

When the Alamouti scheme is applied to the PUCCH format according to the embodiment of the present invention, the order of DFT symbols mapped to SC-FDMA symbols corresponding to antenna (port) 1 is changed for every two DFT symbols. For example, d_0, d_1, d_2, d_3 are mapped to the SC-FDMA symbols corresponding to antenna (port) 0 whereas −d_1*, d_0*, −d_3*, d_2* are mapped to the SC-FDMA symbols corresponding to antenna (port) 1. This damages single carrier property of the signal mapped to antenna (port) 1, and thus CM increases at antenna (port) 1.

A multi-antenna coding scheme that does not cause CM increase even when the Alamouti scheme is applied will now be described with reference to FIGS. 43b and 43c. FIGS. 43b and 43c illustrate a procedure starting with the spreading operation.

Referring to FIGS. 43b and 43c, when the control information is mapped to antenna (port) 0, the complex signal is mapped to subcarriers after being subjected to DFT precoding. When the control information is mapped to antenna (port) 1, (1) mapping to subcarriers in SC-FDMA symbols in reverse order, (2) complex conjugate operation and (3) alternative minus sign addition are performed. Operations (1), (2) and (3) are exemplary and the order of the operations can be changed. This scheme can be equally applied to the embodiments of the present invention. For example, referring to FIG. 29 or 30, a complex symbol sequence mapped to SC-FDMA symbols transmitted through a first antenna (port) and a second antenna (port) can be given as follows.

First antenna(port): $a_k$

Second antenna(port): $(-1)^{mod(k,2)} \cdot (a_{11-k})$ [Equation 11]

Here, $a_k$ denotes the complex symbol sequence mapped to subcarriers of the SC-FDMA symbols, k denotes a complex symbol index (0 to 11), mod(a, b) represents the remainder obtained when a is divided by b, and conj(a) represents the complex conjugate value of a.

Equation 12 assumes a case in which the complex signal is mapped to all subcarriers in the SC-FDMA symbols. Equation 11 can be normalized to Equation 12 considering a case in which the frequency factor is used as shown in FIGS. 31 to 34.

First antenna(port): $a_k$

Second antenna(port): $(-1)^{mod(k,2)} \cdot \text{conj}(a_{n-k})$ or $(-1)^{mod(k+1,2)} \cdot \text{conj}(a_{n-k})$ [Equation 12]

Here, n represents (length of complex symbol sequence $a_k$ mapped to the subcarriers of the SC-FDMA symbols)−1 (e.g. 0≤n≤11).

The complex symbol sequence mapped to the SC-FDMA symbols transmitted through the first antenna (port) or the second antenna (port) can be circular-shifted (e.g. shifted by half the length of the complex symbol sequence) in the frequency domain. Tables 19, 20 and 21 show cases in which the Alamouti scheme is applied according to the embodiment of the present invention.

TABLE 29

| SC-FDMA symbol | Subcarrier index | | | | | | | | | | | |
|---|---|---|---|---|---|---|---|---|---|---|---|---|
| | 0 | 1 | 2 | 3 | 4 | 5 | 6 | 7 | 8 | 9 | 10 | 11 |
| Antenna (port) 0 | $a_0$ | $a_1$ | $a_2$ | $a_3$ | $a_4$ | $a_5$ | $a_6$ | $a_7$ | $a_8$ | $a_9$ | $a_{10}$ | $a_{11}$ |
| Antenna (port) 1 | $-a_{11}^*$ | $a_{10}^*$ | $-a_9^*$ | $a_8^*$ | $-a_7^*$ | $a_6^*$ | $-a_5^*$ | $a_4^*$ | $-a_3^*$ | $a_2^*$ | $-a_1^*$ | $a_0^*$ |

TABLE 20

| SC-FDMA symbol | Subcarrier index | | | | | | | | | | | |
|---|---|---|---|---|---|---|---|---|---|---|---|---|
| | 0 | 1 | 2 | 3 | 4 | 5 | 6 | 7 | 8 | 9 | 10 | 11 |
| Antenna (port) 0 | $a_0$ | $a_1$ | $a_2$ | $a_3$ | $a_4$ | $a_5$ | $a_6$ | $a_7$ | $a_8$ | $a_9$ | $a_{10}$ | $a_{11}$ |
| Antenna (port) 1 | $-a_5^*$ | $a_4^*$ | $-a_3^*$ | $a_2^*$ | $-a_1^*$ | $a_0^*$ | $-a_{11}^*$ | $a_{10}^*$ | $-a_9^*$ | $a_8^*$ | $-a_7^*$ | $a_6^*$ |

TABLE 21

| SC-FDMA symbol | Subcarrier index | | | | | | | | | | | |
|---|---|---|---|---|---|---|---|---|---|---|---|---|
| | 0 | 1 | 2 | 3 | 4 | 5 | 6 | 7 | 8 | 9 | 10 | 11 |
| Antenna (port) 0 | $a_0$ | | $a_1$ | | $a_2$ | | $a_3$ | | $a_4$ | | $a_5$ | |
| Antenna (port) 1 | $-a_5^*$ | | $a_4^*$ | | $-a_3^*$ | | $a_2^*$ | | $-a_1^*$ | | $a_0^*$ | |

Embodiment 3

Figure 43:
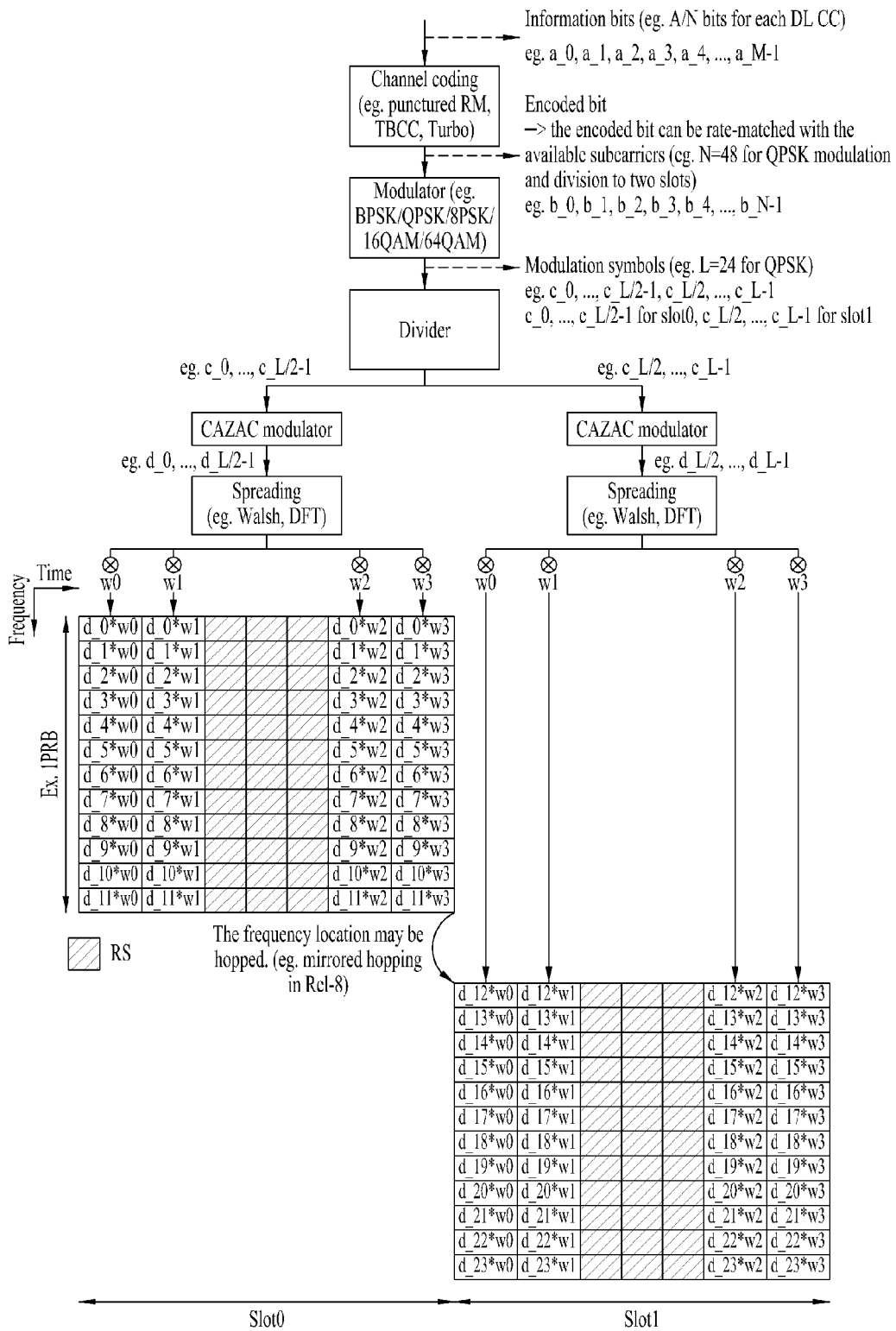
FIG. 43 illustrates a PUCCH format and a signal processing procedure therefor according to an embodiment of the present invention.

FIG. 43 illustrates a PUCCH format structure and a signal processing procedure for the same according to a third embodiment of the present invention. Since the overall flow of the signal processing procedure is similar to those described with reference to FIGS. 29 to 43, the following description is focused on a CAZAC modulator that is a main difference between the signal processing procedure of FIG. 44 and the signal processing procedures of FIGS. 29 to 43.

Referring to FIG. 43, the CAZAC modulator modulates the modulation symbols [c_0, c_1, . . . , c_L/2−1] and [c_L/2, c_L/2+1, . . . , c_L−1]) divided to corresponding slots into corresponding sequences to generate CAZAC modulation symbols [d_0, d_1, . . . , d_L/2−1] and [d_L/2, d_L/2+1, . . . , d_L−1]. The CAZAC modulator includes a CAZAC sequence or a sequence for LTE computer generated (CG) 1RB. For example, if the LTE CG sequence is r_0, . . . , r_L/2−1, a CAZAC modulation symbol may be d_n=c_n*r_n or d_n=conj(c_n)*r_n. While the figure illustrates slot-level joint coding, the present invention can be equally applied to separate coding for each slot, slot-level repetition, and a case in which a frequency factor is applied. In the present embodiment, cell-specific scrambling can be omitted because a CAZAC or CG sequence functioning as a base sequence is cell-specific. Otherwise, only UE-specific scrambling can be applied for greater randomization. A resource allocation method, relation with RS indexes, a signaling method, and transmit diversity can use the methods described in the above embodiments.

Embodiment 4

In LTE, an orthogonal resource for a scheduling request (SR) is configured and signaled to a UE through RRC signaling. When an SR transmission event is generated, the UE transmits an SR signal using the previously signaled orthogonal resource.

Table 22 shows SR periodicity and an SR subframe offset.

TABLE 22

UE-specific SR periodicity and subframe offset configuration

| SR configuration Index $I_{SR}$ | SR periodicity (ms) | SR subframe offset |
|---|---|---|
| 0-4 | 5 | $I_{SR}$ |
| 5-14 | 10 | $I_{SR}$-5 |
| 15-34 | 20 | $I_{SR}$-15 |
| 35-74 | 40 | $I_{SR}$-35 |
| 75-154 | 80 | $I_{SR}$-75 |
| 155 | | Reserved |

Referring to Table 22, since a period in which the SR can be transmitted is periodically configured, a case in which the SR and ACK/NACK need to be transmitted in the same subframe/slot occurs.

If an SR transmission event and an ACK/NACK transmission event occur in the same subframe (or slot), an LTE UE transmits the ACK/NACK using the orthogonal resource assigned for the SR. A BS recognizes that a simultaneous transmission event may occur, and thus the BS can detect whether the SR and ACK/NACK are transmitted together or only the ACK/NACK is transmitted without the SR by decoding both the orthogonal resource for the SR and an orthogonal resource for the ACK/NACK.

The present embodiment describes a scheme of simultaneously transmitting a new PUCCH format and an SR. Here, the new PUCCH format is not limited to the PUCCH formats described in embodiments 1, 2 and 3 and includes all PUCCH formats using channel coding (e.g. when channel-coded ACK/NACK through PUCCH format 2/2a/2b is transmitted).

The new PUCCH format may include other PUCCH formats. The following description includes the following case.

When first UCI (e.g. ACK/NACK, SR, CQI, PMI, RI, CSI, or a combination thereof) is transmitted in the new PUCCH format and second UCI is transmitted in the same subframe, while transmission of the second UCI is not limited to a specific PUCCH format, the second UCI may be scheduled to be transmitted using an LTE PUCCH format.

The following embodiments focus on a case in which the first UCI is ACK/NACK for DL CCs and the second UCI is an SR scheduled to be transmitted using an LTE PUCCH format. ACK/NACK may include multiple ACK/NACKs for a plurality of DL CCs. A scheme of simultaneously transmitting the first UCI and the second UCI is applied to the overall specification unless otherwise specifically stated.

As described above, an SR transmission event and an ACK/NACK transmission event may occur at the same time (e.g. in the same subframe/slot). It is impossible to transmit ACK/NACK through an SR resource because the SR resource is UE specific whereas the ACK/NACK is CC specific. Accordingly, the present invention proposes the following in order to solve this problem. When a UE needs to transmit (multiple) ACK/NACK in a subframe/slot capable of transmitting an SR, 1-bit SR information may be embedded in the (multiple) ACK/NACK, joint-coded and then transmitted. A resource for the new PUCCH format may be set implicitly (e.g. linked with a CCE index of a PDCCH) or explicitly (e.g. through RRC signaling). In addition, for 1 bit embedding, an information bit field may be defined or the status of the original information may be used.

This scheme is described in detail with reference to FIG. 29. Referring to FIG. 29, 12-bit control information (ACK/NACK and DTX for 5 DL CCs) is channel-coded to generate 48 coded bits, and then QPSK is performed on the 48 coded bits. When an SR transmission subframe and an ACK/NACK transmission subframe overlap, 13-bit control information (ACK/NACK and DTX for 5 DL CCs and an SR) can be channel-coded to generate 48 coded bits, and then QPSK can be performed on the 48 coded bits. One bit for the SR indicates that there is no SR event when it is 0 and represents that an SR event is present when it is 1 (otherwise, one bit for the SR may indicate that there is no SR event when it is 1 and may represent that an SR event is present when it is 0). The position of the bit for the SR may be pre-defined in an information bit stream to indicate that the bit corresponds to the SR (e.g. the first/last bit of the bit stream).

Another scheme for solving the problem occurring when the SR transmission event (first UCI) and the ACK/NACK transmission event (second UCI) overlap is described. When the SR transmission event (first UCI) and the ACK/NACK transmission event (second UCI) overlap, (multiple) ACK/NACK information can be bundled into one piece of information through a logical AND operation. The bundled ACK/NACK information can be transmitted through the SR resource. Accordingly, the UE feeds back UCI (e.g. ACK/NACK) using the new PUCCH format in a normal case and transmits the bundled ACK/NACK information using the SR resource when the SR transmission event and the ACK/NACK transmission event overlap. The UE transmits ACK when ACK/NACK information for all DL CCs corresponds to ACK and transmits NACK when the ACK/NACK information includes NACK, by way of bundling. Similarly, the UE can transmit DTX when the ACK/NACK information for all DL CCs includes DTX.

Figure 44:
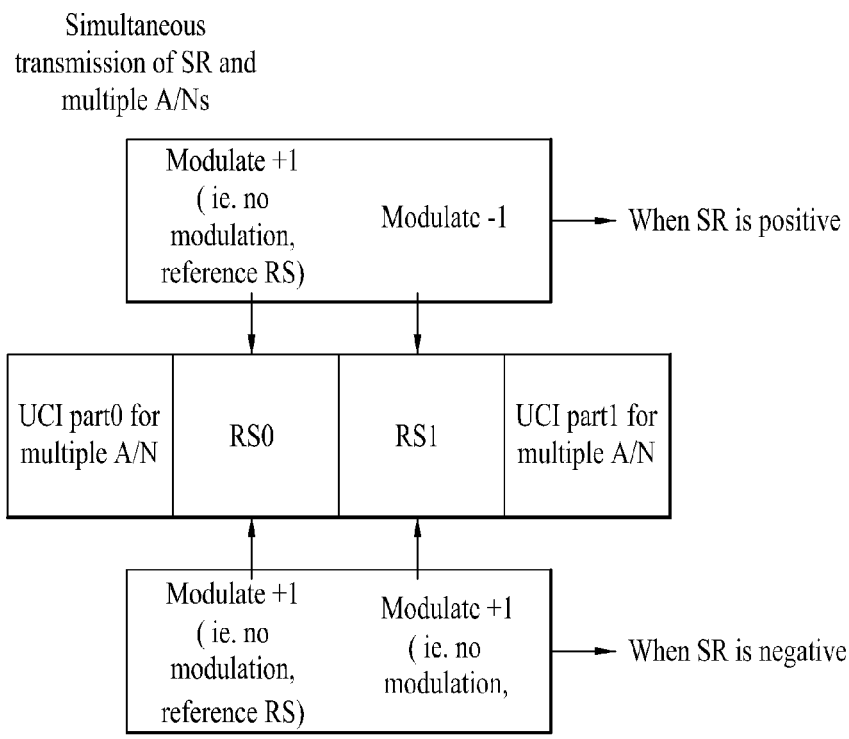
FIG. 44 illustrates a scheme of simultaneously transmitting first UCI and second UCI according to another embodiment of the present invention.

FIG. 44 illustrates another scheme for solving the problem occurring when the SR transmission event (first UCI) and the ACK/NACK transmission event (second UCI) overlap.

Referring to FIG. 44, when the new PUCCH format includes two or more RS symbols, phase modulation may be performed on at least one RS symbol (irrespective of position thereof). Here, it is necessary not to perform phase modulation on at least the other RS symbol (which is equivalent to modulation of 1). Since SR information can be represented by 1 bit that indicates presence or absence of an SR to be transmitted, phase modulation may not be performed when there is no SR to be transmitted (e.g. 1 is modulated) and phase modulation may be performed when there is an SR to be transmitted (e.g. −1 is modulated). If the first UCI is M bits, $2^M$-PSK or $2^M$-QAM may be performed and the relationship between UCI bits and a complex modulation value may be designated in advance.

When the first UCI and the second UCI are transmitted in the same subframe, the UE may not transmit specific UCI (i.e. the UE may drop transmission of the specific UCI) according to UCI priority. For example, assuming that the first UCI is (multiple) ACK/NACK transmitted through the new PUCCH format and the second UCI is CQI transmitted through PUCCH format 2, the UE can drop transmission of the CQI corresponding to the second UCI when the ACK/NACK has higher priority than the CQI. The UCI priority may be SR>ACK/NACK>RI>CQI/PMI.

Alternatively, the first UCI and the second UCI may be embedded in one PUCCH format. For example, if the first UCI transmitted using PUCCH format A and the second UCI transmitted using PUCCH format B need to be transmitted in the same subframe, the first UCI and the second UCI can be transmitted through one of the PUCCH formats. Here, the first UCI and the second UCI can be separately coded or jointly coded.

For example, the PUCCH formats are assumed as follows.
PUCCH format A: A new PUCCH format used to transmit 5-bit multi-ACK/NACK (first UCI) for multiple DL CCs
PUCCH format B: LTE PUCCH format 2 used to transmit 5-bit CQI (second UCI)

When an event of simultaneously transmitting the first UCI and the second UCI occurs, the first UCI and the second UCI (10-bit information) can be jointed-coded and then transmitted through PUCCH format A.

Embodiment 5

A description will be given of a scheme for handling a case in which a new PUCCH format transmission event occurs in a subframe configured to transmit an SRS. The new PUCCH format may include the new PUCCH formats described in embodiments 1, 2 and 3 and other new PUCCH formats and may be used to transmit ACK/NACK, SR, CQI, PMI, RI, CSI, or a combination thereof. For convenience, it is assumed that the new PUCCH format is used to transmit ACK/NACK related UCI.

Tables 23 and 24 respectively show cell-specific SRS transmission parameters and UE-specific SRS transmission parameters for SRS transmission, which are defined in LTE.

TABLE 23

| srs-SubframeConfig | Binary | Configuration Period $T_{SFC}$ (subframes) | Transmission offset $\Delta_{SFC}$ (subframes) |
|---|---|---|---|
| 0 | 0000 | 1 | {0} |
| 1 | 0001 | 2 | {0} |
| 2 | 0010 | 2 | {1} |
| 3 | 0011 | 5 | {0} |
| 4 | 0100 | 5 | {1} |
| 5 | 0101 | 5 | {2} |
| 6 | 0110 | 5 | {3} |
| 7 | 0111 | 5 | {0, 1} |
| 8 | 1000 | 5 | {2, 3} |
| 9 | 1001 | 10 | {0} |
| 10 | 1010 | 10 | {1} |
| 11 | 1011 | 10 | {2} |
| 12 | 1100 | 10 | {3} |
| 13 | 1101 | 10 | {0, 1, 2, 3, 4, 6, 8} |
| 14 | 1110 | 10 | {0, 1, 2, 3, 4, 5, 6, 8} |
| 15 | 1111 | reserved | reserved |

$T_{SFC}$ denotes cell-specific subframe configuration, $\Delta_{SFC}$ denotes a cell-specific subframe offset, and srs-SubframeConfig is provided by a higher layer. An SRS is transmitted through a subframe that satisfies $\lfloor n_s/2 \rfloor \bmod T_{SFC} \in \Delta_{SFC}$. In addition, $N_S$ denotes a slot index, $\lfloor \ \rfloor$ represents a flooring function, and mod denotes a modulo operation.

TABLE 24

| SRS Configuration Index $I_{SRS}$ | SRS Periodicity $T_{SRS}$ (ms) | SRS Subframe Offset $T_{offset}$ |
|---|---|---|
| 0-1 | 2 | $I_{SRS}$ |
| 2-6 | 5 | $I_{SRS}$-2 |
| 7-16 | 10 | $I_{SRS}$-7 |
| 17-36 | 20 | $I_{SRS}$-17 |
| 37-76 | 40 | $I_{SRS}$-37 |
| 77-156 | 80 | $I_{SRS}$-77 |
| 157-316 | 160 | $I_{SRS}$-157 |
| 317-636 | 320 | $I_{SRS}$-317 |
| 637-1023 | reserved | reserved |

An SRS configuration index $I_{SRS}$ is signaled for each UE and each UE confirms an SRS periodicity $T_{SRS}$ and an SRS subframe offset $T_{offset}$ using $I_{SRS}$.

The cell-specific SRS transmission parameters inform a UE of subframes occupied for SRS transmission in a cell while the UE-specific SRS transmission parameters inform the UE of a subframe actually used by the UE from among the subframes occupied for SRs transmission. Then, the UE transmits the SRS through a specific symbol (e.g. the last symbol) of the subframe (UE-specific SRS transmission subframe) designated by the UE-specific SRS transmission parameters. In order to protect SRS transmission in a subframe (cell-specific SRS transmission subframe) occupied through the cell-specific transmission parameters, it may be necessary for the UE not to transmit an uplink signal through the last symbol of the corresponding subframe irrespective of whether the SRS is actually transmitted in the subframe.

When a new PUCCH format transmission event occurs in a subframe configured to transmit the SRS, the following schemes may be considered. Here, the subframe configured to transmit the SRS includes the cell-specific SRS transmission subframe or the UE-specific SRS transmission subframe.

Scheme 1: The last SC-FDMA symbol of the subframe may be punctured in the new PUCCH format (that is, shortened new PUCCH format). In this case, the length of an orthogonal cover code (OCC) (or orthogonal code (OC)) may be adjusted according to the number of SC-FDMA symbols left after puncturing.

Scheme 2: An SRS symbol may be dropped. That is, the UE transmits the new PUCCH format (i.e. normal new PUCCH format) and does not transmit the SRS when simultaneous transmission of the new PUCCH format and the SRS occurs.

Figure 45:
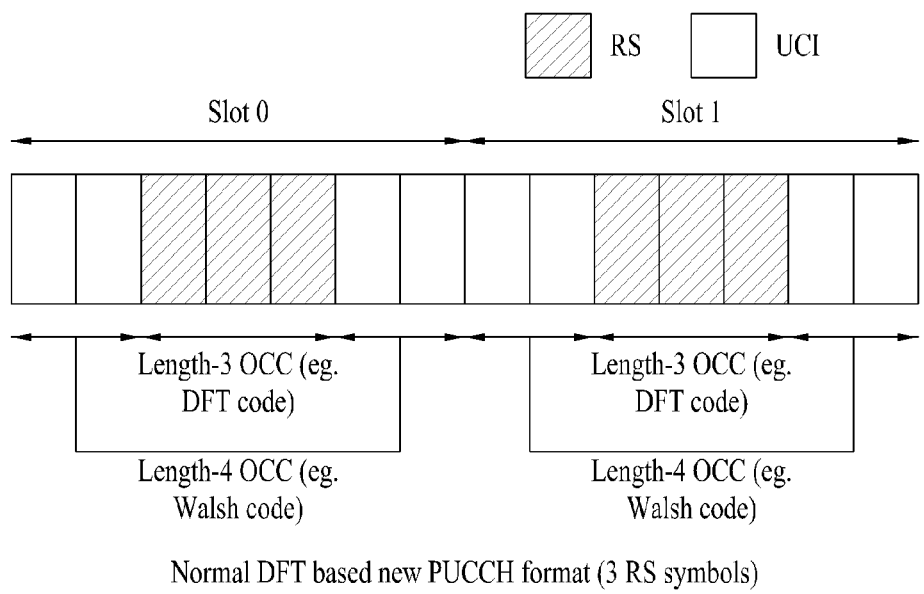
FIGS. 45 to 48 illustrate a scheme of supporting simultaneous transmission of a new PUCCH format and an SRS according to an embodiment of the present invention.
Figure 46:
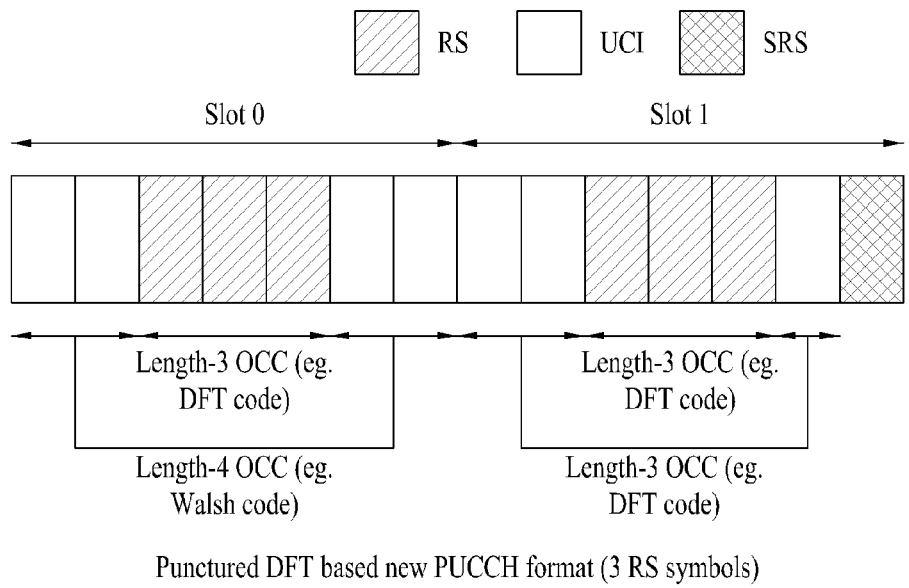

FIGS. 45 and 46 illustrate signal transmission according to scheme 1 when the new PUCCH format uses the RS symbol structure of LTE PUCCH format 1a/1b. In these figures, the horizontal axis represents the time domain (e.g. symbol index) and the vertical axis represents the frequency domain (e.g. RB index). While these figures illustrate the normal CP case, signal transmission according to scheme 1 can be applied to the extended CP case. The new PUCCH format may be generated according to the scheme shown in FIGS. 29 and 30. While the following figures show that a slot level PUCCH structure uses the same frequency resource (e.g. the same PRB), they are exemplary and the slot level PUCCH structure can be hopped based on slots in the frequency domain, as shown in FIGS. 29 and 30.

FIG. 45 shows a case in which only the new PUCCH format is transmitted. Referring to FIG. 45, RS symbols are spread using a length-3 OCC (e.g. DFT code) and UCI symbols are spread using a length-4 OCC (e.g. Walsh code) in each slot. Frequency hopping can be performed between slots.

FIG. 46 illustrates a scheme for supporting simultaneous transmission of the new PUCCH format and an SRS. In the figure, SRS denotes an SRS transmission position. In the SRS transmission position, an SRS of a corresponding UE may be actually used or signal transmission of the corresponding UE may be limited in order to protect SRS transmission of another UE. Referring to FIG. 46, slot 0 has the same structure as that shown in FIG. 45. The last SC-FDMA symbol of slot 1 is punctured for SRS transmission. Puncturing may be implemented according to two schemes. In the first scheme, on the condition that all control information are mapped up to the last SC-FDMA symbol of the new PUCCH format, it is possible to drop transmission of the last SC-FDMA symbol when simultaneous transmission of the new PUCCH format and the SRS is requested. Dropping transmission of an SC-FDMA symbol may be achieved in such a manner that the SC-FDMA symbol is not transmitted or 0 is remapped to the SC-FDMA symbol. In the second scheme, a UE rate-matches control information in a shortened new PUCCH format that does not include the last SC-FDMA symbol of a subframe and then performs resource mapping when simultaneous transmission of the new PUCCH format and the SRS is requested. That is, puncturing of the last SC-FDMA symbol can be performed by rate matching after resource mapping or resource mapping after rate matching.

Referring to FIG. 46, the number of RS symbols in slot 1 is maintained at 3 whereas the number of UCI symbols is reduced from 4 to 3 after puncturing. Accordingly, the length of the OCC applied to the UCI symbols in slot 1 is changed from 4 to 3.

Table 25 shows OCC sets for UCI symbols of each slot.

TABLE 25

| | Orthogonal code | |
|---|---|---|
| Index m | Slot 0 (SF = 4) | Slot 1 (SF = 3) |
| 0 | [+1 +1 +1 +1] | [1 1 1] |
| 1 | [+1 −1 +1 −1] | [1 $e^{j2\pi/3}$ $e^{j4\pi/3}$] |
| 2 | [+1 +1 −1 −1] | [1 $e^{j4\pi/3}$ $e^{j2\pi/3}$] |
| 3 | [+1 −1 −1 +1] | |

OCC index m can be independently determined for each slot.

The shortened new PUCCH format may be configured through higher layer (e.g. RRC) signaling. For example, configuration information of the shortened new PUCCH format/whether or not the shortened new PUCCH format is used can be indicated through higher layer (e.g. RRC) signaling. It is possible to configure the new shortened PUCCH format without increasing signaling overhead by combining signaling for the new shortened PUCCH format with higher layer signaling for LTE PUCCH format 1/1a/1b.

Figure 47A:
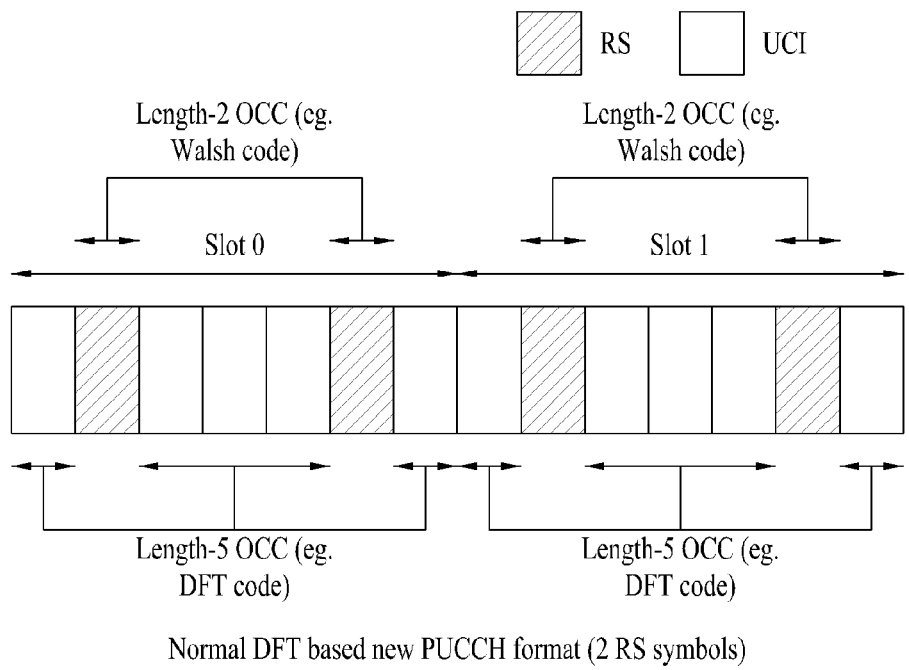
Figure 47B:
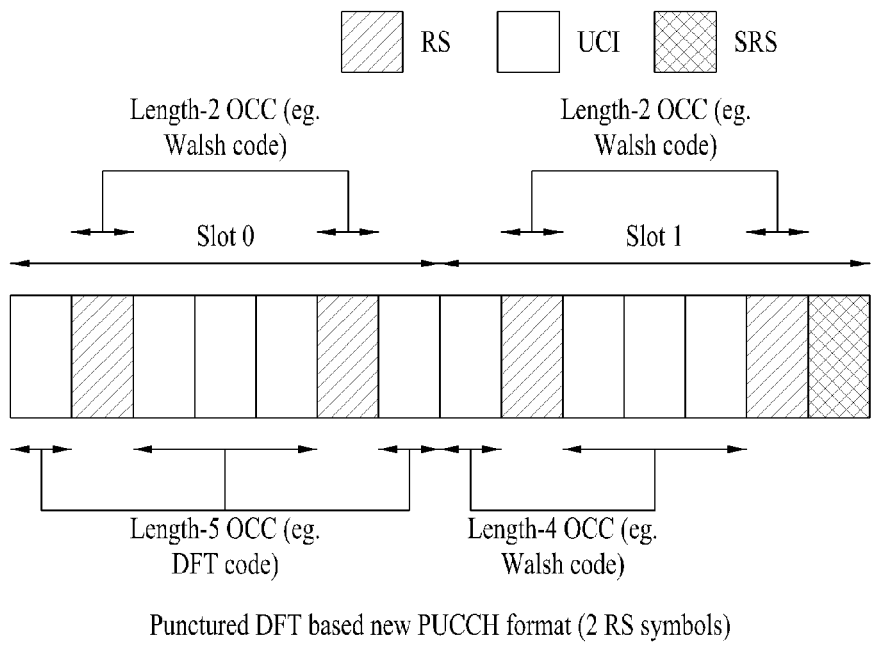

FIGS. 47a and 47b illustrate signal transmission according to scheme 1 when the new PUCCH format uses the RS symbol structure of LTE PUCCH format 2a/2b. This example shows the normal CP case. In these figures, the new PUCCH format may be generated according to the scheme shown in FIGS. 29 and 30.

FIG. 47a shows a case in which only the new PUCCH format is transmitted. Referring to FIG. 47a, RS symbols are spread using a length-2 OCC (e.g. Walsh code) and UCI symbols are spread using a length-5 OCC (e.g. DFT code) in each slot. Frequency hopping can be performed between slots. FIG. 47b shows a case in which the new PUCCH format and an SRS are simultaneously transmitted. Referring to FIG. 47b, slot 0 has the same structure as that shown in FIG. 47a. The last SC-FDMA symbol of slot 1 is punctured for SRS transmission. The number of RS symbols is maintained at 2 whereas the number of UCI symbols is reduced from 5 to 4 in slot 1 after puncturing. Accordingly, the length of the OCC applied to the UCI symbols in slot 1 is changed from 5 to 4.

Figure 48A:
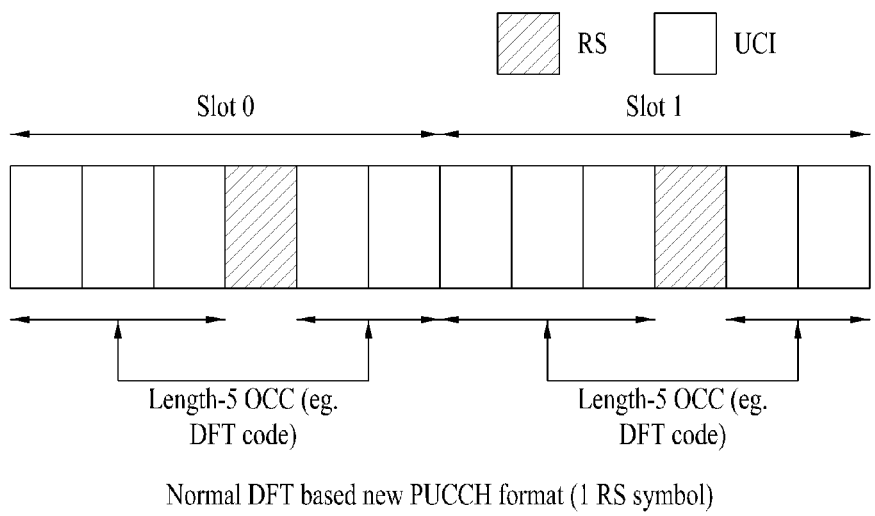
Figure 48B:
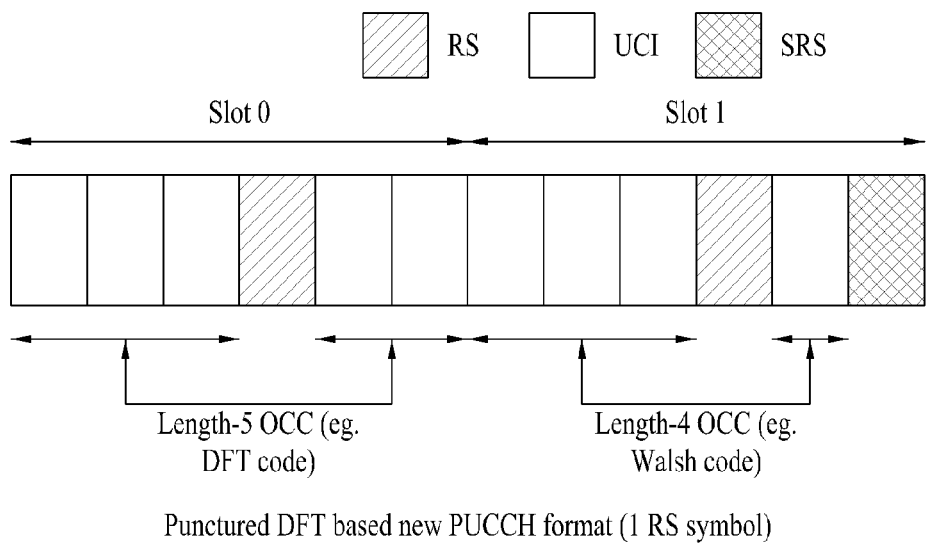

FIGS. 48a and 48b illustrate another example of signal transmission according to scheme 1 when the new PUCCH format uses the RS symbol structure of LTE PUCCH format 2a/2b. FIGS. 48a and 48b correspond to FIGS. 47a and 47b except that FIGS. 48a and 48b are applied to the extended CP case.

Table 26 shows code sets for UCI symbols in FIGS. 47a and 48a and Table 27 shows code sets for UCI symbols in FIGS. 47b and 48b.

TABLE 26

| | Orthogonal code | |
|---|---|---|
| Index m | Slot 0 (SF = 5) | Slot 1 (SF = 5) |
| 0 | [1 1 1 1 1] | [1 1 1 1 1] |
| 1 | [1 $e^{j2\pi/5}$ $e^{j4\pi/5}$ $e^{j6\pi/5}$ $e^{j8\pi/5}$] | [1 $e^{j2\pi/5}$ $e^{j4\pi/5}$ $e^{j6\pi/5}$ $e^{j8\pi/5}$] |
| 2 | [1 $e^{j4\pi/5}$ $e^{j8\pi/5}$ $e^{j2\pi/5}$ $e^{j6\pi/5}$] | [1 $e^{j4\pi/5}$ $e^{j8\pi/5}$ $e^{j2\pi/5}$ $e^{j6\pi/5}$] |
| 3 | [1 $e^{j6\pi/5}$ $e^{j2\pi/5}$ $e^{j8\pi/5}$ $e^{j4\pi/5}$] | [1 $e^{j6\pi/5}$ $e^{j2\pi/5}$ $e^{j8\pi/5}$ $e^{j4\pi/5}$] |
| 4 | [1 $e^{j8\pi/5}$ $e^{j6\pi/5}$ $e^{j4\pi/5}$ $e^{j2\pi/5}$] | [1 $e^{j8\pi/5}$ $e^{j6\pi/5}$ $e^{j4\pi/5}$ $e^{j2\pi/5}$] |

OCC index m can be independently determined for each slot.

TABLE 27

| | Orthogonal code | |
|---|---|---|
| Index m | Slot 0 (SF = 5) | Slot 1 (SF = 4) |
| 0 | [1 1 1 1 1] | [+1 +1 +1 +1] |
| 1 | [1 $e^{j2\pi/5}$ $e^{j4\pi/5}$ $e^{j6\pi/5}$ $e^{j8\pi/5}$] | [+1 −1 +1 −1] |
| 2 | [1 $e^{j4\pi/5}$ $e^{j8\pi/5}$ $e^{j2\pi/5}$ $e^{j6\pi/5}$] | [+1 +1 −1 −1] |
| 3 | [1 $e^{j6\pi/5}$ $e^{j2\pi/5}$ $e^{j8\pi/5}$ $e^{j4\pi/5}$] | [+1 −1 −1 +1] |
| 4 | [1 $e^{j8\pi/5}$ $e^{j6\pi/5}$ $e^{j4\pi/5}$ $e^{j2\pi/5}$] | |

OCC index m can be independently determined for each slot.

Embodiment 6

A description will be given of a scheme of transmitting a larger amount of UCI using PUCCH format 2. For convenience, a scheme of transmitting (multiple) ACK/NACK related UCI using PUCCH format 2 will now be described. The ACK/NACK related UCI includes (multiple) ACK/NACK and ACK/NACK+other UCI. Here, the other UCI includes an SR, CQI, PMI, RI, or a combination thereof.

Figure 49:
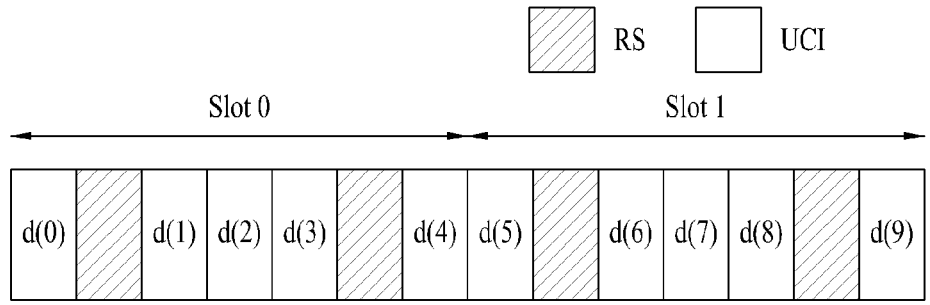

FIG. 49 illustrates an exemplary UCI transmission scheme using PUCCH format 2 according to an embodiment of the present invention. FIG. 49 shows a PUCCH format in the normal CP case. Referring to FIG. 49, one subframe includes 10 UCI symbols in addition to RS symbols. A modulation value spread in the frequency domain is mapped to each UCI symbol. The modulation value mapped to each UCI symbol may be spread by a CAZAC sequence or a CG-CAZAC sequence in the frequency domain (but not limited thereto). A cyclic shift CS may be applied to each sequence. SC-FDMA symbol level CS hopping may be applied for randomizing inter-cell interference. An RS may be multiplexed by CDM using a CS. For example, if the number of available CSs is 12 or 6, 12 or 6 UEs can be multiplexed in the same PRB.

The above PUCCH format signal processing will now be described in detail. A signal processor for a PUCCH format may include all or some of a channel coding block, a modulator, a divider, and a frequency domain spreading block.

A channel coding block channel-codes information bits a(0), a(1), . . . , a(M−1) (e.g. multiple ACK/NACK bits) to generate encoded bits (coded bits or coding bits) (or a codeword) b(0), b(1), . . . , b(N−1). Here, M denotes an information bit size and N denotes an encoded bit size. The information bits include multiple ACK/NACK bits for a plurality of data (or PDSCH) received through a plurality of DL CCs, for example. The information bits a(0), a(1), . . . , a(M−1) are joint-coded regardless of the type/number/size of UCI that forms the information bits. For example, when the information bits include multiple ACK/NACK bits for a plurality of DL CCs, channel coding is performed for all information bits, instead of being performed for each DL CC and each ACK/NACK bit, to generate a single codeword. Channel coding is not limited thereto and includes simple repetition, simplex coding, RM (Reed Muller) coding, punctured RM coding, tail-biting convolutional coding (TBCC), low-density parity-check (LDPC) or turbo-coding. The encoded bits can be rate-matched in consideration of modulation order and resource quantity, which is not shown in the figure. The rate matching function may be included in the channel coding block or may be executed through a separate functional block.

A modulator modulates the encoded bits b(0), b(1), . . . , b(N−1) to generate modulation symbols d(0), d(1), . . . , d(L−1) where L denotes the size of the modulation symbols. A modulation method is performed by modifying the size and phase of a transport signal. For example, the modulation method includes n-PSK (Phase Shift Keying) and n-QAM (Quadrature Amplitude Modulation) (n being an integer greater than or equal to 2). Specifically, the modulation method may include BPSK (Binary PSK), QPSK (Quadrature PSK), 8-PSK, QAM, 16-QAM, 64-QAM, etc.

A divider divides the modulation symbols $d(0), d(1), \ldots, d(L-1)$ to slots. The order/pattern/scheme of dividing the modulation symbols to slots are not particularly limited. For example, the divider can sequentially divide the modulation symbols into respective SC-FDMA symbols (localized type). In this case, the modulation symbols $d(0), d(1), \ldots, d(L-1)$ are sequentially mapped to SC-FDMA symbols of a subframe, starting from the first SC-FDMA symbol. L is 10 when the RS symbol structure of PUCCH format 2 is used. Furthermore, the modulation symbols may be interleaved (or permuted) when divided into the SC-FDMA symbols. For example, even-numbered modulation symbols can be divided into SC-FDMA symbols corresponding to slot 0 and odd-numbered modulation symbols can be divided into SC-FDMA symbols corresponding to slot 1. The order of the modulation operation and division operation may be changed.

The frequency domain spreading block multiplies each of the modulation symbols divided into the SC-FDMA symbols by a sequence for frequency domain spreading. The sequence for frequency domain spreading may include a CAZAC sequence and a CG-CAZAC sequence and a CS for multiplexing may be applied. The signal generated through the aforementioned procedure may be mapped to subcarriers in a PRB and transformed into a time domain signal through IFFT. A CP is attached to the time domain signal and the generated SC-FDMA symbols are transmitted through an RF block.

When a PUCCH format 2 transmission event occurs in the subframe configured to transmit the SRS, the following schemes may be considered.

Scheme 1: The last SC-FDMA symbol in the subframe can be punctured in PUCCH format 2 (that is, shortened PUCCH format 2).

Scheme 2: SRS symbols can be dropped. That is, a UE transmits PUCCH format 2 (i.e. normal PUCCH format 2) and does not transmit the SRS when simultaneous transmission of PUCCH format 2 and the SRS is needed.

Scheme 1 will now be described in detail with reference to FIGS. 50 to 54. Scheme 1 may be limited to a case in which PUCCH format 2 transmits ACK/NACK related UCI.

Figure 50:
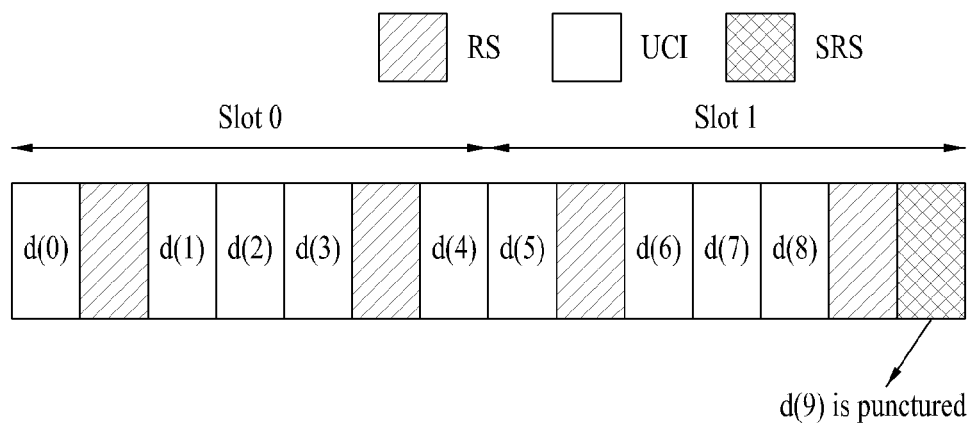
Figure 51:
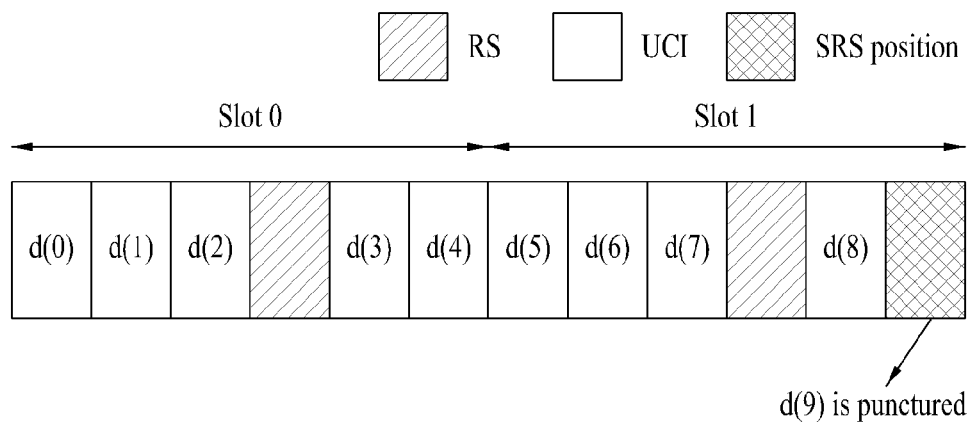

FIGS. 50 and 51 illustrate puncturing of the last SC-FDMA symbol of a subframe when an event of simultaneous transmission of PUCCH format 2 and the SRS occurs. FIG. 50 shows the normal CP case and FIG. 51 shows the extended CP case.

Referring to FIGS. 50 and 51, component $d(9)$ in PUCCH format 2 is punctured (which is equivalent to puncturing of two coded bits when QPSK is used) in order to support SRS transmission (shortened PUCCH format). In this case, the number/positions of RS symbols are kept equal to those in normal PUCCH format 2.

Puncturing may be implemented according to two schemes. In the first scheme, on the condition that all control information are mapped up to the last SC-FDMA symbol of the new PUCCH format, it is possible to drop transmission of the last SC-FDMA symbol. Dropping transmission of an SC-FDMA symbol may be achieved in such a manner that the SC-FDMA symbol is not transmitted or 0 is remapped to the corresponding SC-FDMA symbol. In the second scheme, a UE rate-matches control information in a PUCCH format (i.e. shortened PUCCH format 2) that does not include the last SC-FDMA symbol of a subframe and then performs resource mapping when simultaneous transmission of the PUCCH format 2 and the SRS is required. That is, puncturing of the last SC-FDMA symbol may be performed by rate matching after resource mapping or resource mapping after rate matching.

FIG. 52 shows puncturing of $d(9)$ using RM(20,0) table. This example shows a case of resource mapping after rate matching. If $d(9)$ corresponds to the last two bits of a codeword, it is possible to puncture $d(9)$ by puncturing eighteenth and nineteenth rows of the RM(20,0) table. For convenience, FIG. 52 shows a case in which QPSK is performed. The puncturing method may be changed depending on a coding or modulation scheme.

Figure 53:
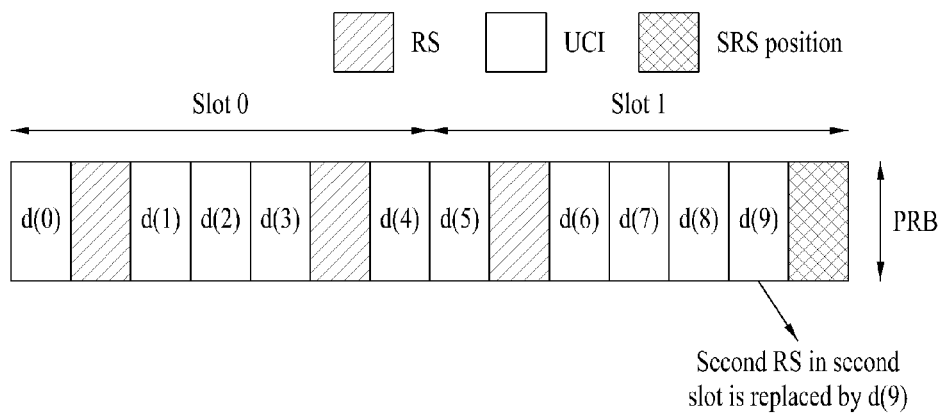
Figure 54:
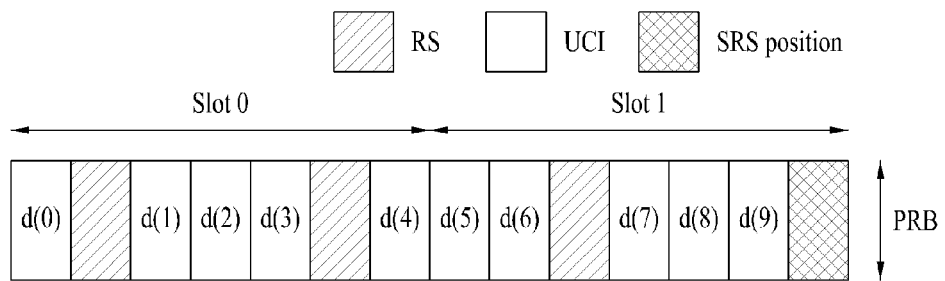
Figure 55:
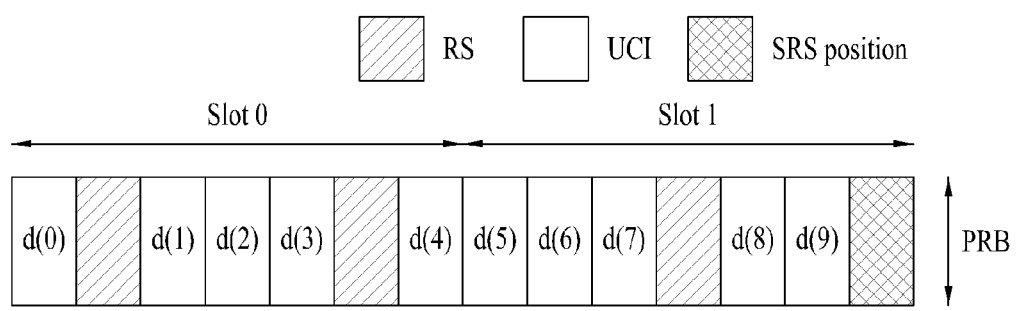

FIGS. 53 to 55 illustrate another scheme of simultaneously transmitting PUCCH format 2 and the SRS. The scheme shown in FIGS. 51 and 52 may deteriorate system performance due to loss of a coded symbol caused by puncturing. Accordingly, the scheme shown in FIGS. 53 to 55 reduces the number of RS symbols in the second slots by one in order to prevent performance deterioration due to puncturing of a coded symbol. The remaining RS symbols may be moved to an arbitrary position in the modified PUCCH format.

Referring to FIG. 53, the second RS symbol can be replaced by $d(9)$ in slot 1 without changing the conventional RS symbol positions in the subframe. Referring to FIG. 54, RS symbol positions are not changed in slot 0 whereas RS symbol positions are changed in slot 1 for optimization of channel estimation. FIG. 54 shows that the first RS symbol of slot 1 is moved to the right by one symbol as compared to the conventional RS symbol position. Referring to FIG. 55, the RS symbol structure for normal CP is used for slot 0 while the RS symbol structure for extended CP is used for slot 1 except the last SRS transmission symbol.

Shortened PUCCH format 2 can be configured through higher layer (e.g. RRC) signaling. For example, configuration information of shortened PUCCH format 2/whether or not shortened PUCCH format 2 is used can be indicated by higher layer (e.g. RRC) signaling. It is possible to configure shortened PUCCH format 2 without increasing signaling overhead by combining signaling for shortened PUCCH format 2 with higher layer signaling for LTE PUCCH format 1/1a/1b.

The above description may be easily extended to multi-sequence modulation (MSM) based on PUCCH format 2. MSM is a scheme of performing modulation (e.g. QPSK, 8PSK, M-ary QAM, etc.) on N allocated PUCCH resources.

Figure 56:
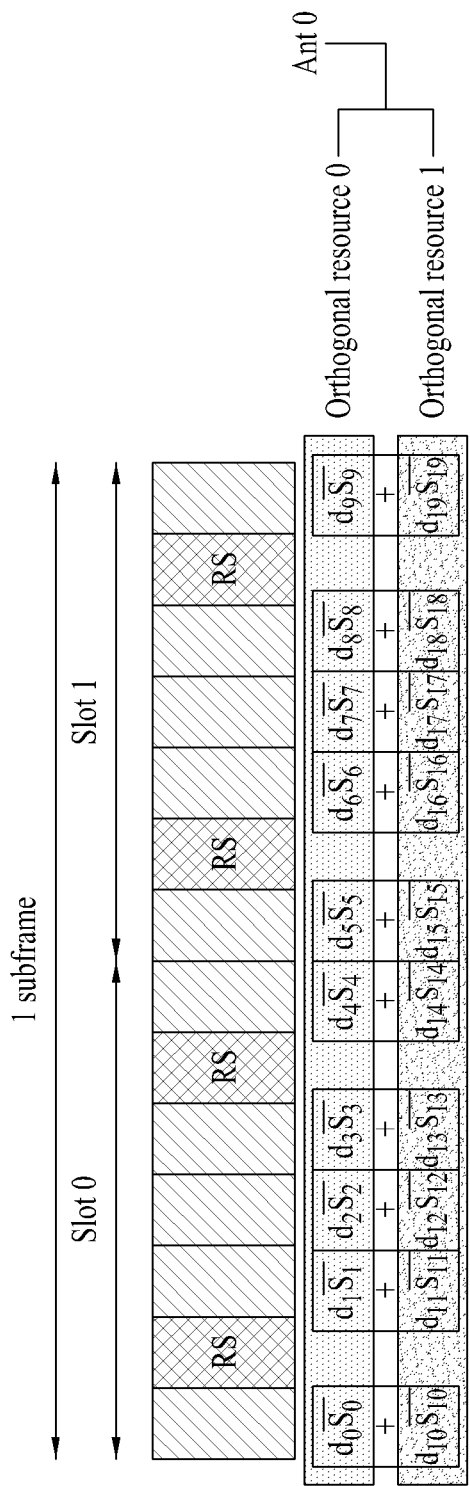

FIG. 56 illustrates an exemplary scheme of performing MSM using two orthogonal resources. Here, it is assumed that the PUCCH format shown in FIG. 49 is used. For convenience, while QPSK is used in the following description, this is exemplary and a modulation scheme used in the present invention is not limited.

Referring to FIG. 56, a total of 20 coded bits can be modulated (10 modulation symbols) according to QPSK through one orthogonal resource and transmitted. When two orthogonal resources (orthogonal resource 0 and orthogonal resource 1) (e.g. cyclic shift) are used, a total of 40 coded bits can be modulated (20 modulation symbols) through QPSK and transmitted. In FIG. 56, $d_0, d_1, \ldots, d_{19}$ are symbols (i.e. modulation values) after QPSK modulation and $\overline{S_n}$ ($n=0, 1, \ldots, 19$) is a sequence vector for PUCCH transmission. Sequence vector $S=\{\overline{S_n}: n=0, 1, \ldots, 9\}$ forms orthogonal resource 0 and sequence vector $S=\{\overline{S_n}: n=10, 11, \ldots, 19\}$ forms orthogonal resource 1. Sequence vector S may be hopped on a symbol-by-symbol basis or on a slot-by-slot basis. A modulation symbol is multiplied by the sequence vector and then mapped to a corresponding SC-FDMA symbol. Finally, all the modulation symbols are loaded in the two orthogonal resources (sequence vector $\overline{S_n}$) and summed, and then transmitted through one antenna. A resource for an RS is defined for each antenna (port), and an RS for UCI of orthogonal resource 0 is identical to an RS for UCI of orthogonal resource 1.

The PUCCH format illustrated in FIG. 56 may be also used to transmit UCI using channel selection. Channel selection is a scheme of selecting a specific resource from N orthogonal resources and transmitting a UCI modulation value through the selected resource. Accordingly, one of d(0) and d(10) must be 0 and one of d(1) and d(11) must be 0. That is, one of d(n) and d(n+1) (n=0, 1, . . . , 9) is 0.

Table 28 shows a mapping table when UCI is transmitted through channel selection. It is assumed that modulation is performed using QPSK. In this case, 3 coded bits can be transmitted through one SC-FDMA symbol using channel selection.

Table 28

| b(0), b(1), b(2) | d(n) | d(n + 10) |
|---|---|---|
| 000 | 1 | 0 |
| 001 | −j | 0 |
| 010 | j | 0 |
| 011 | −1 | 0 |
| 100 | 0 | 1 |
| 101 | 0 | −j |
| 110 | 0 | j |
| 111 | 0 | −1 |

Furthermore, $d_0, d_1, \ldots, d_{19}$ modulated through MSM can be mapped in the form of a table corresponding to precoded-MSM, as shown in Table 29. The precoded-MSM may correspond to a result obtained by multiplying Table 28 by vector [+1 +1] and vector [+1 −1] and mapping the multiplication result to s1 and s2. This is represented by the following Equation.

$$[s_1 \quad s_2] = [d(n) d(n+10)] \begin{bmatrix} +1 & +1 \\ +1 & -1 \end{bmatrix} \quad \text{[Equation 13]}$$

TABLE 29

| | 1st symbol($s_1$) | | 2nd symbols($s_2$) | |
|---|---|---|---|---|
| b(0), b(1), b(2), b(3) | $I_1$ | $Q_1$ | $I_2$ | $Q_2$ |
| 0000 | −1/√2 | −1/√2 | 0 | 0 |
| 0001 | −1/√2 | 0 | 0 | −1/√2 |
| 0010 | 0 | −1/√2 | −1/√2 | 0 |
| 0011 | 0 | 0 | −1/√2 | −1/√2 |
| 0100 | −1/√2 | 0 | 0 | 1/√2 |
| 0101 | −1/√2 | 1/√2 | 0 | 0 |
| 0110 | 0 | 0 | −1/√2 | 1/√2 |
| 0111 | 0 | 1/√2 | −1/√2 | 0 |
| 1000 | 0 | −1/√2 | 1/√2 | 0 |
| 1001 | 0 | 0 | 1/√2 | −1/√2 |
| 1010 | 1/√2 | −1/√2 | 0 | 0 |
| 1011 | 1/√2 | 0 | 0 | −1/√2 |
| 1100 | 0 | 0 | 1/√2 | 1/√2 |
| 1101 | 0 | 1/√2 | 1/√2 | 0 |
| 1110 | 1/√2 | 0 | 0 | 1/√2 |
| 1111 | 1/√2 | 1/√2 | 0 | 0 |

Precoded-MSM will now be described in detail. It is assumed that the PUCCH structure shown in FIG. 56 and QPSK modulation are used for convenience of description. In this case, the total number of information bits transmitted through the PUCCH structure of FIG. 56 is 40 and the total number of symbols is 20.

Referring to Table 29 and FIG. 56, an information bit sequence [b0 b1 b2 b3] is replaced by [s1 s2]. Since the total number of information bits is 40, ten [s1 s2] are generated from ten information bit sequences [b0 b1 b2 b3]. In case of the first SC-FDMA symbol (d0, d10), s1 and s2 are respectively mapped to d0 and d10 in FIG. 56. Similarly, s1 and s2 are respectively mapped to dn and dn+10 in case of other SC-FDMA symbols.

Figure 57:
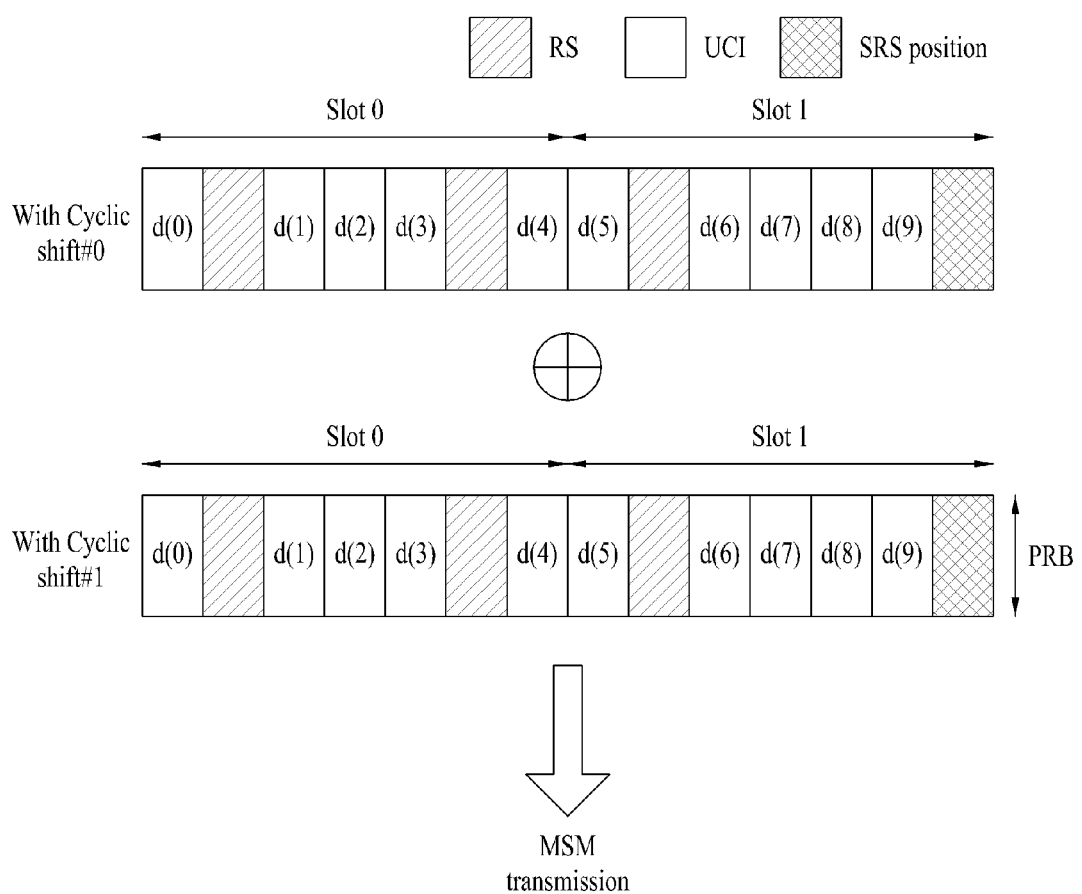

FIG. 57 illustrates a scheme of simultaneously transmitting PUCCH format 2 and the SRS using MSM. It is assumed that MSM uses two orthogonal resources (e.g. CSs) which are present in the same PRB.

Referring to FIG. 57, the first orthogonal resource includes CS #0 and the second orthogonal resource includes CS #1. Two PUCCH formats 2 may be configured respectively using the first and second orthogonal resources, and the two generated PUCCH formats 2 may be summed and transmitted. In this case, the last SC-FDMA symbol of MSM PUCCH format 2 is punctured in order to support SRS transmission. FIG. 57 shows that the second RS symbol in slot 1 is replaced by a UCI symbol while the RS symbol structures in slots 0 and 1 are maintained. While FIG. 57 shows that the RS symbol structures are maintained to be identical to those of PUCCH format 2 (normal CP), the number/positions of RS symbols left after puncturing can be changed. FIG. 57 illustrates that two punctured PUCCH formats are generated and then summed to perform MSM transmission. However, this is exemplary and it is possible to sum two normal PUCCH formats and finally perform puncturing once.

A description will be given of another scheme of simultaneously transmitting PUCCH format 2 and the SRS with reference to FIGS. 58 to 62. FIGS. 58 to 62 illustrate a method of compensating for coding loss due to puncturing of d(9) when the RS symbol structure of the conventional PUCCH format 2 is maintained. It is apparent that methods described hereinbelow are also applicable to MSM by simple extension, as shown in FIGS. 56 and 57, and thus detailed description thereof is omitted.

Figure 58:
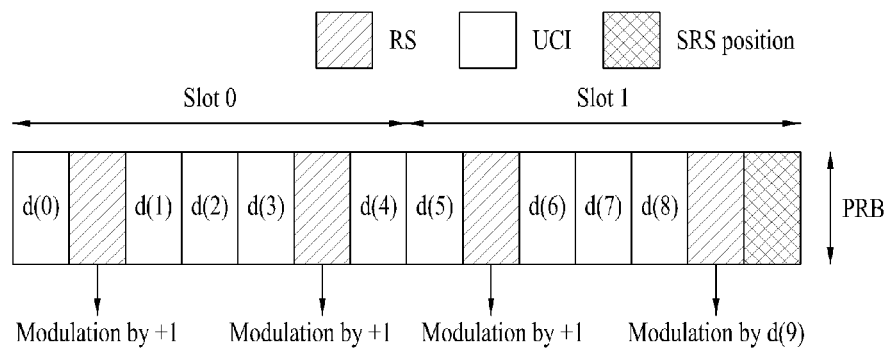

FIG. 58 illustrates a method of performing modulation on the second RS symbol (or first RS symbol) of slot 1. Referring to FIG. 58, punctured d(9) is modulated on the second RS symbol of slot 1. Modulating d(9) on an RS symbol includes multiplying an RS sequence by d(9). When d(9) is modulated through QPSK, modulation of d(9) on an RS symbol corresponds to shifting of the phase of the RS symbol according to d(9). Alternatively, d(9) may be modulated on the first RS symbol of slot 1, may be modulated on the first RS symbol of slot 0, or may be modulated on the second RS symbol of slot 0. A receiver can infer a log-likelihood ratio (LLR) for d(9) by comparing the phases of the first and second RS symbols. While this example assumes a case in which d(9) is punctured, this is exemplary and d(9) can be replaced by d(x) (x=0, . . . , 9).

Figure 59:
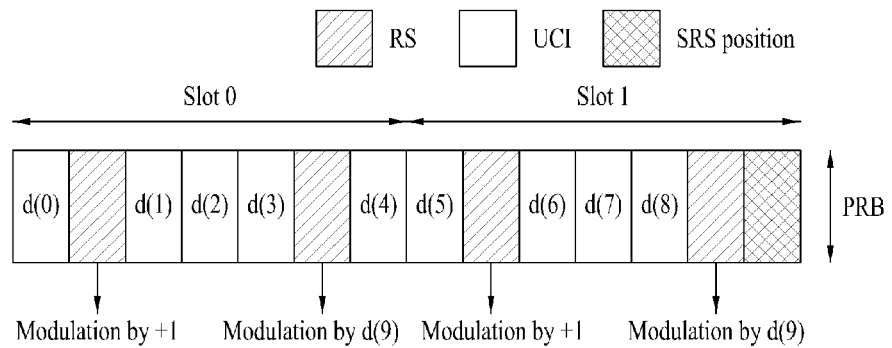

FIG. 59 illustrates a method of performing modulation on the second RS symbol (or first RS symbol) of slot 0. It is possible to obtain diversity gain by repeatedly modulating d(9) on the second RS symbols of respective slots. Similarly, it is also possible to repeatedly modulate d(9) on the first RS symbols of the respective slots.

Figure 60:
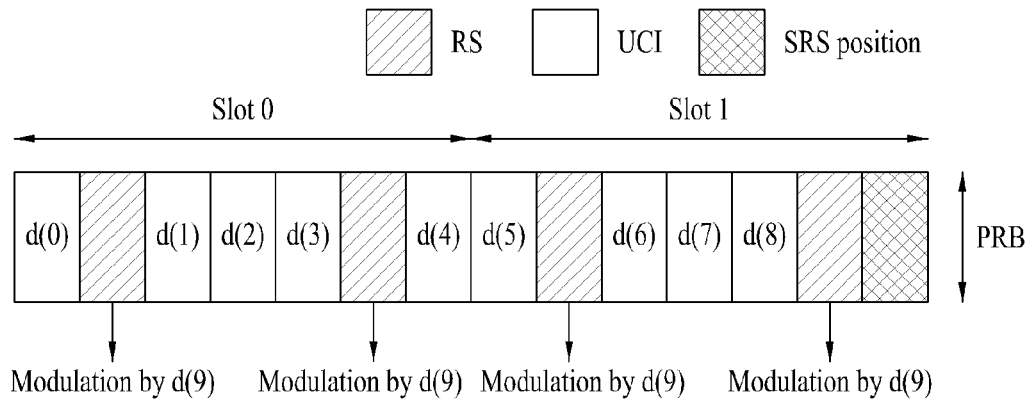

FIG. 60 illustrates a method of performing modulation on all RS symbols. In this case, it is possible to obtain higher diversity gain by repeatedly modulating d(9) into all the RS symbols.

Figure 61:
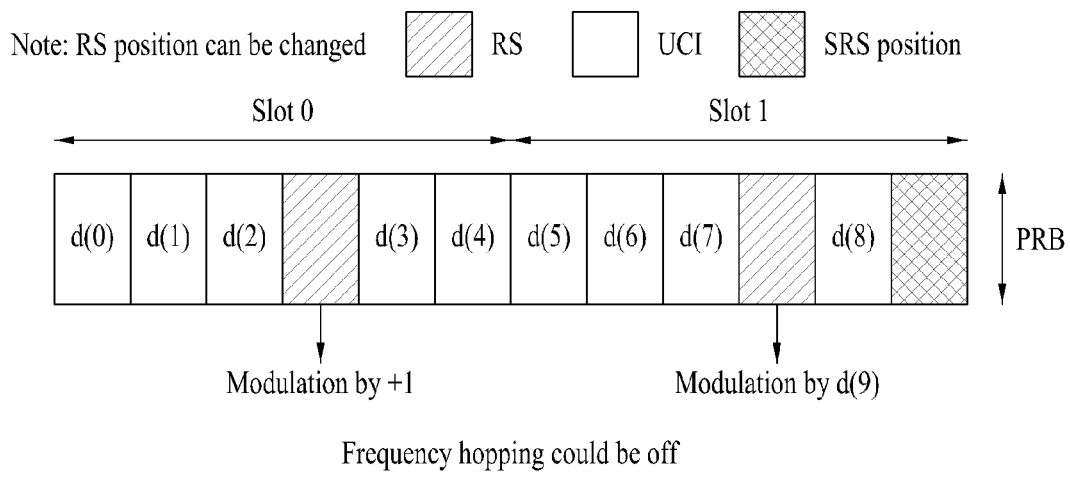
Figure 62:
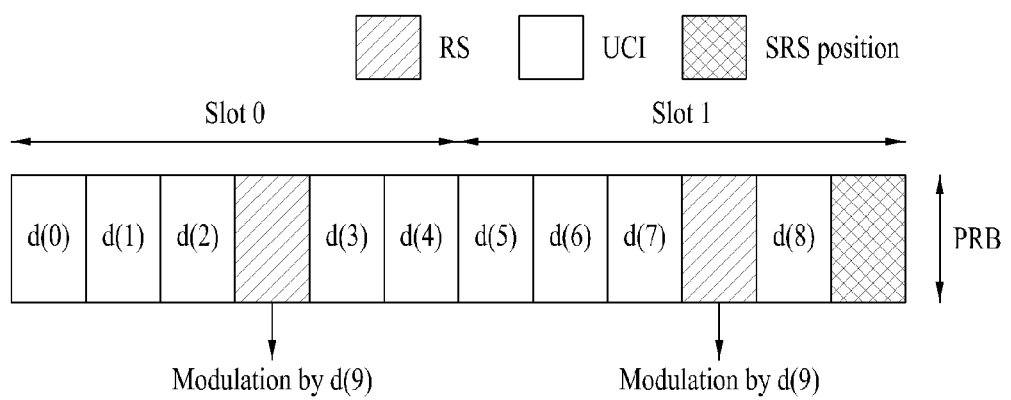

FIGS. 61 and 62 illustrate a scheme of simultaneously transmitting PUCCH format 2 and the SRS in the extended CP case. FIG. 61 shows that d(9) is modulated into an RS symbol of only one slot (e.g. slot 1) and FIG. 62 shows that d(9) are modulated into all RS symbols. Here, frequency hopping based on slots may be disabled. When d(9) is a QPSK symbol, the receiver can perform a total of 4 blind decoding operations.

While the schemes illustrated in FIGS. 58 to 62 focus on PUCCH format 2, they can be equally applied to the DFT based PUCCH structures shown in FIGS. 46 to 48.

A scheme of transmitting a PUCCH using a multi-antenna transmission method will now be described. While 2Tx transmit diversity scheme is described in the following embodiment, the embodiment can be equally/similarly applied to an n-Tx transmit diversity scheme. It is assumed that an orthogonal resource for UCI transmission is referred to as resource A and an orthogonal resource for RS transmission is referred to as resource B for convenience of description. Logical indexes of resource A and resource B may be liked with each other. For example, if the logical index of resource B is given, the logical index of resource A can be automatically provided. The logical indexes of resource A and resource B may be configured through different physical configuration methods. The following two cases are present.

1) Control information can be transmitted through the same PRB at all antennas (ports).
   A. The control information can be transmitted through resource A (e.g. cyclic shift, frequency factor) assigned for each antenna (port).
   B. An RS can be transmitted through resource B (e.g. a combination of a circular shift and a DFT cover) provided for each antenna (port). Resources B assigned for respective antennas (ports) are orthogonal.

2) The control information can be transmitted through different PRBs for antennas. For example, the control information can be transmitted through PRB#4 at antenna (port) 0 and transmitted through PRB#6 at antenna (port) 1.
   A. Resources for the control information transmitted through different antennas (ports) are not particularly limited (i.e. the resources can be equal to or different from each other).
   B. Resources for RSs transmitted through different antennas (ports) are not particularly limited (i.e. the resources can be equal to or different from each other).

In a multi-antenna transmit (e.g. 2Tx transmit) mode, two (or 2*N) resources A for control information transmission and two resources B for RS transmission can be defined in advance or provided through physical control channel (e.g. PDCCH)/RRC signaling. In this case, signaling for the control information and RS can be individually performed. When resource information for one antenna (port) is signaled, resource information for the other antenna (port) can be inferred from the previously signaled resource information.

Figure 63:
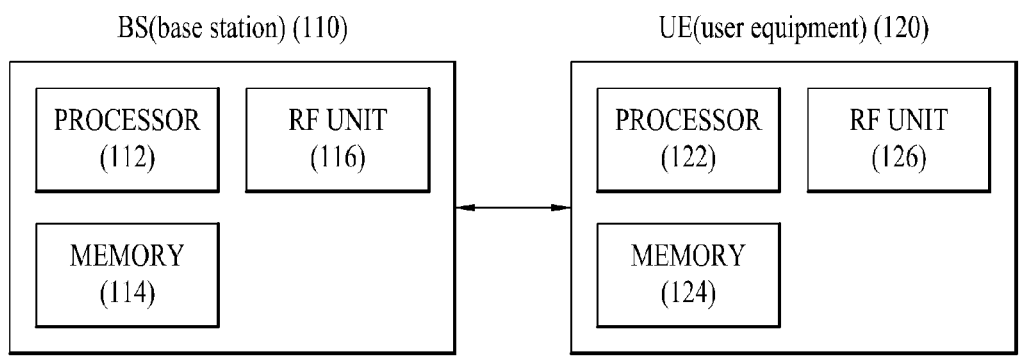
FIG. 63 illustrates configurations of a BS and a UE applicable to the present invention.

FIG. 63 is a block diagram showing configurations of a BS and a UE.

Referring to FIG. 63, a wireless communication system includes a BS 110 and a UE 120. The BS includes a processor 112, a memory 114, an RF unit 116. The processor 112 may be configured to implement the procedures and/or methods proposed by the present invention. The memory 114 is connected to the processor 112 and stores information related to operations of the processor 112. The RF unit 116 is connected to the processor 112, transmits and/or receives an RF signal. The UE 120 includes a processor 122, a memory 124, and an RF unit 126. The processor 122 may be configured to implement the procedures and/or methods proposed by the present invention. The memory 124 is connected to the processor 122 and stores information related to operations of the processor 122. The RF unit 126 is connected to the processor 122, transmits and/or receives an RF signal. The BS 110 and/or UE 120 may include a single antenna or multiple antennas.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It will be obvious to those skilled in the art that claims that are not explicitly cited in each other in the appended claims may be presented in combination as an embodiment of the present invention or included as a new claim by a subsequent amendment after the application is filed.

In the embodiments of the present invention, a description is made centering on a data transmission and reception relationship among a BS, a relay, and an MS. In some cases, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'BS' may be replaced with the term 'fixed station', 'Node B', 'enhanced Node B (eNode B or eNB)', 'access point', etc. The term 'UE' may be replaced with the term 'Mobile Station (MS)', 'Mobile Subscriber Station (MSS)', 'mobile terminal', etc.

The embodiments of the present invention may be achieved by various means, for example, hardware, firmware, software, or a combination thereof. In a hardware configuration, the methods according to the embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present invention may be implemented in the form of a module, a procedure, a function, etc. For example, software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

The present invention can be used for a UE, a BS or other devices in a wireless communication system. Specifically, the present invention is applicable to a method for transmitting uplink control information and an apparatus therefor.

The invention claimed is:

1. A method for, at a user equipment (UE), transmitting control information through a physical uplink control channel (PUCCH) in a wireless communication system, the method comprising:
   dividing a modulation symbol sequence for the control information such that the divided sequences correspond to two slots on the PUCCH;
   spreading the divided modulation symbol sequence corresponding to a first slot using a first code such that the spread sequence corresponds to a plurality of single carrier frequency division multiple access (SC-FDMA) symbols;
   discrete-Fourier-transforming, on an SC-FDMA symbol basis, the modulation symbol sequence spread to correspond to the plurality of SC-FDMA symbols in the first slot;
   spreading the divided modulation symbol sequence corresponding to a second slot using a second code such that the spread sequence corresponds to a plurality of SC-FDMA symbols;
   discrete-Fourier-transforming, on an SC-FDMA symbol basis, the modulation symbol sequence spread to correspond to the plurality of SC-FDMA symbols in the second slot; and
   transmitting discrete-Fourier-transformed signals through the corresponding SC-FDMA symbols in the first and second slots,
   wherein the length of the first code is fixed irrespective of the number of the SC-FDMA symbols for the PUCCH transmission, and
   wherein the length of the second code is varied according to the number of SC-FDMA symbols for PUCCH transmission.

2. The method of claim 1, wherein the length of the second code is M when the number of the SC-FDMA symbols for the PUCCH transmission is N, and the length of the second code is M−1 when the number of the SC-FDMA symbols for the PUCCH transmission is N−1.

3. The method of claim 2, wherein N is 12 and M is 5 in a normal cyclic prefix (CP) case, N is 10 and M is 5 in an extended CP case, and N includes number of SC-FDMA symbols for reference signal (RS) transmission.

4. The method of claim 1, wherein the second code is selected from code set 1 when the number of the SC-FDMA symbols for the PUCCH transmission is N, and
   wherein the second code is selected from code set 2 when the number of the SC-FDMA symbols for the PUCCH transmission is N−1:

| Orthogonal codes | |
| --- | --- |
| Code Set 1 | Code Set 2 |
| $[1\ 1\ 1\ 1\ 1]$ | $[+1\ +1\ +1\ +1]$ |
| $[1\ e^{j2\pi/5}\ e^{j4\pi/5}\ e^{j6\pi/5}\ e^{j8\pi/5}]$ | $[+1\ -1\ +1\ -1]$ |
| $[1\ e^{j4\pi/5}\ e^{j8\pi/5}\ e^{j2\pi/5}\ e^{j6\pi/5}]$ | $[+1\ +1\ -1\ -1]$ |
| $[1\ e^{j6\pi/5}\ e^{j2\pi/5}\ e^{j8\pi/5}\ e^{j4\pi/5}]$ | $[+1\ -1\ -1\ +1]$ |
| $[1\ e^{j8\pi/5}\ e^{j6\pi/5}\ e^{j4\pi/5}\ e^{j2\pi/5}]$. | |

5. The method of claim 4, wherein, when the number of the SC-FDMA symbols for PUCCH transmission is N, indexes of the SC-FDMA symbols through which the discrete-Fourier-transformed signal is transmitted in the second slot are 0, 2, 3, 4 and 6 in a normal cyclic prefix (CP) case and 0, 1, 2, 4 and 5 in an extended CP case, and wherein, when the number of the SC-FDMA symbols for PUCCH transmission is N−1, indexes of the SC-FDMA symbols through which the discrete-Fourier-transformed signal is transmitted in the second slot are 0, 2, 3 and 4 in the normal CP case and 0, 1, 2 and 4 in the extended CP case.

6. A user equipment (UE) configured to transmit control information through a physical uplink control channel (PUCCH) in a wireless communication system, the UE comprising:
   a radio frequency (RF) unit; and
   a processor,
   wherein the processor is configured to divide a modulation symbol sequence for the control information such that the divided sequences correspond to two slots on the PUCCH, to spread the divided modulation symbol sequence corresponding to a first slot using a first code such that the spread sequence corresponds to a plurality of single carrier frequency division multiple access (SC-FDMA) symbols, to discrete-Fourier-transform, on an SC-FDMA symbol basis, the modulation symbol sequence spread to correspond to the plurality of SC-FDMA symbols in the first slot, to spread the divided modulation symbol sequence corresponding to a second slot using a second code such that the spread sequence corresponds to a plurality of SC-FDMA symbols, to discrete-Fourier-transform, on an SC-FDMA symbol basis, the modulation symbol sequence spread to correspond to the plurality of SC-FDMA symbols in the second slot, and to transmit discrete-Fourier-transformed signals through the corresponding SC-FDMA symbols in the first and second slots,
   wherein the length of the first code is fixed irrespective of the number of the SC-FDMA symbols for the PUCCH transmission, and
   wherein the length of the second code is varied according to the number of SC-FDMA symbols for PUCCH transmission.

7. The UE of claim 6, wherein the length of the second code is M when the number of the SC-FDMA symbols for the PUCCH transmission is N, and the length of the second code is M−1 when the number of the SC-FDMA symbols for the PUCCH transmission is N−1.

8. The UE of claim 7, wherein N is 12 and M is 5 in a normal cyclic prefix (CP) case, N is 10 and M is 5 in an extended CP case, and N includes the number of SC-FDMA symbols for reference signal (RS) transmission.

9. The UE of claim 6, wherein the second code is selected from code set 1 when the number of the SC-FDMA symbols for the PUCCH transmission is N, and the second code is selected from code set 2 when the number of the SC-FDMA symbols for the PUCCH transmission is N−1:

| Orthogonal codes | |
| --- | --- |
| Code Set 1 | Code Set 2 |
| $[1\ 1\ 1\ 1\ 1]$ | $[+1\ +1\ +1\ +1]$ |
| $[1\ e^{j2\pi/5}\ e^{j4\pi/5}\ e^{j6\pi/5}\ e^{j8\pi/5}]$ | $[+1\ -1\ +1\ -1]$ |
| $[1\ e^{j4\pi/5}\ e^{j8\pi/5}\ e^{j2\pi/5}\ e^{j6\pi/5}]$ | $[+1\ +1\ -1\ -1]$ |
| $[1\ e^{j6\pi/5}\ e^{j2\pi/5}\ e^{j8\pi/5}\ e^{j4\pi/5}]$ | $[+1\ -1\ -1\ +1]$ |
| $[1\ e^{j8\pi/5}\ e^{j6\pi/5}\ e^{j4\pi/5}\ e^{j2\pi/5}]$. | |

10. The UE of claim 6, wherein, when the number of the SC-FDMA symbols for PUCCH transmission is N, indexes of the SC-FDMA symbols through which the discrete-Fourier-transformed signal is transmitted in the second slot are 0, 2, 3, 4 and 6 in a normal cyclic prefix (CP) case and 0, 1, 2, 4 and 5 in an extended CP case, and wherein, when the number of the SC-FDMA symbols for PUCCH transmission is N−1, indexes of the SC-FDMA symbols through which the discrete-Fourier-transformed signal is transmitted in the second slot are 0, 2, 3 and 4 in the normal CP case and 0, 1, 2 and 4 in the extended CP case.

* * * * *